(12) United States Patent
Amatriain-Rubio et al.

(10) Patent No.: US 12,645,886 B2
(45) Date of Patent: Jun. 2, 2026

(54) DIRECTIVE GENERATIVE THREAD-BASED USER ASSISTANCE SYSTEM

(71) Applicant: Microsoft Technology Licensing, LLC, Redmond, WA (US)

(72) Inventors: Xavier Amatriain-Rubio, Los Gatos, CA (US); Christopher M. Bremer, Santa Barbara, CA (US); Carlos H. Lopez, Westfield, NJ (US); Pierre Y. Monestie, Half Moon Bay, CA (US); Laura Teclemariam, Hayward, CA (US); Yamini Kasera, San Francisco, CA (US); Michaeel Kazi, Foster City, CA (US); Zhoutong Fu, Milpitas, CA (US); Muchen Wu, Mountain View, CA (US); Winnie Narang, San Carlos, CA (US); Yiyuan Tu, Milpitas, CA (US); Jaime Munoz Alcalde, Brooklyn, NY (US); Nitin Pasumarthy, Sunnyvale, CA (US); Thao Bach, Mountain View, CA (US); David Williams, Seattle, WA (US); Priyanka Gariba, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 18/217,335

(22) Filed: Jun. 30, 2023

(65) Prior Publication Data
US 2025/0005288 A1 Jan. 2, 2025

(51) Int. Cl.
*G06F 40/35* (2020.01)
*G06F 9/445* (2018.01)
(Continued)

(52) U.S. Cl.
CPC .............. *G06F 40/35* (2020.01); *G06F 9/445* (2013.01); *G06Q 10/063112* (2013.01); *G06Q 10/1053* (2013.01)

(58) Field of Classification Search
CPC ..... G06F 40/35; G06F 9/445; G06Q 10/0631; G06Q 10/1053
See application file for complete search history.

(56) References Cited

U.S. PATENT DOCUMENTS

2019/0306107 A1 * 10/2019 Galbraith ................ H04L 51/56
2024/0256785 A1 * 8/2024 Sharma ................... G06F 40/35
(Continued)

FOREIGN PATENT DOCUMENTS

WO WO-2022089546 A1 * 5/2022 ........... G06F 18/214

OTHER PUBLICATIONS

Kleef, The GPT revolution: a powerful language model that generates human-level text, 2021, blog entry, whole document (Year: 2021).*

(Continued)

*Primary Examiner* — Sonia L Gay
(74) *Attorney, Agent, or Firm* — Nicholson De Vos Webster & Elliott LLP

(57) ABSTRACT

Embodiments of the disclosed technologies include generating a first thread classification prompt based on a first thread portion of an online dialog involving a user of a computing device, sending the first thread classification prompt to a first large language model, receiving a first thread classification generated and output by the first large language model based on the first thread classification prompt, formulating a plan execution prompt based on the first thread classification, sending the plan execution prompt to a second large language model, receiving a second thread portion generated and output by the second large language (Continued)

model based on the plan execution prompt and the online dialog, and generating a label for a third thread portion of the online dialog.

20 Claims, 23 Drawing Sheets

(51) Int. Cl.
     G06Q 10/0631     (2023.01)
     G06Q 10/1053     (2023.01)

(56)                 References Cited

U.S. PATENT DOCUMENTS

| | | | | |
|---|---|---|---|---|
| 2024/0414108 | A1* | 12/2024 | Sun | H04L 51/216 |
| 2024/0427999 | A1* | 12/2024 | Newman | G06F 16/955 |
| 2025/0005297 | A1* | 1/2025 | Davish | G06F 40/40 |

OTHER PUBLICATIONS

Friedman, et al., "Leveraging Large Language Models in Conversational Recommender Systems", arXiv:2305.07961v1, May 13, 2023, 24 pages.

International Search Report and Written Opinion received for PCT Application No. PCT/US2024/033693, mailed on Oct. 10, 2024, 16 pages.

Wei, et al., "Leveraging Large Language Models to Power Chatbots for Collecting User Self-Reported Data", arXiv:2301.05843v1, Jan. 14, 2023, 22 pages.

Zhang, et al., "SGP-TOD: Building Task Bots Effortlessly via Schema-Guided LLM Prompting", arXiv:2305.09067v1, May 15, 2023, 21 pages.

* cited by examiner

100

FIG. 1D
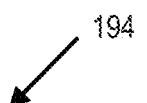
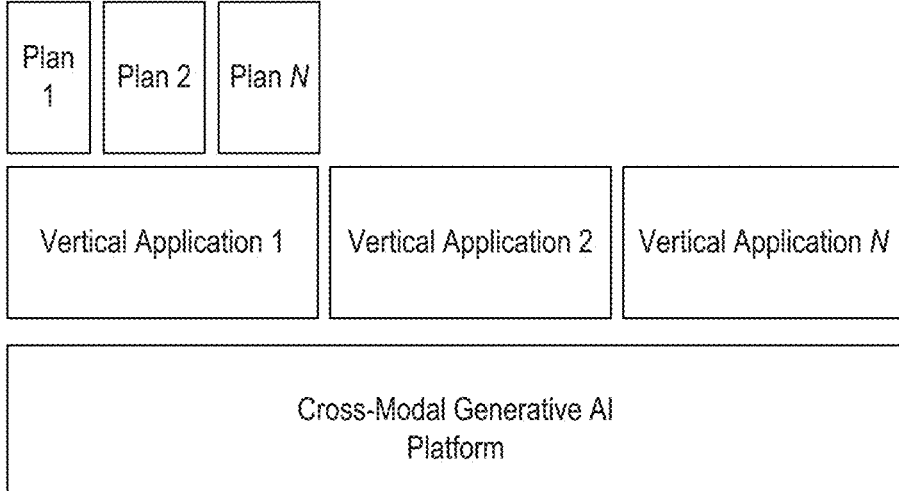

307

306

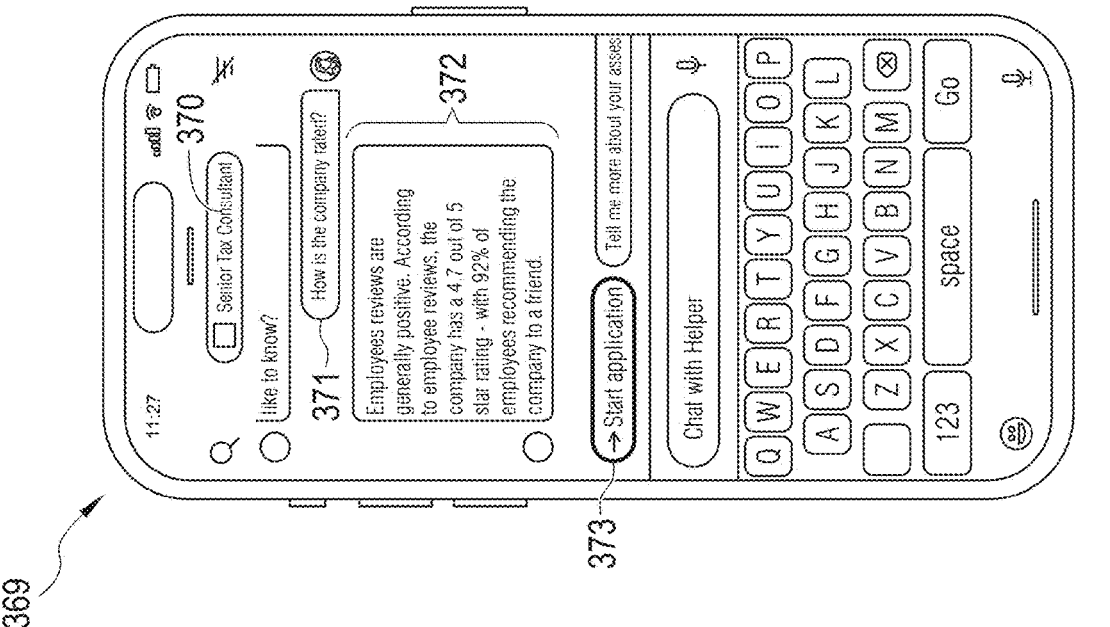
FIG. 3T
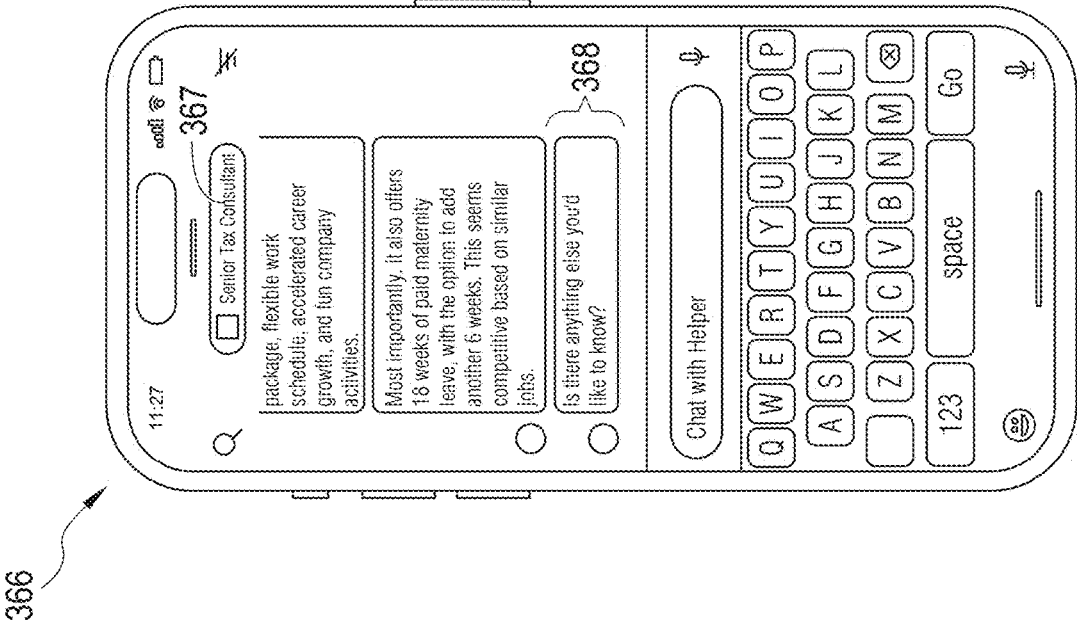
FIG. 3S

500

600

SUB-GRAPH A                                          SUB-GRAPH B

Job 2 —— HIRING —— Company 2

SUB-GRAPH C

HIRING

SHARES

DESCRIBES

Post U21                                    Job 1

Topic 1        Title A1

HAS

DESCRIBES    INCLUDES

POSTED    SHARED        Comment U1

Article 1

Company 1                                    VIEWED

SUB-GRAPH D

EMPLOYED BY        POSTED        LIKED        CLICKED    POSTED

VIEWED

User 1                                    User 4

FOLLOWS                    CONNECTED                    CONNECTED    HAS

User 2                                    CONNECTED        Skill U41

HAS        HAS        User 3

Skill U11        Title U1        HAS

Skill U31

SUB-GRAPH E

Figure 7:
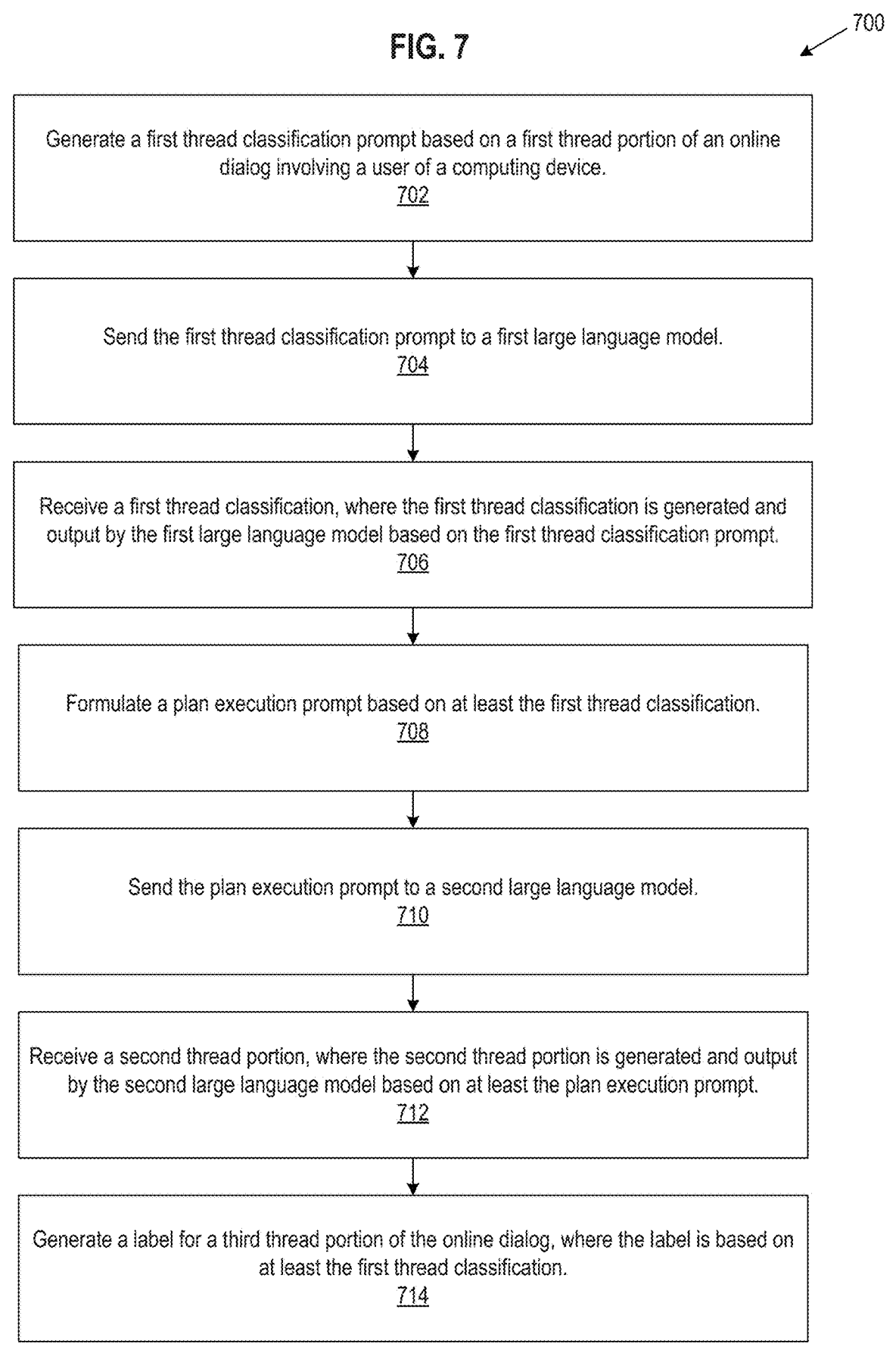

Generate a first thread classification prompt based on a first thread portion of an online dialog involving a user of a computing device.
702

Send the first thread classification prompt to a first large language model.
704

Receive a first thread classification, where the first thread classification is generated and output by the first large language model based on the first thread classification prompt.
706

Formulate a plan execution prompt based on at least the first thread classification.
708

Send the plan execution prompt to a second large language model.
710

Receive a second thread portion, where the second thread portion is generated and output by the second large language model based on at least the plan execution prompt.
712

Generate a label for a third thread portion of the online dialog, where the label is based on at least the first thread classification.
714

DIRECTIVE GENERATIVE THREAD-BASED USER ASSISTANCE SYSTEM

TECHNICAL FIELD

A technical field to which the present disclosure relates includes computer programs that use artificial intelligence to understand user requests for assistance and automate responses to those requests in a manner that simulates human conversation. Another technical field to which the present disclosure relates is generative artificial intelligence.

COPYRIGHT NOTICE

BACKGROUND

A search engine is a software system that is designed to find and retrieve stored information that matches a search query. A chatbot (or chat bot) is a software application that can retrieve information and answer questions by simulating a natural language conversation with a human user.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 1D is a block diagram of an example architecture for a computing system in accordance with some embodiments of the present disclosure.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V illustrate an example of at least one flow including screen captures of user interface screens configured to provide directive generative thread-based user assistance in accordance with some embodiments of the present disclosure.

FIG. 7 is a flow diagram of an example method for directive generative thread-based user assistance using components of a directive generative thread-based user assistance in system in accordance with some embodiments of the present disclosure.

DETAILED DESCRIPTION

Figure 1A:
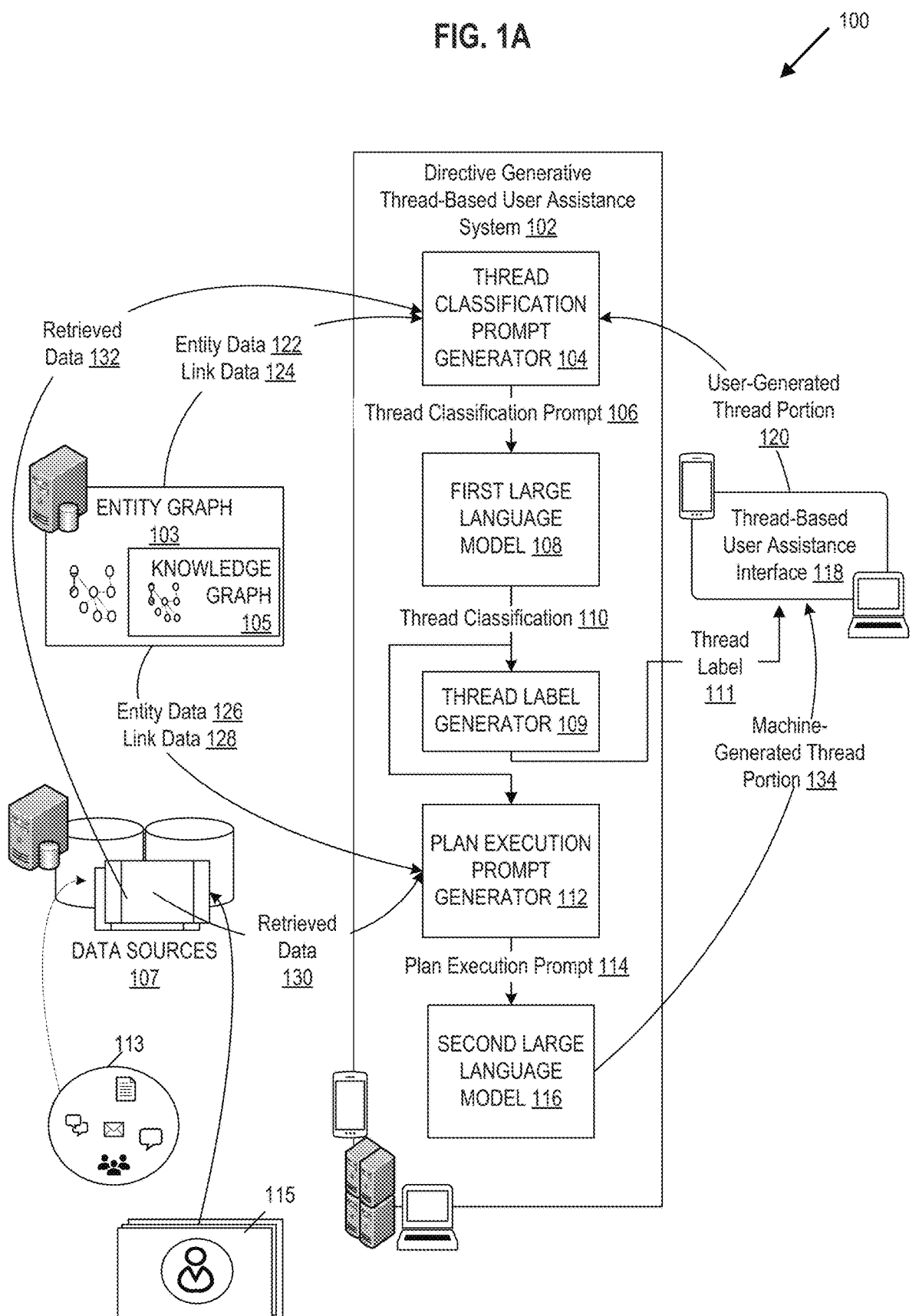
FIG. 1A is a flow diagram of an example method for directive generative thread-based user assistance using components of a directive generative thread-based user assistance system in accordance with some embodiments of the present disclosure.

People often turn to their computing devices when they need an answer to a question or another type of assistance, such as help with a job search. Conventional search engines require the user to explicitly provide or select search terms that identify the kind of information the user is looking for. While search engines are ubiquitous, it remains an ongoing challenge to design a search engine to accurately interpret user queries on an individualized basis because every user has a unique communication style and expresses themselves differently in different circumstances. Using a search engine, the user often needs to reword or rephrase their query multiple different times in a trial-and-error process in order to ultimately obtain a desirable set of search results.

Conventional chatbots operate in a similar way as search engines, but in a manner that simulates a human conversation. Thus, the chatbot replaces multiple iterations on a search query with multiple rounds of conversational dialog with the human user.

Conventional chatbots work best when the user has a clear idea of the kind of information or assistance they are seeking, e.g., a well-defined objective or intent, and the chatbot has been designed to handle inquiries of that specific type. For example, chatbots have been used to implement technical support, where the user can tell the chatbot exactly what is not working about their device or software. However, conventional chatbots are often frustrating for the user whose intent is less clear, because even after multiple rounds of dialog with the chatbot, the user may still not have achieved their objective. In other scenarios, the type of assistance the user is seeking may lend itself to lengthy, multi-threaded dialogs that conventional chatbots are not equipped to support. An example used to illustrate an application of the disclosed technologies is the job search. Prior to the disclosed technologies, chat-style software has not been widely successfully implemented to assist users with the process of finding a job that is aligned with the users' specific preferences and capabilities.

A generative model uses artificial intelligence technology, e.g., neural networks, to machine-generate new digital content based on model inputs and the previously existing data with which the model has been trained. Whereas discriminative models are based on conditional probabilities P (y|x), that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model is a particular type of generative model that generates new text in response to model input. The model input includes a task description, also referred to as a prompt. The task description can include instructions and/or examples of digital content. A task description can be in the form of natural language text, such as a question or a statement, and can include non-text forms of content, such as digital imagery and/or digital audio.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input. The score associated by the model with a given task description-output pair represents a probabilistic or statistical likelihood of there being a relationship between the output and the corresponding task description in the task description-output pair. The score for a given task description-output pair is dependent upon the way the generative model has been trained and the data used to perform the model training. The generative model can sort the task description-output pairs by score and output only the pair or pairs with the top scores. For example, the generative model could discard the lower-scoring pairs and only output the top-scoring pair as its final output.

A large language model (LLM) is a type of generative language model that is trained in an unsupervised way on massive amounts of unlabeled data, such as publicly available texts extracted from the Internet, using deep learning techniques. A large language model can be configured to perform one or more natural language processing (NLP) tasks, such as generating text, classifying text, answering questions in a conversational manner, and translating text from one language to another.

Large language models are capable of answering questions in a conversational manner. Due to having been trained on extensive amounts of data, large language models are also capable of operating online dialogs over a wide range of topics. Thus, large language models have the potential to improve the performance of chatbots. However, large language models have the technical problem of hallucination. In artificial intelligence, a hallucination is often defined as generated content that is nonsensical or unfaithful to the provided source content. Because chatbots often involve long or multi-threaded dialogs, the risk of AI hallucination is increased with each round of dialog or thread provided to the LLM. For example, the risk of AI hallucination may increase when the user switches among multiple different topics within the same dialog session or returns to a topic of an earlier thread. As a result, AI hallucination is a barrier to the use of LLMs in chatbots.

As a result of these and other issues, a technical challenge is to incorporate LLMs into a chatbot-style user assistance system while mitigating the risk of AI hallucination.

Another technical challenge is how to machine-generate digital images, videos, and/or audio and incorporate the machine-generated digital images, videos, and/or audio into user assistance. Still another technical challenge is how to reduce the burden of user input when processing and responding to requests for user assistance. Yet another technical challenge is how to scale a conversational user assistance system to a large number of users (e.g., hundreds of thousands to millions or more users) without needing to increase the size of the user assistance system linearly. An additional technical challenge is how to generate and distribute user assistance efficiently over a wide variety of user devices, e.g., adapting the user assistance to different sizes of display screens, different device types, etc. A further technical challenge is how to respond to latency issues while providing conversational user assistance, e.g., how to respond when increases or decreases in latency are detected.

To address these and other technical challenges of conventional user assistance systems, the disclosed technologies provide a directive generative thread-based user assistance system. The disclosed technologies are thread-based in that they are designed to enable lengthy and/or multi-threaded dialogs between a user and the user assistance system with increased efficiency, scalability, and reduced latency. The disclosed technologies are generative in that one or more generative models (e.g., LLMs) are used to machine-generate and output responses to user requests in a conversational natural language manner.

As described in more detail below, the disclosed technologies are directive in that the prompts that are supplied to the one or more LLMs as inputs are configured to constrain the operation of the one or more LLMs to well-defined sets of input parameters so as to avoid AI hallucination. For example, if the most recent round of user input in a lengthy dialog refers to "the third job," then in conventional approaches without the disclosed technologies, AI hallucination may occur because the LLM may not have the context to determine which job is the "third" job. However, using the disclosed technologies, "the third job" is disambiguated before the prompt is submitted to the LLM to avoid AI hallucination.

In some implementations, the disclosed technologies leverage one or more contextual resources, such as entity graphs, graph-based networks, recommendation systems, domain applications, and/or external data sources, to identify the parameters to be used to constrain the operations of the one or more LLMs. For example, if the user assistance system has identified five jobs as matching a user's criteria, the user assistance system may generate a prompt that includes instructions to search an entity graph to determine the companies associated with the five jobs, search a user connection graph to determine whether the user has any connections that work at any of those companies, rank jobs at companies at which the user has a connection higher than jobs at companies at which the user does not have any connections, and rephrase the user assistance system's natural language output to refer to the user's connections as potential referral sources. In this example and other examples, the disclosed technologies can overcome the technical problem of AI hallucination in the context of conversational, generative, thread-based user assistance systems.

Job search is one example of user assistance that can be enhanced using the disclosed technologies. For example, the disclosed technologies can be configured as a job seeking or career growth assistant that can help users improve their online job searches and manage the various online tasks that job seeking entails. For instance, a user assistance system configured with the disclosed technologies can automatically generate job recommendations based on the user's goals, skills, experience, and preferences, automatically generate comparative insights between multiple jobs based on the user's preferences, automatically generate suggestions of new skills for the user to develop to advance their career, automatically create personalized resumes and cover letters based on a particular job for which the user is applying, and automatically generate tips for the user's upcoming interview. Other example use cases include education, learning, and other domain-specific applications as well as more generalized or domain-independent user assistance environments.

Certain aspects of the disclosed technologies are described in the context of generative models that output pieces of writing, i.e., natural language text. However, the disclosed technologies are not limited to generative models that produce text output. For example, aspects of the disclosed technologies can be used to generate user assistance that includes non-text forms of machine-generated output, such as digital imagery, videos, multimedia, audio, hyperlinks, and/or platform-independent file formats.

Certain aspects of the disclosed technologies are described in the context of electronic dialogs conducted via a network, user connection network, or application software system, such as an instant messaging service, a chatbot, or a social network service. However, aspects of the disclosed technologies are not limited to such contexts, but can be used to improve the machine generation of user assistance with other types of software applications. Any network-based application software system can act as an application software system to which the disclosed technologies can be applied. For example, news, entertainment, and e-commerce apps installed on mobile devices, enterprise systems, messaging systems, search engines, workflow management systems, collaboration tools, and social graph-based applications can all function as application software systems with which the disclosed technologies can be used.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

As used herein, dialog or conversation may refer to one or more digital threads involving a user of a computing device and a user assistance system. For example, a dialog or conversation can have an associated user identifier, session identifier, conversation or dialog identifier and timestamp. Thread as used here may refer to one or more rounds of dialog involving the user and the user assistance system. A round of dialog as used herein may refer to a user input and an associated system-generated response, e.g., a system-generated reply to the user input. For example, a thread can include a first thread portion, such as a question received from a user of a computing device, and a second thread portion, such as natural language text, audio, video, and/or imagery machine-generated by the user assistance system in response to the user's question.

A thread can have an associated thread identifier. A thread can be made up of non-contiguous thread portions. For instance, a thread can include thread portions that relate to a common topic, even if those thread portions are temporally separated from each other by other threads or thread portions. Any dialog, thread, or thread portion can include one or more different types of digital content, including natural language text, audio, video, digital imagery, hyperlinks, and/or multimodal content such as web pages. A thread portion can have an associated source identifier (e.g., user or system) identifying the source of the thread portion, and a timestamp.

FIG. 1A is a flow diagram of an example method for directive generative thread-based user assistance using components of a computing system that includes a directive generative thread-based user assistance system, a thread-based user assistance interface, one or more entity graphs, and one or more data sources, in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of directive generative thread-based user assistance system 102, including, in some embodiments, components shown in FIG. 1A that may not be specifically shown in FIG. 5, or by components of directive generative thread-based user assistance system 580 of FIG. 5, including, in some embodiments, components shown in FIG. 5 that may not be specifically shown in FIG. 1A, or by components of computing system 140, including, in some embodiments, components shown in FIG. 1B that may not be specifically shown in FIG. 1A or FIG. 5, or by components of computing system 170, including, in some embodiments, components shown in FIG. 1C that may not be specifically shown in FIG. 1A, FIG. 1B, or FIG. 5, or by components of computing system 194, including, in some embodiments, components shown in FIG. 1D that may not be specifically shown in FIG. 1A, FIG. 1B, FIG. 1C, or FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel.

Additionally, at least one process can be omitted in various embodiments. Thus, not all processes are required in every embodiment. Other process flows are possible.

In the example of FIG. 1A, an example computing system 100 is shown, which includes an example directive generative thread-based user assistance system 102 and an example thread-based user assistance interface 118. The directive generative thread-based user assistance system 102 of FIG. 1A includes a thread classification prompt generator 104, a first large language model 108, a thread label generator 109, a plan execution prompt generator 112, and a second large language model 116, as described in more detail below.

In the example of FIG. 1A, the components of the directive generative thread-based user assistance system 102 are implemented using an application server or server cluster, which can include a secure environment (e.g., secure enclave, encryption system, etc.) for the processing of thread data. In other implementations, one or more components of the directive generative thread-based user assistance system 102 are implemented on a client device, such as a user system 510, described herein with reference to FIG. 5. For example, some or all of directive generative thread-based user assistance system 102 is implemented directly on the user's client device in some implementations, thereby avoiding the need to communicate with servers over a network such as the Internet.

In some implementations, the directive generative thread-based user assistance system 102 is in bidirectional communication with thread-based user assistance interface 118 via a computer network. Thread-based user assistance interface 118 includes front end user interface functionality that, in some embodiments, is considered part of directive generative thread-based user assistance system 102.

As described in more detail below, thread classification prompt generator 104 and plan execution prompt generator 112 are each configured to formulate and output specific types of prompts that can be used as inputs to one or more large language models. Prompt as used herein includes, for example, one or more machine-readable questions, statements, instructions, and/or examples in combination with a set of parameter values that constrain the operations of the large language model in generating and outputting a response to the prompt. For example, a classification prompt as used herein can include instructions to cause a large language model to output a classification (e.g., the large language model operates in a discriminative manner), while a plan execution prompt as used here can include instructions to cause a large language model to execute a plan (e.g., a multi-step prompt) to machine-generate and output one or more thread portions (e.g., the large language model operates in a generative manner).

The way in which the elements of the prompt are organized and the phrasing used to articulate the prompt elements can significantly affect the output produced by the large language model in response to the prompt. For example, a small change in the prompt content or structure can cause the large language model to generate a very different output. As such, thread classification prompt generator 104 and plan execution prompt generator 112 are each specially configured to cause one or more large language models to generate and output thread portions that are responsive to user-generated thread portions in accordance with specific parameters, instructions, and constraints that are applicable to a specific task to be performed by the one or more large language models, such as thread classification or plan execution.

To create and operate various portions of directive generative thread-based user assistance system 102 and/or thread-based user assistance interface 118, components of the directive generative thread-based user assistance system 102 and/or thread-based user assistance interface 118 can access one or more contextual resources to, for example, obtain parameter values that can be used to constrain the operations of one or more large language models. Examples of contextual resources shown in FIG. 1A include entity graph 103, knowledge graph 105 and data sources 107.

Entity graph 103 includes a graph-based representation of entity data. Entity as used herein may refer to a user of the directive generative thread-based user assistance system 102 and/or thread-based user assistance interface 118, a user of an application software system operating the directive generative thread-based user assistance system 102 and/or thread-based user assistance interface 118, or another type of entity. Examples of other entity types include companies, organizations, institutions, attributes (e.g., job titles, skills), and digital content items (e.g., articles, posts, comments, shares, or job postings. For example, in an online user connection network such as a social network service, an entity can include or reference a web page with which a user of the user connection network can interact via a user system, where the web page is configured to display a digital content item, such as an article, post, message, another user's profile, or profile data relating to a company, organization, institution, or a job posting.

Entity graph 103 represents entities, such as users, organizations (e.g., companies, schools, institutions), and content items (e.g., user profiles, job postings, announcements, articles, comments, and shares), as nodes of a graph. Entity graph 103 represents relationships, also referred to as mappings or links, between or among entities as edges, or combinations of edges, between the nodes of the graph. In some implementations, mappings between or among different pieces of data are represented by one or more entity graphs (e.g., relationships between job postings, skills, and job titles). In some implementations, the edges, mappings, or links of the entity graph 103 indicate online interactions or activities relating to the entities connected by the edges, mappings, or links. For example, if a user applies for a job, an edge may be created connecting the user entity with the job entity in the entity graph, where the edge may be tagged with a label such as "applied."

Portions of entity graph 103 can be automatically regenerated or updated from time to time based on changes and updates to the stored data, e.g., in response to updates to entity data and/or activity data. Also, entity graph 103 can refer to an entire system-wide entity graph or to only a portion of a system-wide graph, such as a sub-graph. For instance, entity graph 103 can refer to a sub-graph of a system-wide graph, where the sub-graph pertains to a particular entity or entity type.

Figure 5:
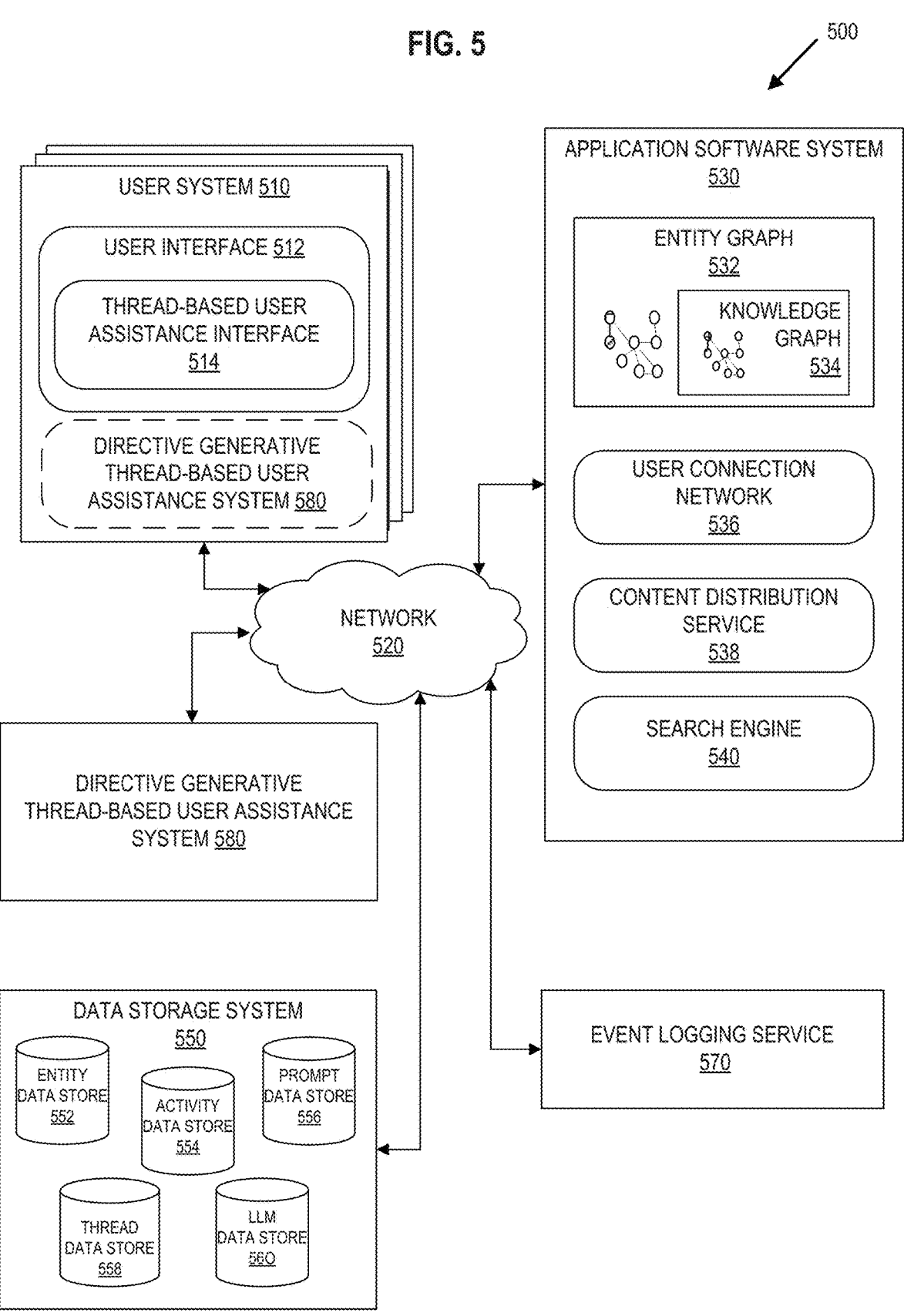
FIG. 5 is a block diagram of a computing system that includes a directive generative thread-based user assistance system in accordance with some embodiments of the present disclosure.
Figure 6:
FIG. 6 is an example of an entity graph in accordance with some embodiments of the present disclosure.

Not all implementations have a knowledge graph, but in some implementations, knowledge graph 105 is a subset of entity graph 103 or a superset of entity graph 103 that also contains nodes and edges arranged in a similar manner as entity graph 103, and provides similar functionality as entity graph 103. For example, in some implementations, knowledge graph 105 includes multiple different entity graphs 103 that are joined by cross-application or cross-domain edges or links. For instance, knowledge graph 105 can join entity graphs 103 that have been created across multiple different databases or across multiple different software products. As an example, knowledge graph 105 can include links between job postings that are stored and managed by a first application software system and related company reviews that are stored and managed by a second application software system different from the first application software system. Additional or alternative examples of entity graphs and knowledge graphs are shown in FIG. 5 and FIG. 6, described below.

As shown in FIG. 1A, entity graph 103 and/or knowledge graph 105 are capable of supplying entity data 122 and/or link data 124 to thread classification prompt generator 104. For instance, thread classification prompt generator 104 can use entity data 122 and/or link data 124 to tag thread portions with entity tags, determine which thread classification prompt template to select from a prompt template library, and/or to generate a thread classification prompt once a thread classification prompt template has been selected. For example, thread classification prompt generator 104 can use entity graph 103 and/or knowledge graph 105 to obtain one or more parameter values to include in a thread classification prompt.

For instance, thread classification prompt generator 104 can use entity graph 103, 105 to tag words or phrases of a thread portion with entity identifiers. For example, if a thread portion includes the phrase "I'm interested in becoming a software engineer" then thread classification prompt generator 104 can traverse the entity graph 103 to find a job title entity or skill entity that matches "software engineer," determine the identifier associated with that entity, and tag the phrase with the identifier for "software engineer" extracted from the entity graph 103.

As another example, thread classification prompt generator 104 can use entity graph 103, 105 to select a thread classification prompt template. For instance, thread classification prompt generator 104 may determine, based on a search of entity graph 103, an industry associated with a particular type of job (e.g., tech, healthcare, sales, etc.) or a geographic region associated with a job posting, and then select a thread classification prompt template based on that industry or geographic region.

As yet another example, thread classification prompt generator 104 can use entity graph 103, 105 to generate a thread classification prompt. For instance, if a user supplies a thread portion that contains the phrase "I would like to work at CompanyX," then thread classification prompt generator 104 may determine, based on a search of entity graph 103, to include "company=CompanyX" as a parameter value in the thread classification prompt, and determine based on a search of entity graph 103 that the user has five connections at a company named CompanyX, and include the identifiers of those five connections, or a flag that indicates "connections=yes" in the thread classification prompt.

As shown in FIG. 1A, entity graph 103 and/or knowledge graph 105 are capable of supplying entity data 126 and/or link data 128 to plan execution prompt generator 112. For instance, plan execution prompt generator 112 can use entity data 126 and/or link data 128 to map a thread classification to a plan type, determine which plan execution prompt template to select from a prompt template library, and/or to generate a plan execution prompt once a plan execution prompt template has been selected. For example, plan execution prompt generator 112 can use entity graph 103 and/or knowledge graph 105 to obtain one or more parameter values to include in a plan execution prompt.

For instance, plan execution prompt generator 112 can use link data 128 to determine skills associated with a user who has supplied a thread portion, determine skills associated with a job entity tagged in the thread portion, and map a thread classification of "job search" to a plan type of "draft resume" based on the overlap between the user's skills and the skills associated with the job entity.

As another example, plan execution prompt generator 112 can use entity graph 103, 105 to select a plan execution prompt template. For instance, plan execution prompt generator 112 may determine, based on a search of entity graph 103, an industry associated with a particular type of job (e.g., tech, healthcare, sales, etc.) or a geographic region associated with a job posting, and then select a plan execution prompt template based on that industry or geographic region (e.g., to draft a resume appropriate for a particular industry or geographic region).

As yet another example, plan execution prompt generator 112 can use entity graph 103, 105 to generate a plan execution prompt. For instance, if the plan execution prompt generator 112 selects a plan execution prompt template containing instructions to generate a resume for the software industry, the plan execution prompt generator 112 can use entity graph 103, 105 to extract relevant skills from the user's profile and include those skills in the plan execution prompt.

Data sources 107 can be used to supply retrieved data 130 to thread classification prompt generator 104 and/or plan execution prompt generator 112 in a similar manner. Examples of retrieved data 130 include online dialog history 113, web content 115 (e.g., web pages, such as user profile pages, company pages, articles, and posts), data obtained from one or more recommendation systems, and data obtained from domain applications such as software platforms that are external to the directive generative thread-based user assistance system 102 but are accessible to the directive generative thread-based user assistance system 102 via, e.g., one or more APIs (application programming interfaces).

Examples of recommendation systems include machine learning models that have been trained based on historical data to score user-entity pairs, rank the user-entity pairs based on the scores, and select one or more of the top ranking user-entity pairs to formulate and output a user recommendation. Examples of data obtained from recommendation systems include user connection recommendations and job recommendations (e.g., people you may know, jobs you may be interested in).

Data retrieved from a recommendation system can be used to constrain the operation of one or more large language models. For example, recommendation system output can be used by thread classification prompt generator 104 and/or plan execution prompt generator 112 to determine whether to include an entity in a prompt or to exclude the entity from the prompt. For instance, if the user indicates in a thread portion that they are interested in working at a specific company, and a job recommendation system outputs a job recommendation at that company, then that job recommendation by the recommendation system can be included in a plan execution prompt. Similarly, a plan execution prompt can be configured to exclude jobs that are not highly recommended (e.g., recommendation score is less than a threshold score value) by the job recommendation system. As another example, if the user is connected to five people at a company and a user recommendation system outputs a connection recommendation for a sixth person who works at that same company, a plan execution prompt can be configured to include the connection recommendation rather than the user's existing connections in a plan execution prompt, or the plan execution prompt can be configured to exclude the connection recommendation from the plan execution prompt and include one or more of the user's existing connections in the plan execution prompt.

Data retrieved from one or more external applications and/or platforms can be used to constrain the operation of one or more large language models. An example of data obtained from an external application or platform, which can be used by thread classification prompt generator 104 and/or plan execution prompt generator 112 to constrain the operation of one or more large language models, is entity ratings data. For instance, job ratings data and/or company ratings data can be used to exclude job postings from low-rated companies from a plan execution prompt. For example, if a company rating is less than a threshold rating value determined based on the requirements of the particular design or implementation, the job posting associated with that company is omitted from the plan execution prompt. Similarly, if a company rating is greater than or equal to a threshold rating value, where the threshold value is determined based on the requirements of the particular design or implementation, the job posting associated with that company is included in the plan execution prompt.

Online dialog history 113 includes historical threads and thread portions associated with an online dialog involving a particular user. That is, each user will have a separate online dialog history 113. For example, when an online dialog is initiated between a user and the directive generative thread-based user assistance system 102 (e.g., via thread-based user assistance interface 118), the initial thread portion that begins the online dialog and all subsequent thread portions involving that user are stored in online dialog history 113. For instance, in some implementations, a text file is created to store the online dialog history 113 and is updated each time a new thread or thread portion is added to the online dialog, such that the text file contains the entire dialog history involving the user, up to the current timestamp.

Data retrieved from online dialog history can be used to constrain the operation of one or more large language models. For instance, online dialog history 113 can be used by thread classification prompt generator 104 to disambiguate thread portions subsequently received from the same user or to augment those subsequently received thread portions with additional context data. As another example, online dialog history 113 can supply parameter values to be used by plan execution prompt generator 112 in generating a plan execution prompt, in order to constrain the plan execution by the second large language model 116. For instance, while the most recent user-submitted thread portion may not have mentioned the company or industry in which the user is looking to be hired, the plan execution prompt generator 112 can extract the company name or industry information previously supplied in an earlier round of dialog and include the company name or industry name in the plan execution prompt.

Data retrieved from web content 115 can be used to constrain the operation of one or more large language models. Examples of web content 115 that can be extracted and used by thread classification prompt generator 104 and/or plan execution prompt generator 112 to constrain the operations of a large language model include user experience, interests, areas of expertise, educational history, job titles, skills, job history, etc., as well as similar information related to other types of entities, e.g., new articles related to a company associated with a job posting, etc. For example, a negative news article about a company, e.g., an article that discusses recent layoffs, can be used to exclude that company from a plan execution prompt. Similarly, if a company's web page mentions the company's involvement in an emerging technology that matches the user's interests, that company can be included in a plan execution prompt.

Thread context data, such as entity data 122, 126, link data 124, 128, and retrieved data 130, can be provided to directive generative thread-based user assistance system 102 from potentially a variety of different applications, platforms, and data sources including user interfaces, databases and other types of data stores, including online, real-time, and/or offline data sources. In the example of FIG. 1A, thread context data are received via one or more user devices or systems, such as portable user devices like smartphones, wearable devices, tablet computers, or laptops, one or more web servers, and/or one or more database servers; however, any of the different types of thread context data can be received by directive generative thread-based user assistance system 102 via any type of electronic machine, device or system.

In operation, thread classification prompt generator 104 receives a user-generated thread portion 120 via a thread-based user assistance interface 118. In response to the user-generated thread portion 120, thread classification prompt generator 104 formulates and outputs a thread classification prompt 106. For example, if user-generated thread portion 120 is the first thread portion in the online dialog, then the thread classification prompt 106 is based on the user-generated thread portion 120 and potentially one or more thread context data. If there have been previous rounds of dialog prior to the user-generated thread portion 120, then the thread classification prompt 106 is based on the user-generated thread portion 120, the one or more previous rounds of dialog, and potentially one or more thread context data.

Figure 1B:
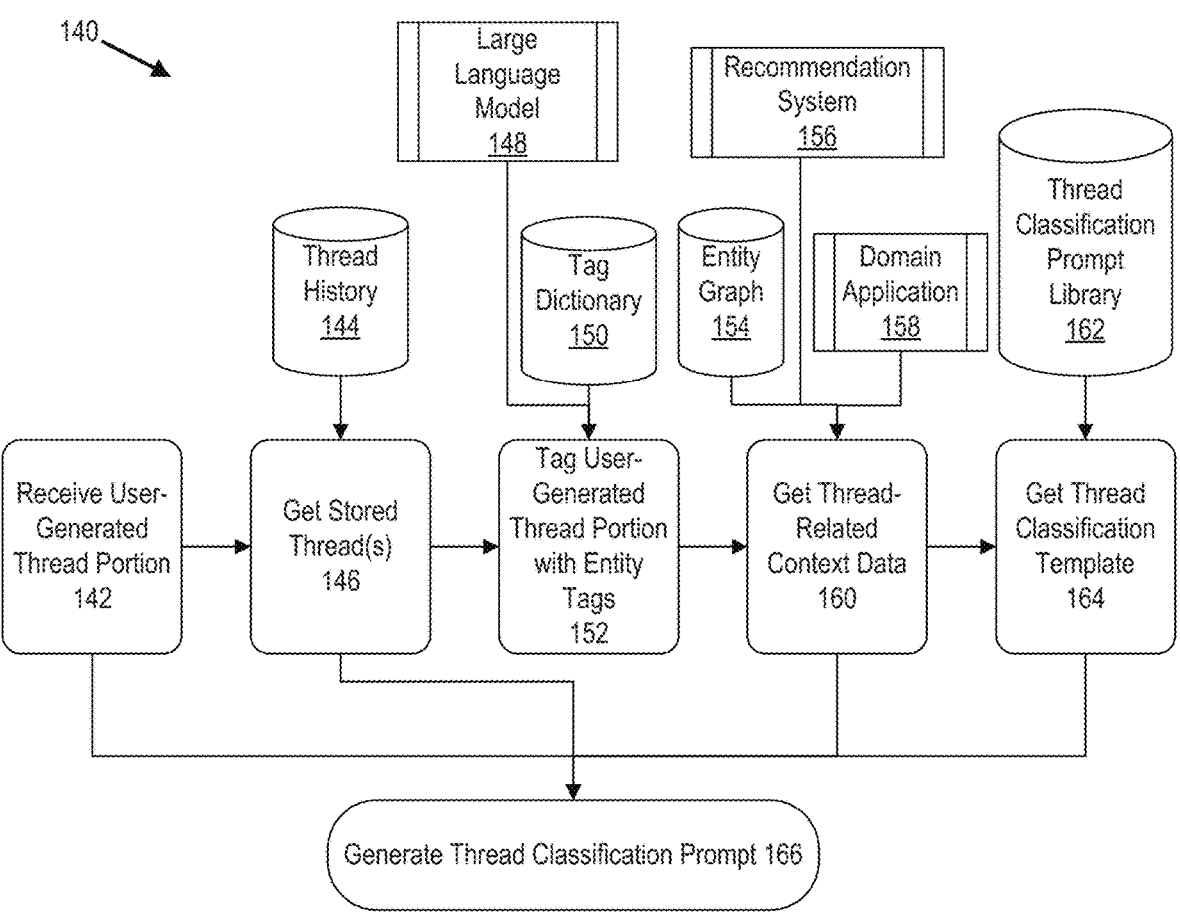
FIG. 1B is a flow diagram of an example method for generating a thread classification prompt using components of a directive generative thread-based user assistance system in accordance with some embodiments of the present disclosure.

The thread classification prompt 106 contains one or more instructions for the first large language model 108 to generate and output a classification (e.g., a task type, user intent, or objective) based on the user-generated thread portion 120 and any constraints contained in the prompt. For example, thread classification prompt generator 104 selects a thread classification prompt template, combines the thread classification prompt template with the user-generated thread portion 120 and, optionally, one or more pieces of thread context data, to formulate the thread classification prompt. An example of operations that can be performed by thread classification prompt generator 104 to generate thread classification prompt 106 is shown in FIG. 1B, described below.

First large language model 108 includes one or more neural network-based machine learning models. In some implementations, first large language model 108 is constructed using a neural network-based deep learning model architecture. In some implementations, the neural network-based architecture includes one or more input layers that receive model inputs, generate one or more embeddings based on the model inputs, and pass the one or more embeddings to one or more other layers of the neural network. In other implementations, the one or more embeddings are generated based on the model input by a pre-processor, the embeddings are input to the neural network model, and the neural network model generates output based on the embeddings.

In some implementations, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some implementations, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the directive generative thread-based user assistance system 102.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architectures include or are based on one or more multimodal neural networks capable of outputting different modalities (e.g., text, image, sound, etc.) separately and/or in combination based on textual input. Accordingly, in some examples, a multimodal neural network implemented in the directive generative thread-based user assistance system is capable of outputting digital content that includes a combination of two or more of text, images, video or audio.

In some implementations, first large language model 108 is trained on a large dataset of digital content such as natural language text, images, videos, audio files, or multi-modal data sets. For example, training samples of digital content such as natural language text extracted from publicly available data sources are used to train one or more generative models of the directive generative thread-based user assistance system. The size and composition of the datasets used to train one or more models of the directive generative thread-based user assistance system can vary according to the requirements of a particular design or implementation of the directive generative thread-based user assistance system. In some implementations, one or more of the datasets used to train one or more models of the directive generative thread-based user assistance system includes hundreds of thousands to millions or more different training samples.

In some embodiments, one or more models of directive generative thread-based user assistance system includes multiple generative models trained on differently sized datasets. For example, a directive generative thread-based user assistance system can include a comprehensive but low capacity generative model that is trained on a large data set and used for generating thread portions in response to user inputs, and the same generative model also can include a less comprehensive but high capacity model that is trained on a smaller data set, where the high capacity model is used to generate outputs based on examples obtained from the low capacity model. In some implementations, reinforcement learning is used to further improve the output of one or more models of directive generative thread-based user assistance system. In reinforcement learning, ground-truth examples of desired model output are paired with respective inputs, and these input-example output pairs are used to train or fine tune one or more models of directive generative thread-based user assistance system.

In some implementations, one or more models of directive generative thread-based user assistance system are implemented using a graph neural network. For example, a modified version of a Bidirectional Encoder Representation with Transformers (BERT) neural network is specifically configured, in one model instance, to generate and output thread classifications, and in another instance, to generate and output machine-generated thread portions. In some implementations, the modified BERT is trained with self-supervision, e.g., by masking some portions of the input data so that the BERT learns to predict the masked data. During scoring, a masked entity is associated with a portion of the input data and the model generates output at the position of the masked entity based on the input data.

In operation, first large language model 108 receives input including thread classification prompt 106. Thread classification prompt 106 is communicated to first large language model 108 via, for example, an application programming interface (API). In response to thread classification prompt 106, first large language model 108 generates and outputs thread classification 110. Thread classification 110 includes a label that articulates a task type, user intent, or objective of the thread portion 120, which is determined, generated and output by first large language model 108 in response to the thread classification prompt 106.

Thread label generator 109 receives thread classification 110 (e.g., via an API). Thread label generator 109 converts thread classification 110 to a thread label 111 such that the thread label 111 is configured for display at the thread-based user assistance interface 118. For example, if the thread classification 110 represents the classification as a numerical value or alphanumeric code, thread label generator 109 converts or translates the value or code to a text label (e.g., J123 is converted to "Sales Manager position at Acme." To determine the thread label 111, thread label generator 109 performs a lookup on a mapping table, e.g., a key-value store, which stores relationships between thread classifications 110 and corresponding thread labels 111. Alternatively, the thread label 111 includes natural language text that is extracted from the thread.

Thread label 111 is based on and associated with the thread that includes at least user-generated thread portion 120. For example, thread label generator 109 creates a message that includes the thread identifier of the thread with which the label 111 is associated, and the label 111 (e.g., threadID, thread label). The message containing the thread label 111 and associated thread ID is communicated to thread-based user assistance interface 118 for display in connection with the associated thread that matches the thread ID. For instance, in a vertical or horizontal scrolling messaging paradigm, the thread label 111 is displayed at the top or bottom of the screen, or left or right side, when the associated thread is being displayed. Examples of thread labels that are dynamically created using the disclosed technologies are shown in the user interface screen capture figures, described below.

Figure 1C:
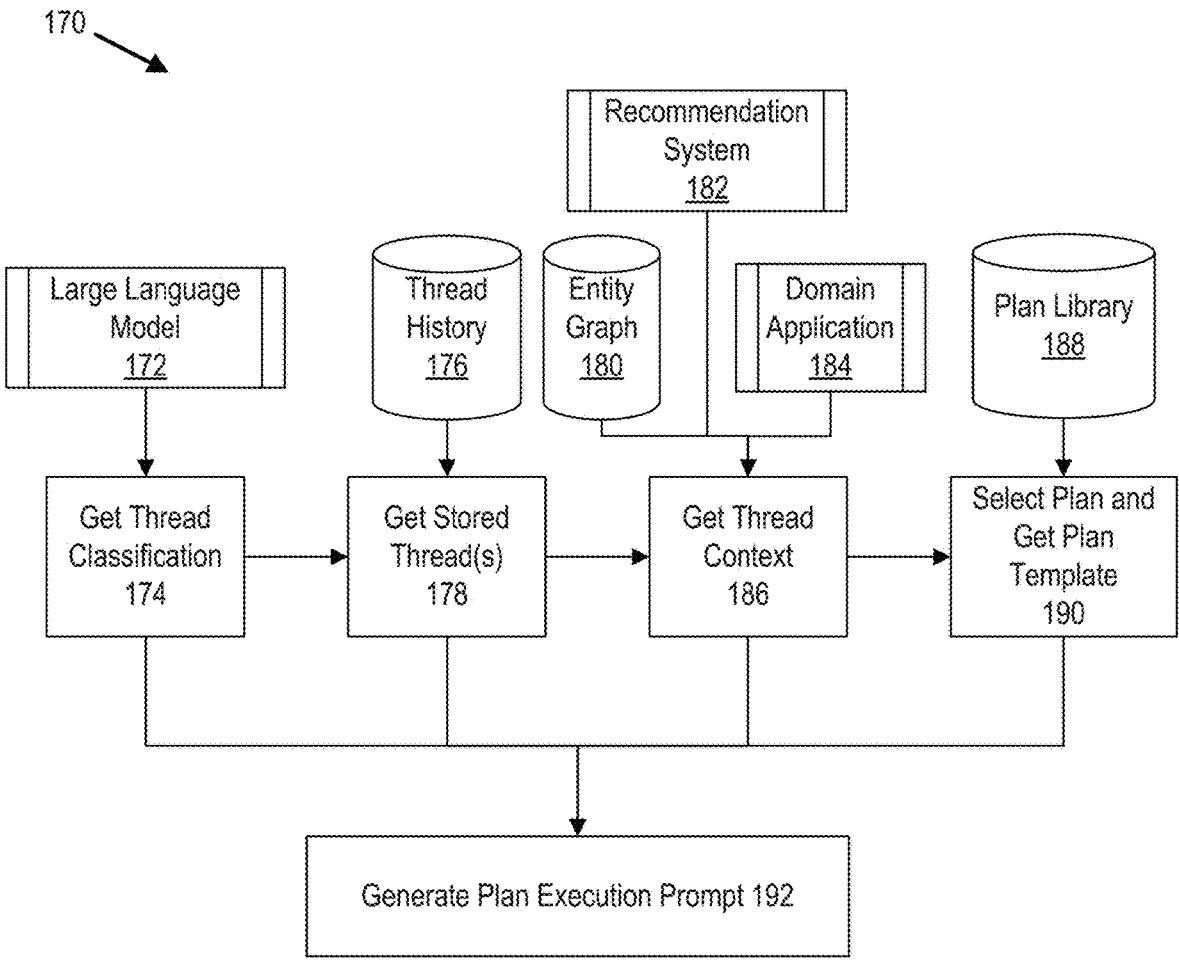
FIG. 1C is a flow diagram of an example method for generating a plan execution prompt using components of a directive generative thread-based user assistance system in accordance with some embodiments of the present disclosure.

Thread classification 110 is also passed to plan execution prompt generator 112 (e.g., via an API). In response to the thread classification 110, plan execution prompt generator 112 formulates and outputs a plan execution prompt 114. The plan execution prompt 114 contains one or more instructions for the second large language model 116 to generate and output a machine-generated thread portion 134 based on the thread classification 110 and any constraints contained in the prompt. For example, plan execution prompt generator 112 selects a plan execution prompt template, combines the plan execution prompt template with the thread classification 110 and, optionally, one or more pieces of thread context data, to formulate the plan execution prompt 114. An example of operations that can be performed by plan execution prompt generator 112 to generate plan execution prompt 114 is shown in FIG. 1C, described below.

Second large language model 116 includes one or more neural network-based machine learning models, such as any of the types of models described above with reference to first large language model 108. In some implementations, second large language model 116 includes first large language model 108. For example, first large language model 108 and second large language model 116 are included in the same large language model. In some implementations, second large language model 116 and first large language model 108 have the same model architecture but are trained differently. For example, in some implementations, first large language model 108 is trained on a large dataset of digital content while second large language model 116 is pre-trained on the same large dataset but then tuned for a specific task type, such as job searching, resume generation, interview preparation, etc.

In operation, second large language model 116 machine-generates and outputs machine-generated thread portion 134. Examples of machine-generated thread portion 134 include natural language text and/or multi-model content, such as conversational questions, job recommendations including links to relevant job postings, personalized task lists that are customized based on thread context data, personalized job assessments that are customized based on thread context data, push notifications, pull notifications, etc. Additional examples of machine-generated thread portion 134 are shown in the user interface screen capture figures described below.

Taken together, user-generated thread portion 120 and machine-generated thread portion 134 constitute a thread of an online dialog. The thread can include other user-generated thread portions and/or machine-generated thread portions that occur either prior to or subsequent to the thread portions 120, 134. For example, an online dialog can include several rounds of dialog including multiple user-generated thread portions and machine-generated thread portions, and the online dialog can continue over a variable time interval such as several minutes or intermittently over hours, days, or weeks. Each time an additional thread portion, whether user-generated or system-generated, is added to the online dialog, it is added (e.g., appended) to the dialog history so that thread classification prompt generator 104 and plan execution prompt generator 112 can each access the entire dialog history to formulate their respective prompts.

The thread-based user assistance interface 118 includes a front end component through which a user can interact with the directive generative thread-based user assistance system 102 at the user's electronic device. For example, the thread-based user assistance interface 118 displays an online dialog including user-generated thread portion 120 and machine-generated thread portion 134. If the online dialog includes multiple threads, the thread-based user assistance interface 118 dynamically groups the thread portions by thread and labels the threads with the associated thread labels 111.

In some implementations, thread-based user assistance interface 118 includes a "focus" user interface mechanism. The focus mechanism when selected by the user enables the user to zoom in on a particular thread based on the associated thread label 111. For example, in a multi-threaded online dialog, the focus mechanism enables the user to select a particular thread label and by doing so, view only the thread portions associated with the selected thread label (e.g., other threads not associated with the selected thread label are collapsed or hidden). Examples of user interface displays and mechanisms are shown in the user interface screen capture figures described below.

The examples shown in FIG. 1A and the accompanying description, above are provided for illustration purposes. This disclosure is not limited to the described examples. Additional or alternative details and implementations are described herein.

FIG. 1B is a flow diagram of an example method for generating a thread classification prompt using components of a directive generative thread-based user assistance system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a computing system 140, or by directive generative thread-based user assistance system 102 of FIG. 1A, including, in some embodiments, components shown in FIG. 1A that may not be specifically shown in FIG. 1B, or by components of directive generative thread-based user assistance system 580 of FIG. 5, including, in some embodiments, components shown in FIG. 5 that may not be specifically shown in FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 1B, computing system 140 includes data stores, including thread history 144, tag dictionary 150, entity graph 154, and thread classification prompt library 162, and sub-processes, including large language model 148, recommendation system 156, and domain application 158. These data stores and subprocesses supply inputs to various functional components of the computing system 140, including operations 142, 146, 152, 160, 164. The operations 142, 146, 152, 160, 164 provide inputs to functional component 166. The data stores, subprocesses, and functional components are embodied in one or more non-transitory machine-readable media such that they are accessible to one or more processors of the computing system 140 for execution by the one or more processors of the computing system 140.

Functional component 142 receives a user-generated thread portion. For example, functional component 142 obtains a user-generated thread portion, such as user-generated thread portion 120, via a thread-based user assistance interface, such as thread-based user assistance interface 118. The user-generated thread portion includes an associated user identifier (e.g., an account identifier, session identifier, network address, or device identifier), and an associated thread portion identifier. The user-generated thread portion also includes a timestamp, which indicates a date and time of receipt at functional component 142 or thread-based user assistance interface. Functional component 142 provides (e.g., passes or sends) the user-generated thread portion along with the applicable identifiers and timestamp data to functional component 166 and/or functional component 146.

Functional component 146 gets (e.g., fetches) one or more stored thread(s) that are related to the received user-generated thread portion. For example, functional component 146 searches thread history 144 for stored threads or thread portions that match the user identifier and have an associated timestamp that falls within a time interval that includes the timestamp of the received user-generated thread portion. In some implementations, the thread history 144 includes a text file that contains text of prior thread portions, such that functional component 146 executes a text search or string matching algorithm to determine whether the thread history 144 contains any threads or thread portions associated with the received user-generated thread portion. While not specifically shown, in some implementations, large language model 148 is used to divide the thread history 144 based on thread classifications and/or entity tags.

Match or matching as used herein may refer to an exact match or an approximate match, e.g., a match based on a computation of similarity between two pieces of data. An example of a similarity computation is cosine similarity. Other approaches that can be used to determine similarity between or among pieces of data include clustering algorithms (e.g., k means clustering), binary classifiers trained to determine whether two items in a pair are similar or not similar, and neural network-based vectorization techniques such as WORD2VEC. In some implementations, generative language models, such as large language models, are used to determine similarity of pieces of data.

Functional component 146 provides (e.g., passes or sends) any retrieved stored threads along with the applicable identifiers and timestamp data to functional component 166 and/or functional component 152.

Functional component 152 tags the received user-generated thread portion with entity tags obtained from tag dictionary 150. In some implementations, functional component 152 uses a large language model 148 (e.g., first large language model 108 or second large language model 116) to perform the entity tagging. For example, functional component 152 generates an entity tagging prompt, which contains one or more machine-readable instructions that instruct the large language model 148 to "tag entities in the received user-generated thread portion using the tag dictionary." In some implementations, the large language model 148 divides a dialog into threads based on the entity tagging. In other implementations, named entity recognition (NER) or another entity tagging approach can be used.

The tag dictionary 150 contains stored canonical entity names and associated data values (e.g., JobTitle:Software Engineer; Skill:Python; Company:Acme). The tag dictionary 150 is personalized to the user, e.g., customized dynamically based on thread history and/or thread context data, in some implementations. For example, if functional component 152 identifies a previously-unseen entity name in a received user-generated thread portion, functional component 152 adds the entity name to the tag dictionary 150 for potential use in subsequent rounds of online dialog.

In some implementations, the stored threads obtained from thread history 144 by functional component 146, which have been previously tagged by functional component 152, are used to update the tag dictionary 150 or as an input to the large language model 148 in association with the tagging prompt. For example, if the received user-generated thread portion contains an ambiguous word or phrase, such a reference to a previously-discussed entity or topic (e.g., "the third job" or "the last one I looked at"), functional component 152 searches the thread history 144 for an entity that matches the ambiguous phrase, and if a match is found, functional component 152 applies a tag to the ambiguous phrase based on the matching entity found in the thread history 144. Functional component 152 provides (e.g., passes or sends) the tagged user-generated thread portion to functional component 166 and/or functional component 160.

Functional component 160 gets (e.g., fetches) thread-related context data from one or more contextual resources based on the tagged user-generated thread portion. Examples of contextual resources shown in FIG. 1B include entity graph 154, recommendation system 156, and domain application 158. Examples of entity graph 154 include entity graphs 103, 105 of FIG. 1A. Examples of recommendation systems 156 include trained machine learning-based scoring models, ranking models, and/or classification models, such as job recommender models and connection recommender models. Examples of domain applications 158 include web-based applications that provide user ratings (e.g., company ratings) and social network services that provide user feedback, reactions, and/or comments on entities (e.g., social network services that allow users to react and/or comment on company posts).

As an example, functional component 160 traverses entity graph 154 for user connections to a company mentioned in the tagged user-generated thread portion. As another example, functional component 160 obtains a set of job recommendations from recommendation system 156 based on skills mentioned in the tagged user-generated thread portion. As still another example, functional component 160 searches a ratings system for ratings data based on a company name mentioned in the tagged user-generated thread portion. Functional component 160 provides (e.g., passes or sends) the retrieved thread-related context data to functional component 166.

Functional component 166 generates a thread classification prompt based on the output of one or more of the functional components 142, 146, 152, 160, 164. Functional component 166 provides (e.g., passes or sends) the generated thread classification prompt to a large language model (e.g., first large language model 108 of FIG. 1A).

An example of a thread classification prompt that may be generated by functional component 166 is shown in Table 1 below.

TABLE 1

| Example of thread classification prompt. |
| --- |
| # General instructions |
| Based on the user context, dialog history, category descriptions, classify the user input into 1 of the categories. # Context |
| user context: {memory.user_profile} dialog history: {memory.dialog} user input: {lastUserInput} categories: [job recommendations . . . ] category descriptions: job recommendations: questions on recommending relevant jobs to a user . . . # Output indicator |
| Desired format for the final answer: natural language text """ |

As shown in Table 1, the example thread classification prompt contains an instruction to classify the user input (e.g., the received user-generated thread portion). The example thread classification prompt also constrains the large language model to a set number of possible categories into which the user input is to be classified (e.g., the large language model is required to pick only one category), specifies the applicable thread context data (e.g., user profile, dialog history, previous user input, categories, and job recommendations), and specifies the output format for the thread classification to be produced by the large language model (e.g., natural language text). In some implementations, the design of prompt that provides specific instruction sections (e.g., general instruction, context, output indicator, etc.) improves the efficiency of the communications with the large language models, which in turn improves classification accuracy.

FIG. 1C is a flow diagram of an example method for generating a plan execution prompt using components of a directive generative thread-based user assistance system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a computing system 170, or by directive generative thread-based user assistance system 102 of FIG. 1A, including, in some embodiments, components shown in FIG. 1A that may not be specifically shown in FIG. 1C, or by components of directive generative thread-based user assistance system 580 of FIG. 5, including, in some embodiments, components shown in FIG. 5 that may not be specifically shown in FIG. 1C. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 1C, computing system 170 includes data stores, including thread history 176, entity graph 180, and plan library 188, and subprocesses, including large language model 172, recommendation system 182, and domain application 184. These data stores and subprocesses supply inputs to various functional components of the computing system 170, including operations 174, 178, 186, 190. The operations 174, 178, 186, 190 provide inputs to functional component 192. The data stores, subprocesses, and functional components are embodied in one or more non-transitory machine-readable media such that they are accessible to one or more processors of the computing system 170 for execution by the one or more processors of the computing system 170.

Functional component 174 gets a thread classification generated and output by large language model 172 (e.g., first large language model 108) in response to a thread classification prompt (e.g., a thread classification prompt generated by computing system 140 of FIG. 1B in response to a received user-generated thread portion). Functional component 174 provides (e.g., passes or sends) the thread classification along with the applicable identifiers and timestamp data to functional component 192 and/or functional component 178.

Functional component 178 gets (e.g., fetches) one or more stored thread(s) that are related to the received thread classification. For example, functional component 178 searches thread history 176 for stored threads or thread portions that match the received thread classification. In some implementations, the thread history 176 includes a text file that contains text of prior thread portions, such that functional component 178 executes a text search or string matching algorithm to determine whether the thread history 176 contains any threads or thread portions that match the received thread classification. Functional component 178 provides (e.g., passes or sends) any retrieved stored threads along with the applicable identifiers and timestamp data to functional component 192 and/or functional component 186.

Functional component 186 gets (e.g., fetches) thread-related context data from one or more contextual resources based on the thread classification and/or the retrieved stored threads. Examples of contextual resources shown in FIG. 1C include entity graph 180, recommendation system 182, and domain application 184. Examples of entity graph 180 include entity graphs 103, 105 of FIG. 1A. Examples of recommendation systems 182 include trained machine learning-based scoring models, ranking models, and/or classification models, such as job recommender models and connection recommender models. Examples of domain applications 184 include web-based applications that provide user ratings (e.g., company ratings) and social network services that provide user feedback, reactions, and/or comments on entities (e.g., social network services that allow users to react and/or comment on company posts).

As an example, functional component 186 traverses entity graph 180 for user connections to a company mentioned in the retrieved stored thread(s) based on the received thread classification. As another example, functional component 186 obtains a set of connection recommendations from recommendation system 182 based on the company mentioned in the retrieved stored thread(s). As still another example, functional component 186 searches a ratings system for ratings data based on the company name mentioned in the retrieved stored thread(s). Functional component 186 provides (e.g., passes or sends) the retrieved thread-related context data to functional component 192 and/or functional component 190.

Functional component 190 selects a plan (e.g., a multistep prompt) and gets (e.g., fetches) an associated plan template from plan library 188. Plans can be domain-specific or domain independent. Examples of plans that may be specific to the jobs domain include plans for assisting a user with a job search, assisting a user with writing a resume, assisting a user with preparing for an interview, or assisting a user with requesting a referral. Examples of domain-independent plans include generalized instructions such as an instruction to execute a search that contains placeholders for parameter values that can be obtained from, e.g., thread context data.

Functional component 192 maps the received thread classification (alone or in combination with data extracted from stored thread(s) or retrieved thread context) to a plan identifier and then retrieves the plan template that matches the plan identifier. Mapping as used herein may refer to an executable process such as a table lookup or a database search. In some implementations, functional component uses portions of stored thread(s) and/or retrieved thread context 186 to select a plan. For example, if the retrieved thread context indicates that the user has a first-degree connection at a company that is hiring for a job that the user is interested in, functional component 190 may select a plan to help the user request a referral rather than a plan to help the user write a resume or a plan to help the user prepare for an interview.

Functional component 192 generates a plan execution prompt based on the output of one or more of the functional components 174, 178, 186, 190. In some implementations, functional component 193 includes rewriting a prompt or sub-prompt in order to simplify the downstream job for the large language model. In some implementations, the functional component 193 includes instructions to perform specific steps of the plan online or offline, e.g., to conserve or optimize the use of computing resources. Functional component 192 provides (e.g., passes or sends) the generated plan execution prompt to a large language model (e.g., second large language model 116 of FIG. 1A).

An example of a plan execution prompt that may be generated by functional component 192 is shown in Table 2 below.

TABLE 2

Example of plan execution prompt.

\# General instructions

Call the job recommendation system.
Fetch the thread context data.
Match job recommendations from the job recommendation system with the thread context data.
Pick the best job recommendation based on the match.
Generate and output the best match job recommendation using conversational natural language and
a professional tone. Mention the user's name.
\# Output indicator Desired format for the final answer: natural language text
""""

As shown in Table 2, the example plan execution prompt instructs the generative model to generate a job recommendation, and contains multiple specific instructions to be executed by the large language model. The example plan execution prompt also includes the thread context data as a constraint, so that the large language model outputs a job recommendation based on the thread context data.

Another example of a plan execution prompt instructs the generative model to generate a job assessment. For instance, a job assessment prompt contains multiple sections that each contain one or more instructions such as: identify the task that generative model is to perform (e.g., "you are the Helper, a career coach and job-seeking assistant"), retrieve the user context (e.g., "get the user profile, user preferences, user conversation history, job and company information, comparison to other applicants," and generate the response (e.g., "based on the user context, provide an assessment of the job").

FIG. 1D is a block diagram of an example architecture for a computing system in accordance with some embodiments of the present disclosure. In the example architecture 194, a directive generative thread-based user assistance system can be implemented as one of the N vertical applications that are supported by the cross-modal generative AI platform, where N is a positive integer. For example, a generalized thread-based user assistance system can be implemented as vertical application 1, supported by the cross-modal generative AI platform. The generalized user assistance system can be configured for a specific domain via one or more plans. For example, a set of plans can be supplied to customize the generalized user assistance system for the jobs domain, or for the learning and education domain, or for the e-commerce domain, or for the entertainment or gaming domain, or for another domain.

Each of the vertical applications and related plans are supported by the cross-modal generative AI platform, which may be implemented using components described herein, such as large language models. As a result, the cross-modal generative AI platform can integrate thread-based modes of interaction with other modes of interaction, such as push notifications, pull notifications, feeds, and recommendations, in a seamless way. To do this, the thread-based directive generative AI platform combines multiple different modes of interaction via the cross-modal generative AI platform by maintaining the generalized application logic for managing global states and maintaining logical connections between or among the different interaction modes. For example, interactions of thread-based modes of interaction with other modes of interaction, such as push notifications, pull notifications, feeds, and recommendations and their respective statuses are tracked, updated and maintained by this cross-modal generative AI platform. For instance, a global state includes both (e.g., a union of) status information for specific plans and status information for vertical applications.

In some implementations, the cross-modal generative AI platform is configured to passively push personalized content to the user, understand user intent, sentiment, or objective (whether through explicit action or inaction) and proactively communicate with the user to offer timely suggestions and tune recommendations accordingly. The cross-modal generative AI platform potentially receives user feedback (e.g., impressions, views, reactions, etc.) across the multiple different interaction modes, all of which can be used to improve the generative AI platform through, for example, prompt engineering/refinement and/or model tuning.

In the specific context of job-related user assistance, the following is a scenario that could be implemented using the disclosed technologies: a user clicks on a "Jobs" tab of a vertical application. The directive generative thread-based user assistance system activates and asks the user for their job seeking goal. The directive generative thread-based user assistance system creates a plan, executes the plan using the generative AI platform, and surfaces relevant jobs in a conversational format with contextual highlighting, explanations, and recommended next steps provided by the generative AI platform. The generative AI output is based on past cross modal interactions, engagements, and other context. The generative AI output includes, for example, a user-personalized explanation of job recommendations. The user-customized generative AI output provides an explanation to help the user understand the reasons for the job recommendations if they aren't explicitly apparent to her. The phrasing and tone of the generative AI output encourages the user to provide feedback that can be used to improve future recommendations.

Figure 2A:
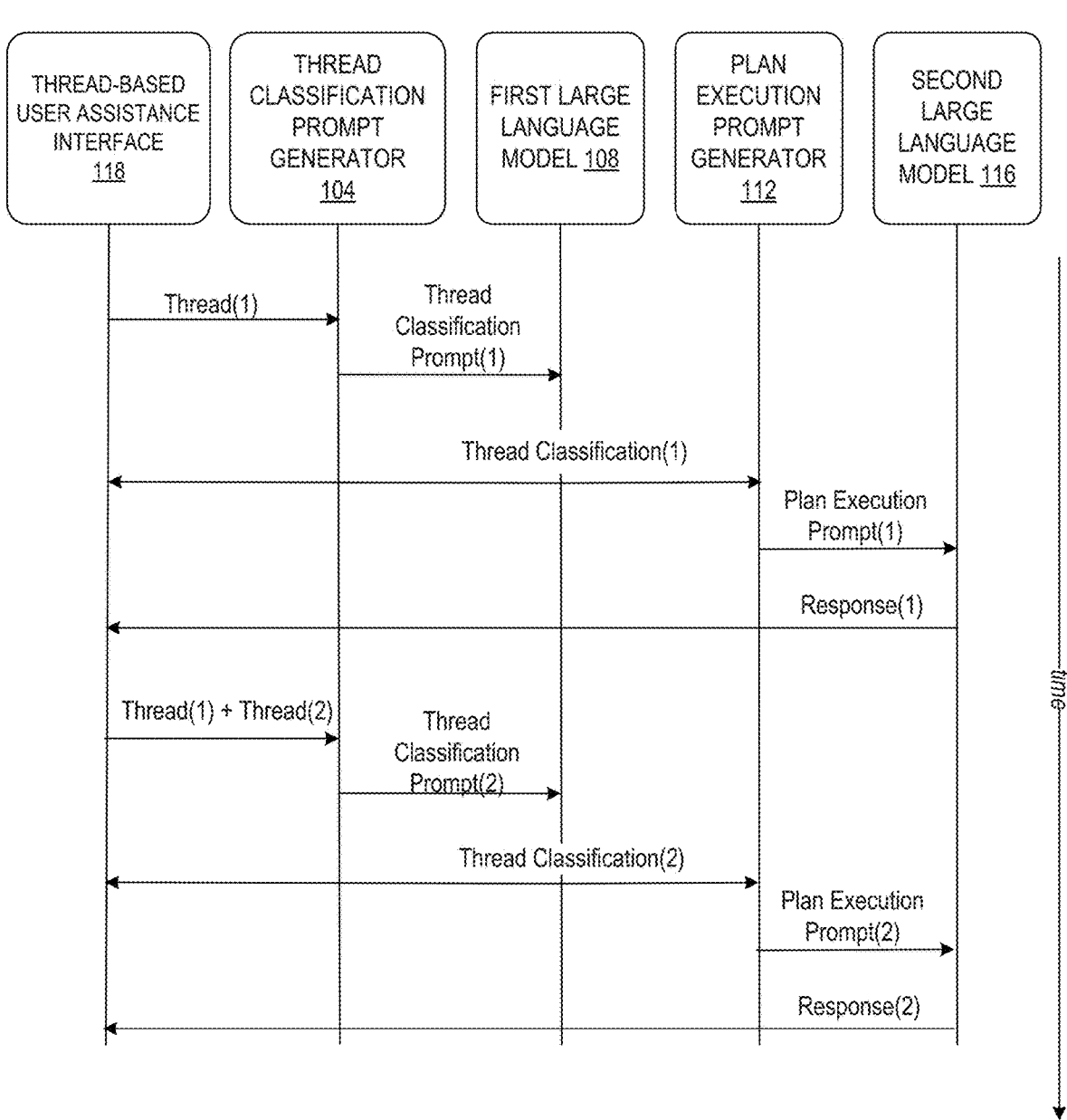
FIG. 2A is a timing diagram showing an example of communications between a thread-based user assistance interface and components of a directive generative thread-based user assistance system in accordance with some embodiments of the present disclosure.

FIG. 2A is a timing diagram showing an example of communications between a thread-based user assistance interface and components of a directive generative thread-based user assistance system in accordance with some embodiments of the present disclosure.

In FIG. 2A, the communications represented by labeled arrows occur in a temporal sequence, e.g., a thread(1) communication from thread-based user assistance interface 118 to thread classification prompt generator 104 occurs at a first time instance, and a classification prompt(1) communication from thread classification prompt generator 104 occurs at a second time instance that follows the first time instance. The communications between components shown in FIG. 2A include, for example, network communications and/or on-device communications. For example, all or portions of the thread-based user assistance interface 118, thread classification prompt generator 104, first large language model 108, plan execution prompt generator 112, and second large language model 116 can be implemented on a single device or across multiple devices.

In the example of FIG. 2A, multiple threads are classified, labeled and responded to using one or more large language models. Thread classification prompt generator 104 receives thread(1) via thread-based user assistance interface 118. In response to thread(1), thread classification prompt generator 104 generates and outputs thread classification prompt(1). First large language model 108 receives thread classification prompt(1) via thread classification prompt generator 104. First large language model 108 generates and outputs thread classification(1). Plan execution prompt generator 112 and thread-based user assistance interface 118 receive thread classification(1) via first large language model 108.

In response to thread classification(1), thread-based user assistance interface 118 may output a thread label based on thread classification(1), in association with a display of thread(1). In response to thread classification(1), plan execution prompt generator 112 generates and outputs a plan execution prompt(1). Second large language model 116 receives plan execution prompt(1) via plan execution prompt generator 112. In response to plan execution prompt (1), second large language model 116 generates and outputs a response(1). Thread-based user assistance interface 118 receives response(1) via second large language model 116 and displays response(1).

In response to a display of response(1), the thread-based user assistance interface 118 receives a thread(2). Thread classification prompt generator 104 receives thread(1) (e.g., from a data store) and receives thread(2) via thread-based user assistance interface 118. Based on thread(1) and thread (2), thread classification prompt generator generates and outputs thread classification prompt(2). First large language model 108 receives thread classification prompt(2) via thread classification prompt generator 104. In response to thread classification prompt(2), first large language model 108 generates and outputs thread classification(2).

In response to thread classification(2), thread-based user assistance interface 118 may output a thread label based on thread classification(2), in association with a display of thread(2). In response to thread classification(2), plan execution prompt generator 112 generates and outputs a plan execution prompt(2). Second large language model 116 receives plan execution prompt(2) via plan execution prompt generator 112. In response to plan execution prompt (2), second large language model 116 generates and outputs a response(2). Thread-based user assistance interface 118 receives response(2) via second large language model 116 and displays response(2).

The examples shown in FIG. 2A and the accompanying description, above are provided for illustration purposes. This disclosure is not limited to the described examples. Additional or alternative details and implementations are described herein.

Figure 2B:
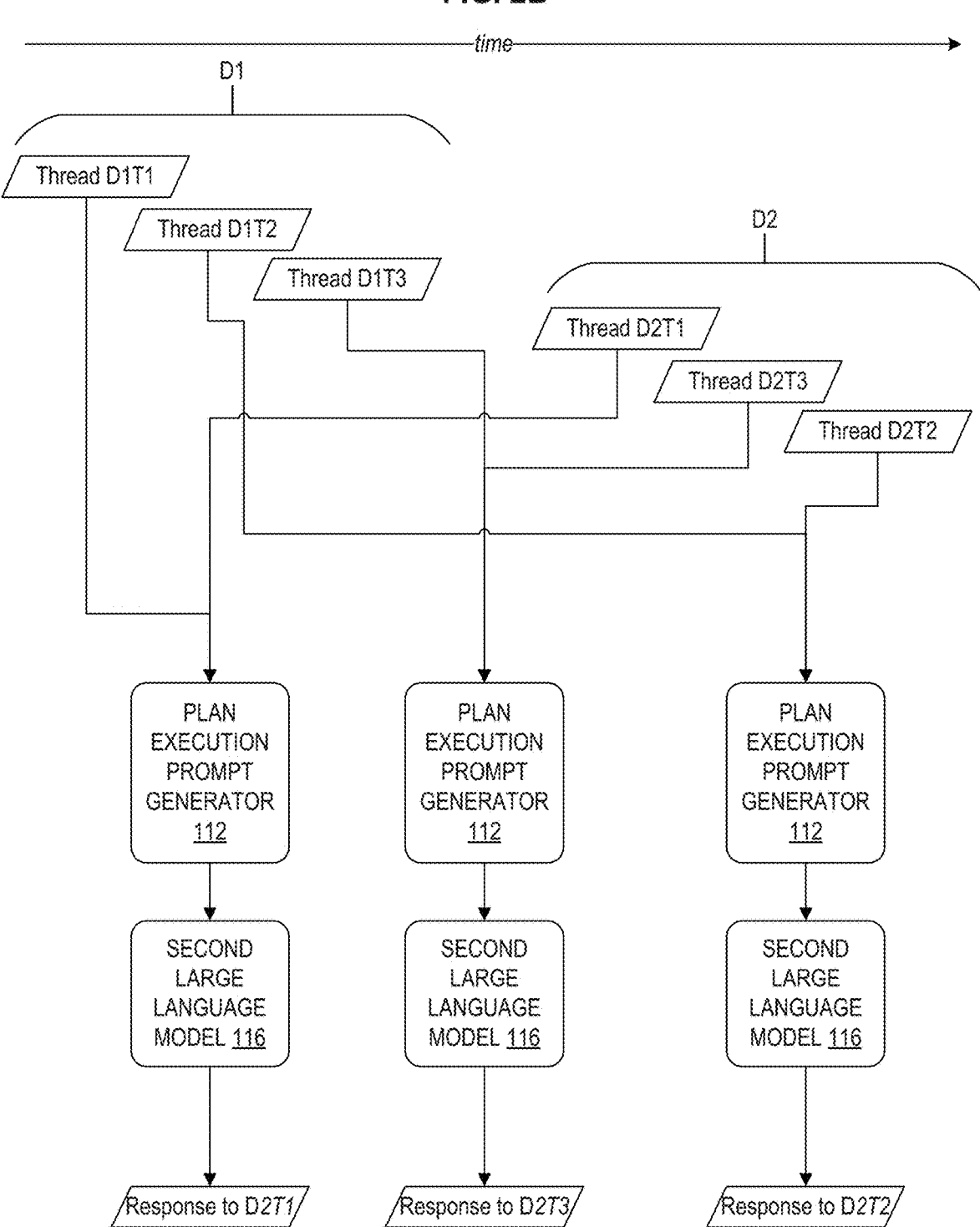
FIG. 2B is a timing diagram showing an example of using multiple threads to generate plan execution prompts in accordance with some embodiments of the present disclosure.

FIG. 2B is a timing diagram showing an example of using multiple threads to generate plan execution prompts in accordance with some embodiments of the present disclosure. In FIG. 2B, the communications represented by labeled arrows occur in a temporal sequence, e.g., a dialog D1 is started at a first time instance, and a dialog D2 is started at a second time instance that follows the first time instance.

In the example of FIG. 2B, dialog D1 includes three threads, e.g., thread C1T1, thread C1T2, and thread C1T3, while dialog D2 includes thread C2T1, thread C2T3, and thread C2T2. Each of the threads in each of the dialogs D1, D2 has been classified, e.g., by a large language model as described herein. For example, thread D1T1 has been classified as having a topic T1, thread D1T2 has been classified as having a topic T2, and thread D1T3 has been classified as having a topic T3, such that the dialog D1 contains three different threads covering three different topics. Similarly, the dialog D2 contains three different threads covering the same three topics but in a different order. In dialog D2, thread D2T1 has been classified as having the topic T1, thread D2T3 has been classified as having the topic T3, and thread D2T2 has been classified as having the topic T2.

All of the threads of each of dialog D1 and D2 are associated with the same user and as such, are stored as part of the same thread history. As such, when plan execution prompt generator 112 generates a plan execution prompt, plan execution prompt generator 112 searches the thread history for previous threads that match the current thread topic. For example, when plan execution prompt generator 112 generates the plan execution prompt for thread D2T1, it searches the thread history for previous threads that have been classified as having the topic T1. Since thread D1T1 matches the topic T1, both thread D1T1 and thread D2T1 are used to generate the plan execution prompt for thread D2T1. In response to the plan execution prompt for thread D2T1, which is based on both thread D1T1 and thread D2T1, second large language model 116 generates and outputs a response to thread D2T1.

Similarly, when plan execution prompt generator 112 generates the plan execution prompt for thread D2T3, it searches the thread history for previous threads that have been classified as having the topic T3. Since thread D1T3 matches the topic T3, both thread D1T3 and thread D2T3 are used to generate the plan execution prompt for thread D2T3. In response to the plan execution prompt for thread D2T3, which is based on both thread D1T3 and thread D2T3, second large language model 116 generates and outputs a response to thread D2T3.

Likewise, when plan execution prompt generator 112 generates the plan execution prompt for thread D2T2, it searches the thread history for previous threads that have been classified as having the topic T2. Since thread D1T2 matches the topic T2, both thread D1T2 and thread D2T2 are used to generate the plan execution prompt for thread D2T2. In response to the plan execution prompt for thread D2T2, which is based on both thread D1T2 and thread D2T2, second large language model 116 generates and outputs a response to thread D2T2.

In this way, the disclosed technologies are capable of effectively managing a long chronological chat even if the user references a topic they first mentioned several days ago. The disclosed technologies dynamically organize and label threads as they occur so that with multi-threaded dialogs, the user can see the how the topics change as the user scrolls through the dialog history. In some implementations, the disclosed technologies intelligently update the dialog header displaying the thread topic (e.g., job title and company/or company). The thread topic or label is not limited to text but can also or alternatively include icons or other non-text output. In this way, the disclosed technologies can intelligently group threads about particular topics, even if those threads are temporally spaced apart from one another (e.g., the threads occurred over multiple different login sessions, which may be hours or days apart from each other. The intelligent, dynamic thread labeling of the disclosed technologies also allows the user to search and filter threads for specific topics within the ongoing dialog without having to manage a list of individual dialogs or chats.

In some implementations, the disclosed technologies create user interface anchor mechanisms that are associated with the thread topics, such that each thread topic has its own anchor. The user can click on any anchor to return to a previous thread associated with the anchor. For example, if the dialog has covered multiple different topics but the user wants to return to a previous topic, the user can click on the anchor to quickly jump to the relevant portion of the dialog without having to scroll.

In some implementations, the disclosed technologies include the dynamic context header as well as a "focus" feature which removes or hides all parts of a thread that do not relate to the selected topic or the current topic. The focus feature provides a non-linear way to navigate a dialog while minimizing the need for scrolling, because the anchors are dynamically created and displayed, and the focus feature enables the member to jump into any topic in the dialog using the anchors. On top of this members will also have the ability to explicitly search by keyword or topic.

The examples shown in FIG. 2B and the accompanying description, above are provided for illustration purposes. This disclosure is not limited to the described examples. Additional or alternative details and implementations are described herein.

Figure 2C:
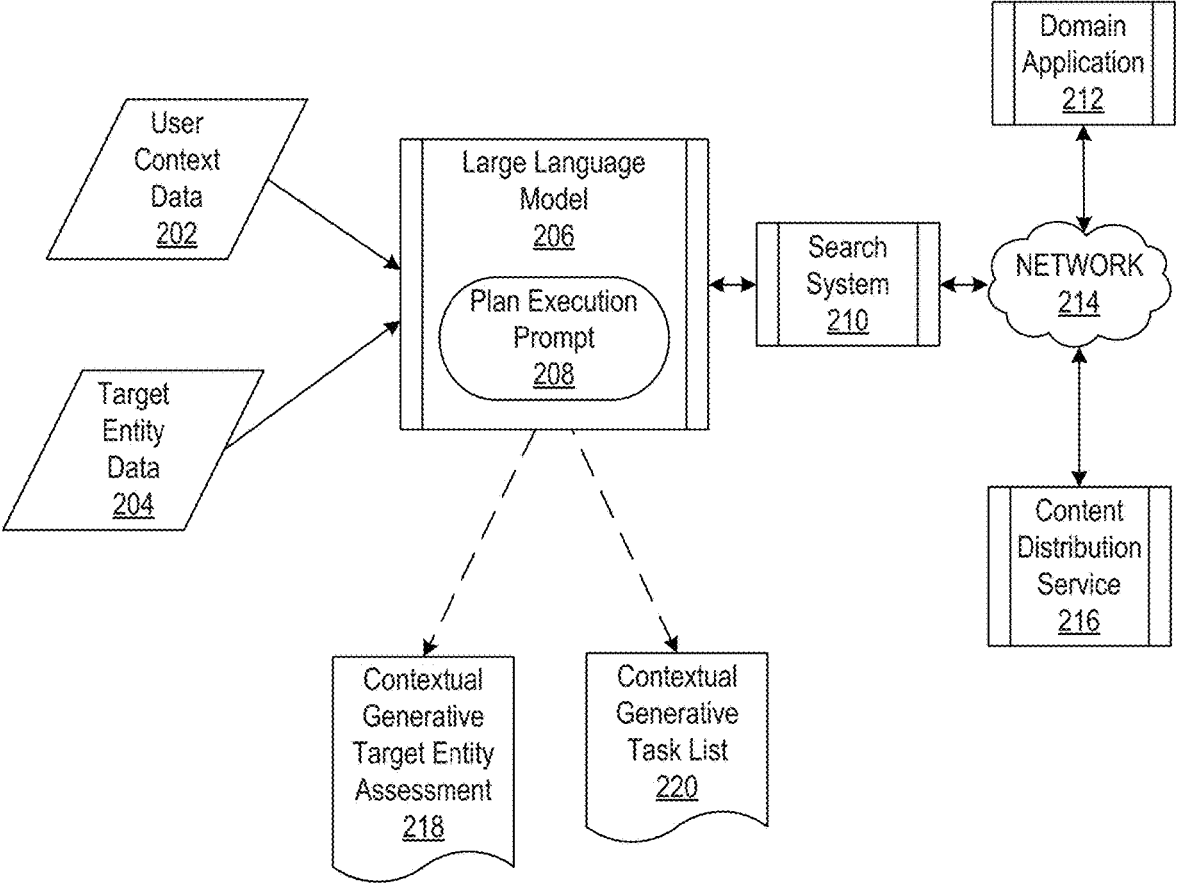
FIG. 2C is a flow diagram showing an example of contextual content generation by a generative model in accordance with some embodiments of the present disclosure.

FIG. 2C is a flow diagram showing an example of contextual content generation by a generative model in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a computing system 170, or by directive generative thread-based user assistance system 102 of FIG. 1A, including, in some embodiments, components shown in FIG. 1A that may not be specifically shown in FIG. 2C, or by components of directive generative thread-based user assistance system 580 of FIG. 5, including, in some embodiments, components shown in FIG. 5 that may not be specifically shown in FIG. 2C. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 2C, a plan execution prompt 208 is generated using the technologies described herein. A large language model 206 is applied to the plan execution prompt 208 such that input of the plan execution prompt 208 to the large language model 206 causes the large language model 206 to execute a multi-step plan to generate contextual output, e.g., to machine-generate a response to a user's request for information or assistance. The large language model 206 includes one or more generative models, such as one of the generative models described herein. The plan execution prompt 208 contains instructions that cause the large language model 206 to perform operations that include: obtaining user context data 202, obtaining target entity data 204, bi-directionally communicating with search system 210 to obtain external data that is potentially relevant to the target entity and/or the requesting user, matching the potentially relevant external data with the user context data 202 and/or the target entity data 204, based on the matching of the potentially relevant external data with the user context data 202 and/or the target entity data 204, determine to include or exclude any of the potentially relevant external data in output to be generated by the large language model 206, and generate and output one or more pieces of contextual output, such as a contextual generative target entity assessment and/or a contextual generative task list.

In the example of FIG. 2C, the user context data 202 includes, for example, user profile data, user activity data, user connection data, or other user-related information obtained from, e.g., a social network service. Examples of target entities include entities about which the user desires information or assistance, such as a job, a job posting, an item of commerce that the user is considering purchasing, etc. Other examples of target entities are concepts that the user wants to explore. For example, if the user has not yet found a job that they are interested in, the target entity might be a particular job title, career goal, objective, or intent.

The search system 210 includes, for example, a search engine such as an Internet search engine. The search engine 210 searches applications, services, and/or data sources that are connected to a network 214 for potentially relevant external data that matches one or more parameters specified by the large language model 206. For example, the large language model 206 executes an instruction of the plan execution prompt 206 that causes the large language model 206 to generate and output a search query based on the user context data and/or the target entity data 204.

The execution of the search query by the search system 210 returns potentially relevant external data from, e.g., one or more network-connected data sources such as one or more domain applications 212 and/or one or more target entity-related content distribution services. An example of a domain application is a network application or "app" that provides data or services related to the target entity data 204. For example, if the target entity is a job, examples of network applications include job ratings sites, message boards, and social media sites on which users post information and comments about jobs.

An example of a content distribution service 216 is a content distribution service related to the target entity data 204, such as a news site, news app, or news feed that distributes digital content related to the target entity data 204. For example, if the target entity is a job, examples of content distribution services include apps, sites, and feeds that distribute content about jobs and/or companies, such as business news services, start-up news services, etc.

As shown in FIG. 2C, generation of the contextual output, e.g., contextual generative target entity assessment 218 and/or contextual generative task list 220, by the large language model 206 effectively merges external data from the network 214 with user context data 202 (e.g., user profile data, user intent, etc.) and/or target entity data 204. For example, a job assessment, entity assessment, or task list is contextualized based on both the user context data 202 (e.g., profile data and/or the user's intent) and external data obtained from the network 214 via the search system 210. For instance, a user could be matched with a set of different job postings based on the user's profile data and/or intent, and then an assessment of a specific job can be contextualized to include external data obtained about the job or the hiring company, such as search data on typical starting salaries at the company, whether the company has recently received funding or the number of rounds of funding the company has received, the company's stock price, founder information, ratings, and current leadership. The external data can be used to modify the assessment. For example, if the external data conflicts with the user's context data, the assessment can be modified to conclude that the job would not be a good fit for the user instead of concluding that the job would be a good fit for the user. Similarly, if the external data does not conflict with the user's context data, the assessment can be modified to conclude that the job would be a good fit for the user instead of concluding that the job would not be a good fit for the user.

The contextual task list 220 can be generated based on a target entity or based on a more generalized intent, objective, or goal of the user. For example, in the jobs context, the contextual task list 220 can be configured as tool to help the user plan their career, job search, or strategically manage a job-specific application process. Job-specific examples are shown in the screen captures, e.g. task lists that contain items such as draft a resume for this job, help me prepare for an interview, etc.). An example of an intent-based task list 220 that is not focused on a specific job is as follows: suppose a user with a job title of Technical Program Manager matches with a senior level position at Company X. The technologies described herein evaluate entities related to the user (e.g., people in the user's network, skills that the user has and/or does not have, comparison of the user's resume to the job requirements, etc.) and generate a prompt that causes the large language model 206 to create a personalized strategic task list to assist the user with the overall job seeking process as opposed to the process of pursuing a specific identified job opportunity. The user context data 202 in this example can include user preferences such as explicit feedback provided by the user (e.g., "less jobs like that one, I want to manager AI teams."). In other embodiments, examples of the contextual task list 220 include lists of tasks to help the user accomplish another type of goal or objective, such as planning a wedding, applying to college, managing a project, or organizing a to-do list.

The examples shown in FIG. 2C and the accompanying description, above are provided for illustration purposes. This disclosure is not limited to the described examples. Additional or alternative details and implementations are described herein.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V illustrate an example of at least one flow including screen captures of user interface screens configured to provide directive generative thread-based user assistance in accordance with some embodiments of the present disclosure. In the user interfaces shown in FIG. 3A, FIG. 3B, FIG. 3C, FIG. 3D, FIG. 3E, FIG. 3F, FIG. 3G, FIG. 311, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V, certain data that would normally be displayed may be anonymized for the purpose of this disclosure. For instance, in a live example, the actual data and not the anonymized version would be displayed. For example, the text "JobTitle" would be replaced with an actual job title (e.g., software engineer) and "FirstName LastName" would be replaced with a user's actual name.

The user interfaces shown in FIG. 3A, FIG. 3B, FIG. 3C, FIG. 3D, FIG. 3E, FIG. 3F, FIG. 3G, FIG. 3H, FIG. 3I, FIG.

3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V are presented by an application software system, such as a user assistance system, to a user who wants their computing device to assist them with a task. In some implementations, the user interfaces are each implemented as a web page that is stored, e.g., at a server or in a cache of a user device, and then loaded into a display of a user device via the user device sending a page load request to the server. The icons and the selection and arrangement of elements shown in the user interfaces are copyright 2023 LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, audio-based user interface including an embedded audio system (e.g., microphone, speech processing software, and speaker) is used alternatively or in addition to a graphical user interface.

The user interfaces shown in FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V provide examples of capabilities of a directive generative thread-based user assistance system as described herein, including the ability to offer user-personalized recommendations to a user in the context of an online dialog. The online dialog multi-threading mechanisms described herein can enable the user to further engage in dialog with the user assistance system regarding related or subsequently relevant topics. For example, once the user assistance system has identified a job of potential interest to the user, the online dialog may shift to the topic of whether the user's skill set is a good match for that position. Subsequently, in the same dialog, once an assessment of the user's skill set to the job requirements has been done, then another thread may cover the topic of preparing the job application or updating the user's resume.

In some implementations, different contextual resources can be used in different ways in different threads of the online dialog. For example, in one thread, a recommendation system may be used to obtain a set of job recommendations which are included in a prompt such that a large language model is instructed to summarize the set of job recommendations based on the user's skill et. In another thread, the user's profile (e.g., web page) may be obtained from, e.g., a social network service or other application software system, and then the user's profile may be included in a prompt such that a large language model is instructed to generate a recommendation based on the user's profile.

In some implementations, output produced by one or more generative models of the directive generative thread-based user assistance system is generated using a particular tone, voice, or style. For instance, some implementations maintain a library of tones, voices, or styles that are accessible to the generative models, and the plan execution prompt can include an instruction to cause the generative model to select a tone, voice, and/or style from the tone library that matches the user context data. Examples of tones that can be included in the tone library include friendly, informative, perceptive, responsive, encouraging, collaborative, etc. For example, a prompt template can be formulated for the plan execution prompt that includes instructions to cause the generative model to obtain the user's feedback on the previous system-generated output, compute an evaluation metric that indicates how appropriate the tone, voice, or style used to generate the previous output was in view of the user's feedback, and then select a new tone, voice, or style if the value of the evaluation metric falls below a threshold value, where the threshold value is determined based on the requirements or design of a particular implementation. The generative model can be instructed to compute similar evaluation metrics and use them in similar ways for other aspects of the generative model output, such as relevance, accuracy, completeness, and personalization.

Figures 3A, 3B:
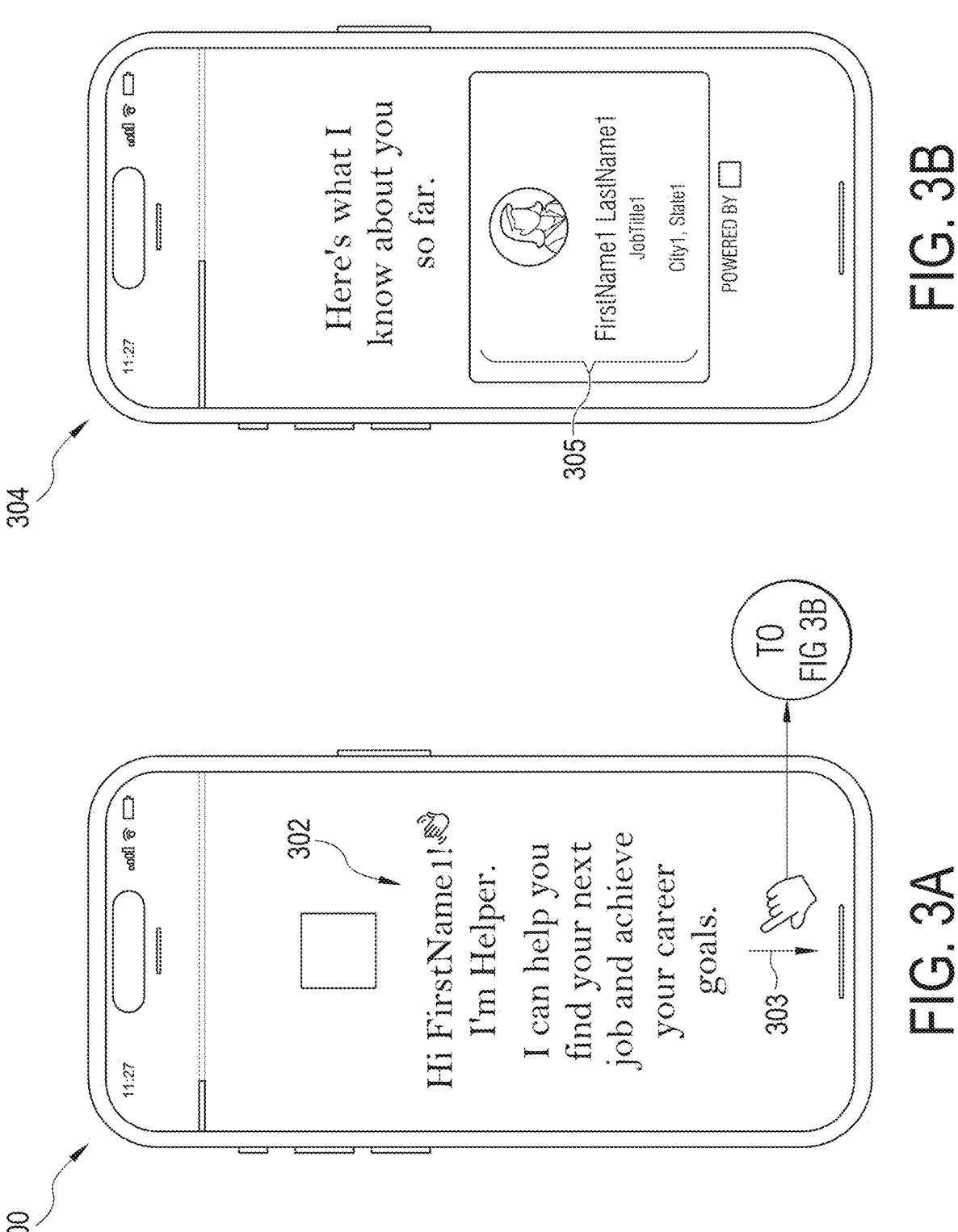

In FIG. 3A, a user interface 300 displays a system-generated thread portion 302. The system-generated thread 302 is machine-generated using portions of the technologies described herein to mention the user's name and invite the user to engage with the user assistance system in a conversational tone. The user interface 300 also includes a user interface control mechanism 303. Selection of the user interface control mechanism 303 causes a transition to user interface 304 of FIG. 3B.

In FIG. 3B, user interface 304 displays another system-generated thread portion, which has been generated, in response to the selection of the user interface control mechanism 303, using portions of the technologies described herein. The system-generated thread portion of user interface 304 includes user profile data 305 associated with the user, which has been retrieved via a contextual resource, e.g., an application software system, and incorporated into the system-generated thread portion.

Figure 3D:
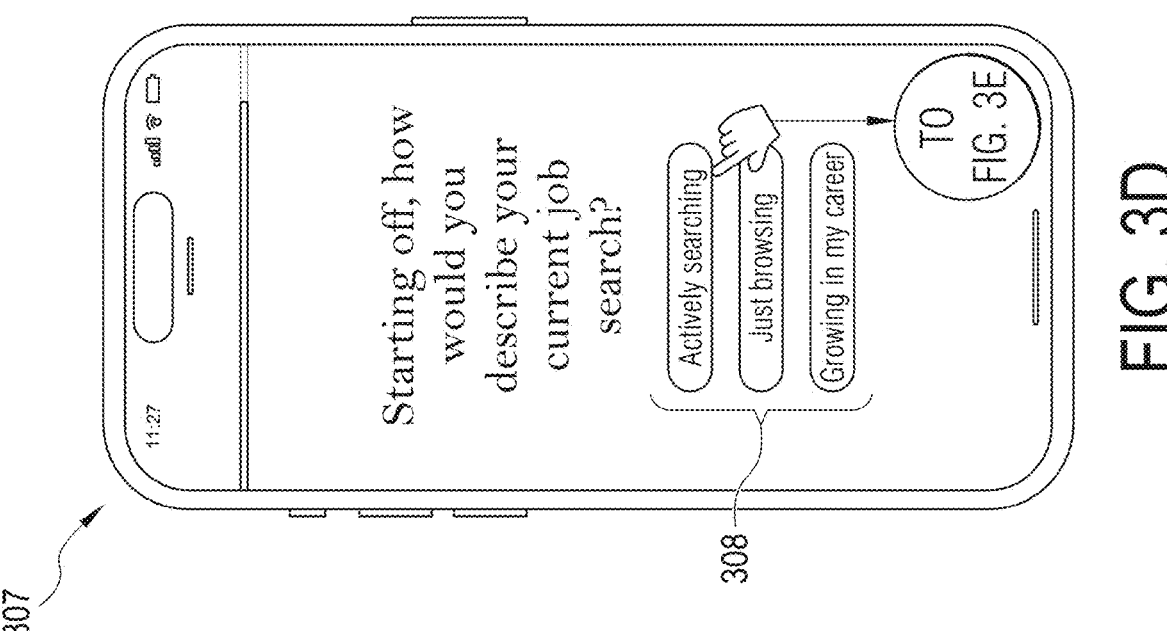
Figure 3C:
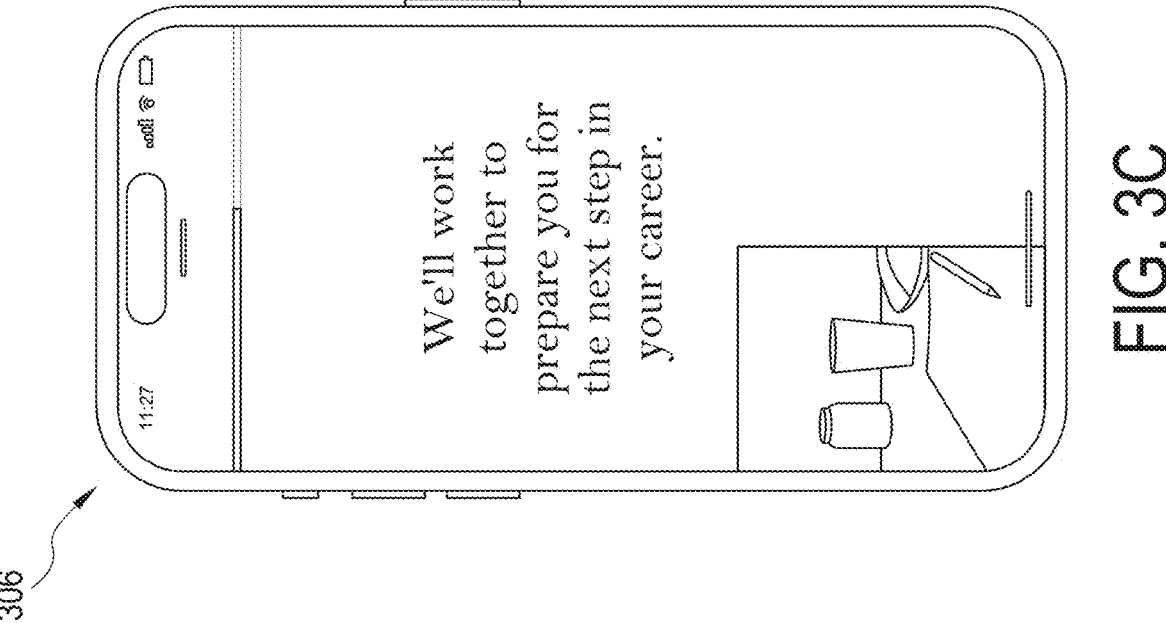

In FIG. 3C, user interface 306 displays another system-generated thread portion, which has been generated using portions of the technologies described herein. For example, the system-generated thread portion of user interface 306 is generated by applying a large language model to a prompt that includes an instruction to generate and output natural language text offering career development assistance using a collaborative tone.

In FIG. 3D, user interface 307 displays another system-generated thread portion, which has been generated using portions of the technologies described herein. For example, the system-generated thread portion of user interface 307 includes a question and a set of selectable actions 308 generated by applying a large language model to a prompt that includes an instruction to generate and output natural language text asking the user for information about their current objective. Selection of the "Actively searching" selectable action 308 causes a transition to user interface 309 of FIG. 3E.

Figure 3F:
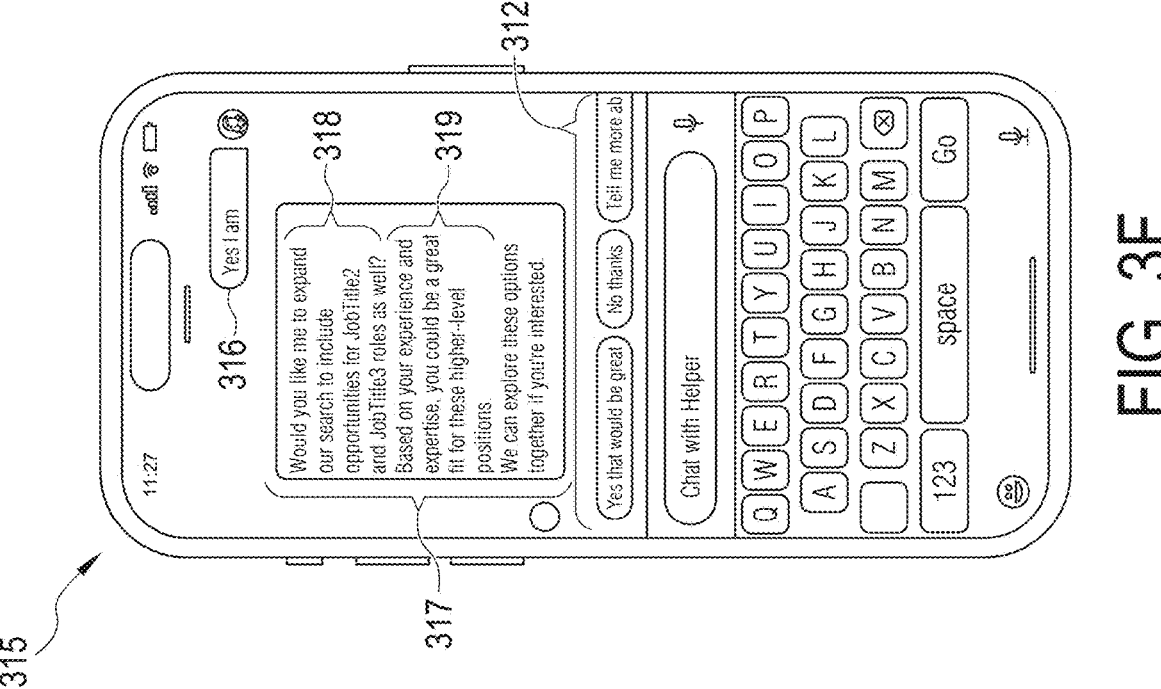
Figure 3E:
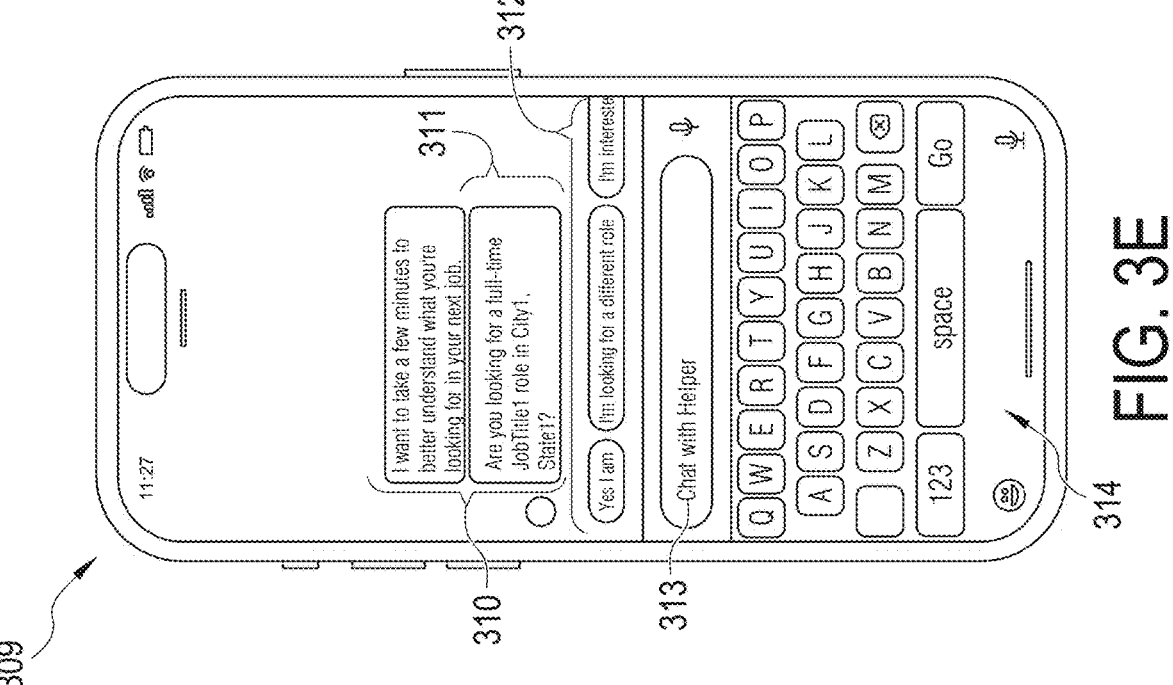

In FIG. 3E, user interface 309 displays another system-generated thread portion 310, which has been generated using portions of the technologies described herein. For example, the system-generated thread portion 310 includes a conversational explanation and a question 311, which are generated by applying a large language model to a prompt that includes an instruction to generate and output natural language text asking the user for information about the type of job they are seeking. The question 311 includes user-specific details that have been obtained from one or more contextual resources, such as stored thread history or the user's job search history. User interface 209 also includes a set of selectable template user responses 312, an input box 313 configured to receive user input (e.g., text input or voice input that the system converts to text), and a user input device such as a keyboard or keypad 314.

In FIG. 3F, user interface 315 displays a user-generated thread portion 316 and another system-generated thread portion 317. The system-generated thread portion 317 has been generated, in response to the user-generated thread portion 316, using portions of the technologies described herein. For example, the system-generated thread portion 317 of user interface 315 includes a question 318 generated by applying a large language model to a prompt that includes the job entity (Tax Consultant) mentioned in the previous thread portion 311, since the user-generated thread portion 316 included an affirmative response to the previous thread portion, e.g., question 311. The system-generated thread portion 317 of user interface 315 also includes a user-personalized job assessment 319. The user-personalized job assessment 318 is machine-generated and output by a large language model based on a plan execution prompt supplied to the large language model that contains an instruction to compare the user's experience to the job descriptions associated with the job titles mentioned in the question 311.

Figure 3H:
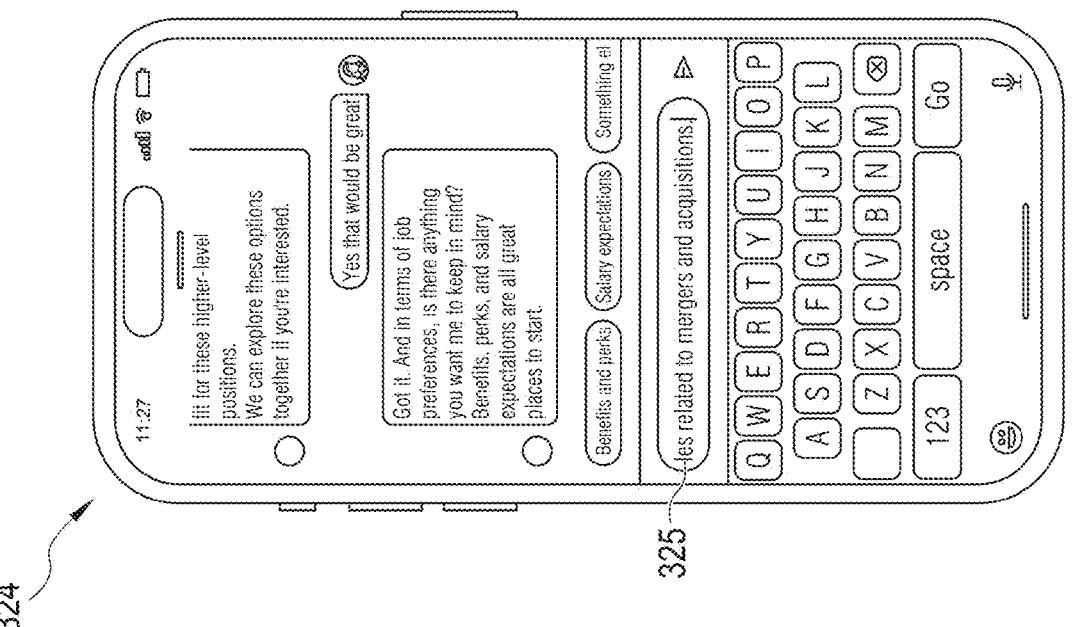
Figure 3G:
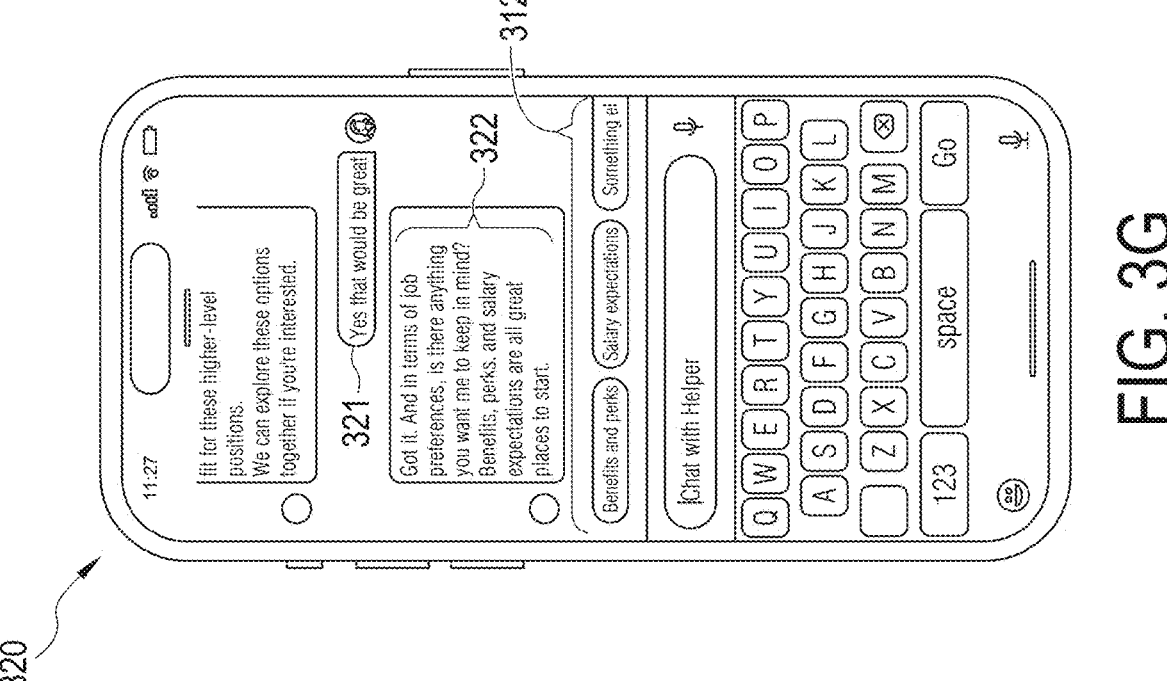

In FIG. 3G, user interface 320 displays a user-generated thread portion 321 and another system-generated thread portion 322. The system-generated thread portion 322 has been generated, in response to the user-generated thread portion 321 and the previous thread history, using portions of the technologies described herein. For example, the system-generated thread portion 322 of user interface 320 includes a question generated by applying a large language model to a prompt that requests additional user preferences. User interface 320 also includes a set of user-selectable response options 312.

FIG. 3H displays a user interface 324. User interface 324 illustrates that the user did not select any of the response options 312 of FIG. 3G but did input additional user-specific preferences 325 into an input box using an input mechanism such as the keypad or microphone.

Figure 3J:
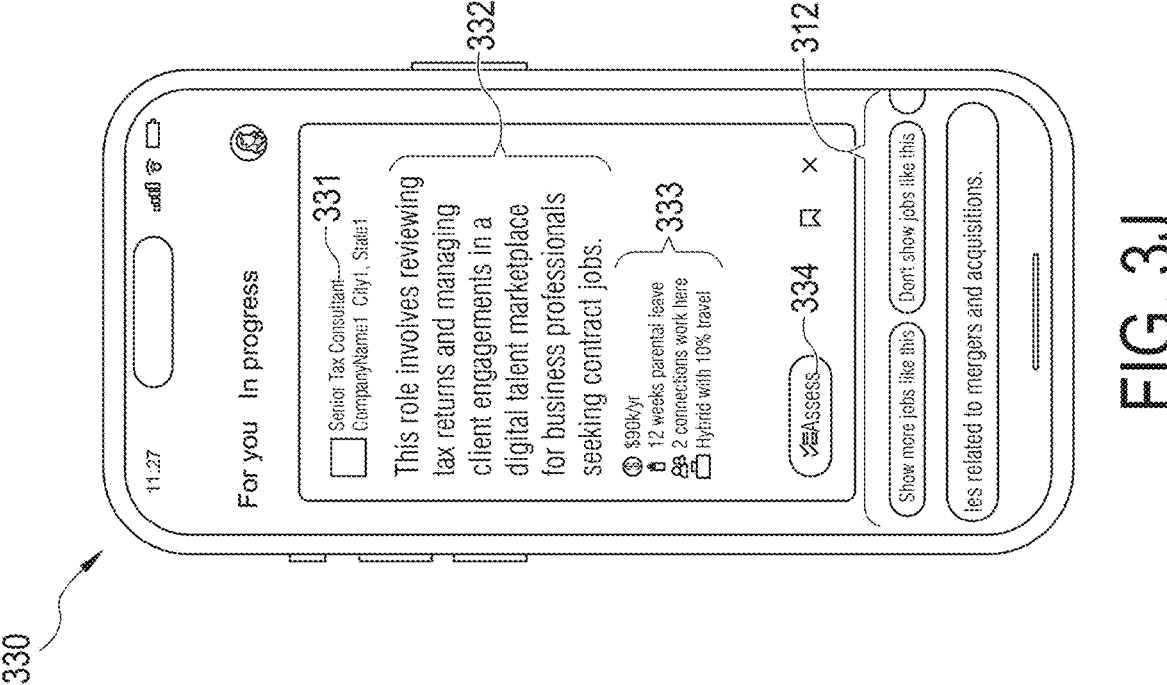
Figure 3I:
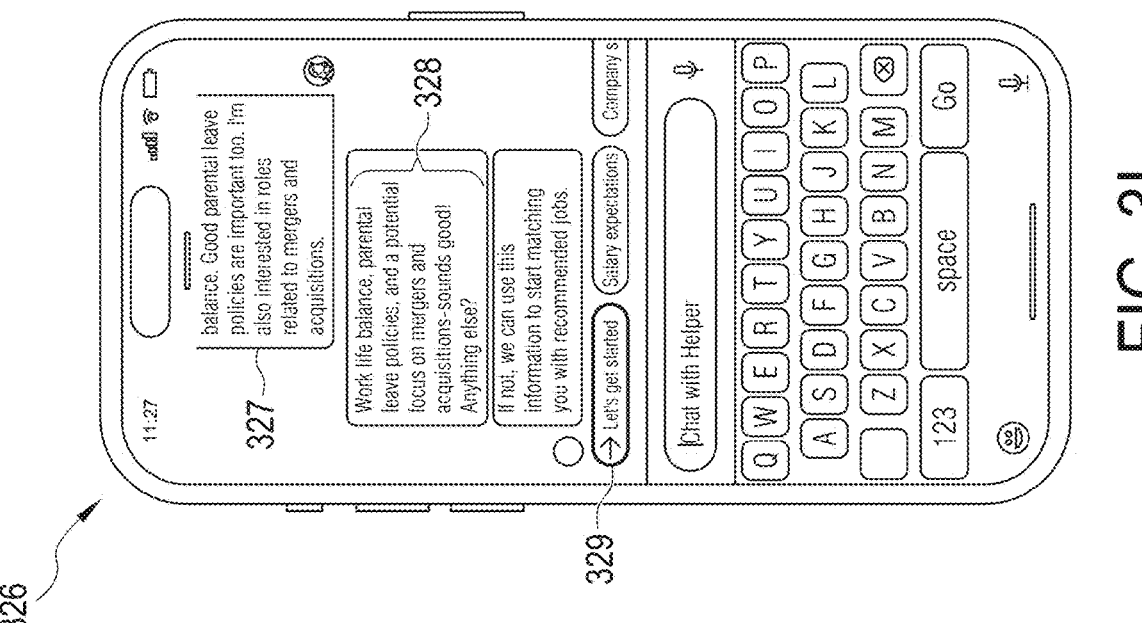

In FIG. 3I, user interface 326 displays a user-generated thread portion 327, which includes the preferences 325, another system-generated thread portion 328, and a user-selected option 329. The system-generated thread portion 328 has been generated, in response to the user-generated thread portion 327 and the previous thread history, using portions of the technologies described herein. For example, the system-generated thread portion 328 of user interface 326 includes a question generated by applying a large language model to a prompt that requests additional user preferences and also includes the user preferences contained in user-generated thread portion 327, which can be retrieved from the thread history.

In FIG. 3J, user interface 330 displays a system-generated thread portion, which includes a link to a job posting 331, system-generated thread portion that includes an LLM-generated user-personalized summary 332, 333 of the job posting 331. The system-generated thread portion 332, 333 has been generated by applying a large language model to a prompt that instructs the large language model to summarize the job posting 331 based on the user preferences contained in the thread history. In generating the system-generated thread portion 332, 333, calls are made to one or more contextual resources such as a social network service and a ratings system. For example, a call is made to a social network service to determine how many connections the user has that work at the company that posted the job. User interface 330 also includes an assess user interface control mechanism 334 and a set of user-selectable options 312. The set of user-selectable options is updated dynamically as the thread classification changes.

Figures 3K, 3L:
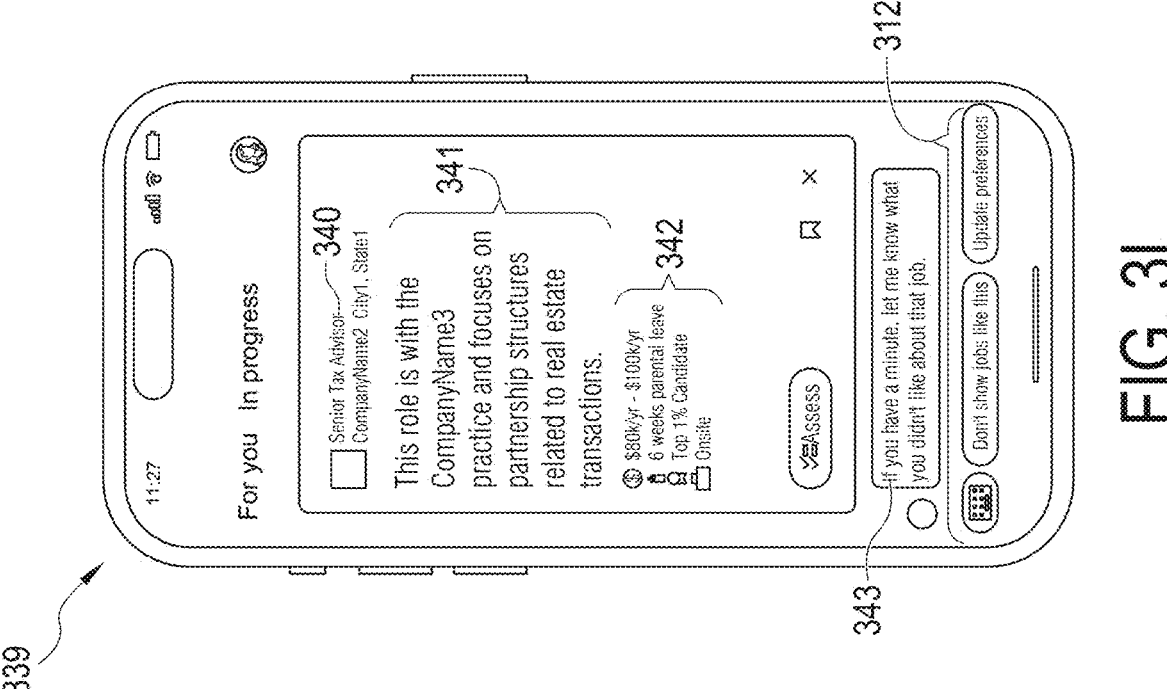

In FIG. 3K, user interface 335 displays a thread classification label 336, a user-generated thread portion 337, a system-generated thread portion 338, and the set of user-selectable options 312. The thread classification label 336 is dynamically generated using the disclosed technologies, e.g., by generating a thread classification prompt based on the thread history and applying a large language model to the thread classification prompt. The system-generated thread portion 338 has been generated by applying a large language model to a prompt that instructs the large language model to respond to the user-generated thread portion 337.

In FIG. 3L, user interface 339 displays a system-generated thread portion that includes a link to a job posting 340 (a different job posting than the one previously displayed), a user-personalized summary 341, 342 of the job posting 340. The user-personalized summary is dynamically generated using the disclosed technologies, e.g., by generating a plan execution prompt including parameter values retrieved from one or more contextual resources, and applying a large language model to the plan execution prompt. User interface 339 also includes a system-generated thread portion 343, which is based on the thread history, e.g., the user-generated thread portion 337. In response to the user's rejection of the first job recommendation (Senior Tax Consultant, too much travel), the user-selectable options 312 are dynamically updated.

Figure 3N:
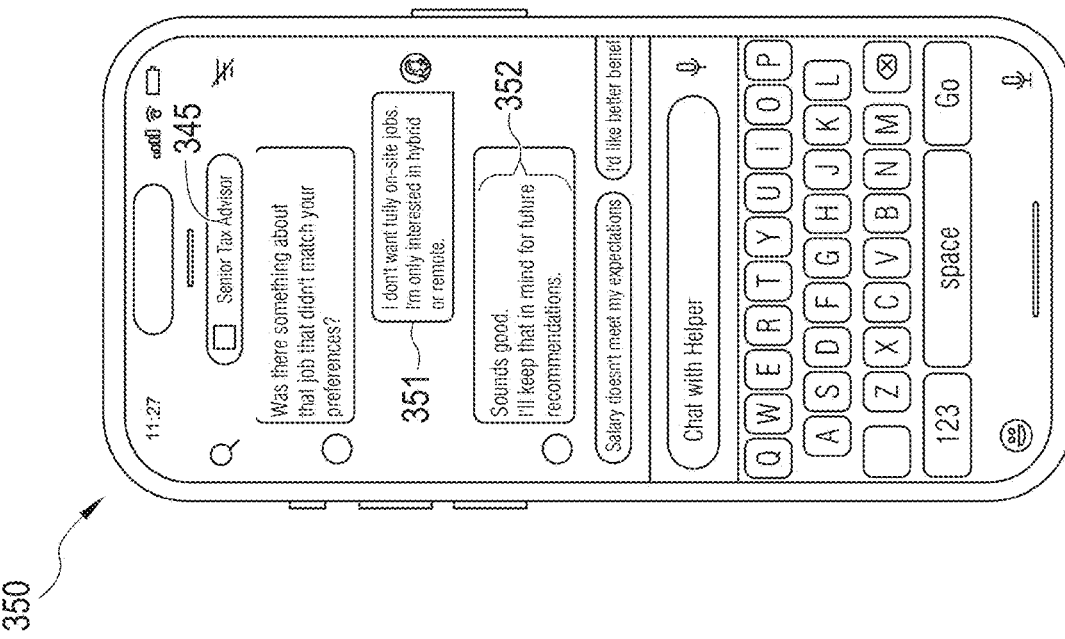
Figure 3M:
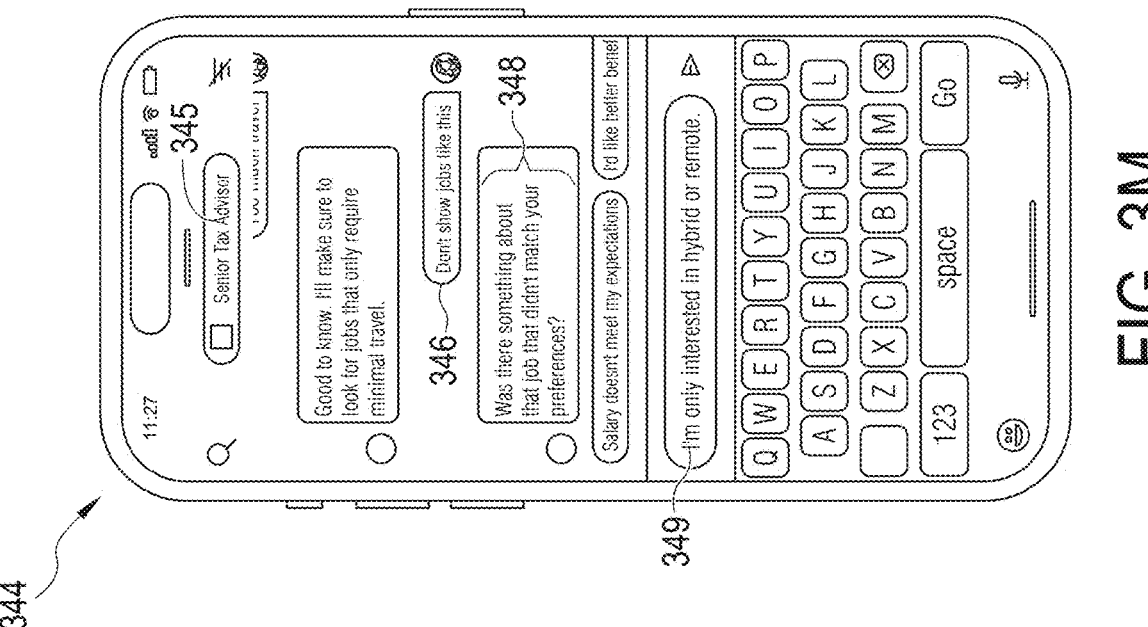

In FIG. 3M, user interface 344 displays a user-generated thread portion 346, a system-generated thread portion 348 that is responsive to the user-generated thread portion 346, and input of a user-generated thread portion 349. User interface 344 also displays a thread classification label 345. The thread classification label 345 is different from the thread classification label 336 because the system has determined that the thread topic has changed from Senior Tax Consultant to Senior Tax Advisor.

In FIG. 3N, user interface 350 displays a user-generated thread portion 351, a system-generated thread portion 352 that is responsive to the user-generated thread portion 351, and the thread classification label 345.

Figure 3P:
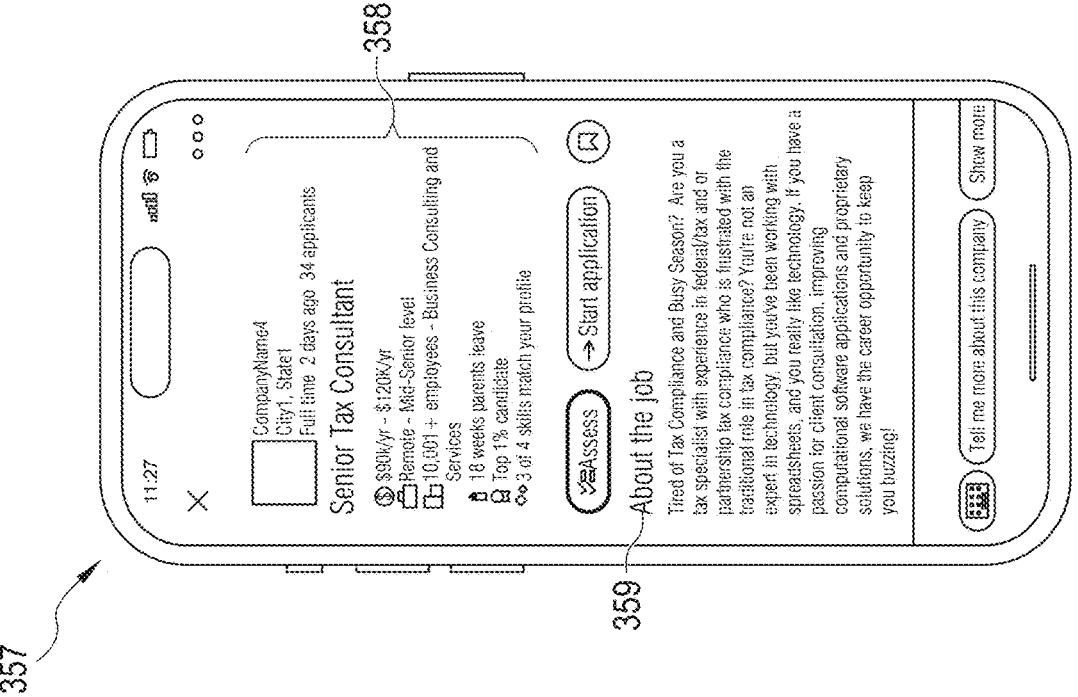
Figure 3O:
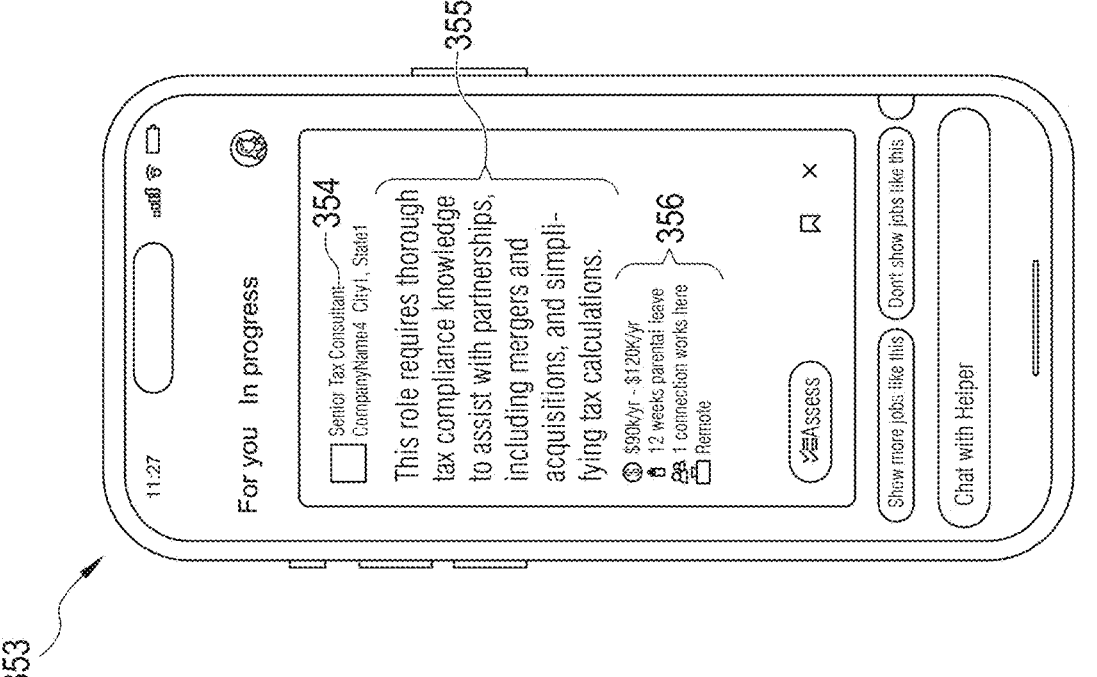

In FIG. 3O, user interface 353 displays a system-generated thread portion that includes a link to a job posting 354, a user-personalized summary of the job posting 355, 356. The system-generated thread portion of user interface 353 is generated using the disclosed technologies, for example by applying a large language model to a plan execution prompt that includes one or more parameter values obtained from one or more contextual resources.

In FIG. 3P, user interface 357 displays a system-generated thread portion that includes a link to a company profile, a user-personalized summary of a job posting 358, and a job description 359 obtained from a company profile page. The system-generated thread portion of user interface 353 is generated using the disclosed technologies, for example by applying a large language model to a plan execution prompt that includes one or more parameter values obtained from one or more contextual resources.

Figure 3R:
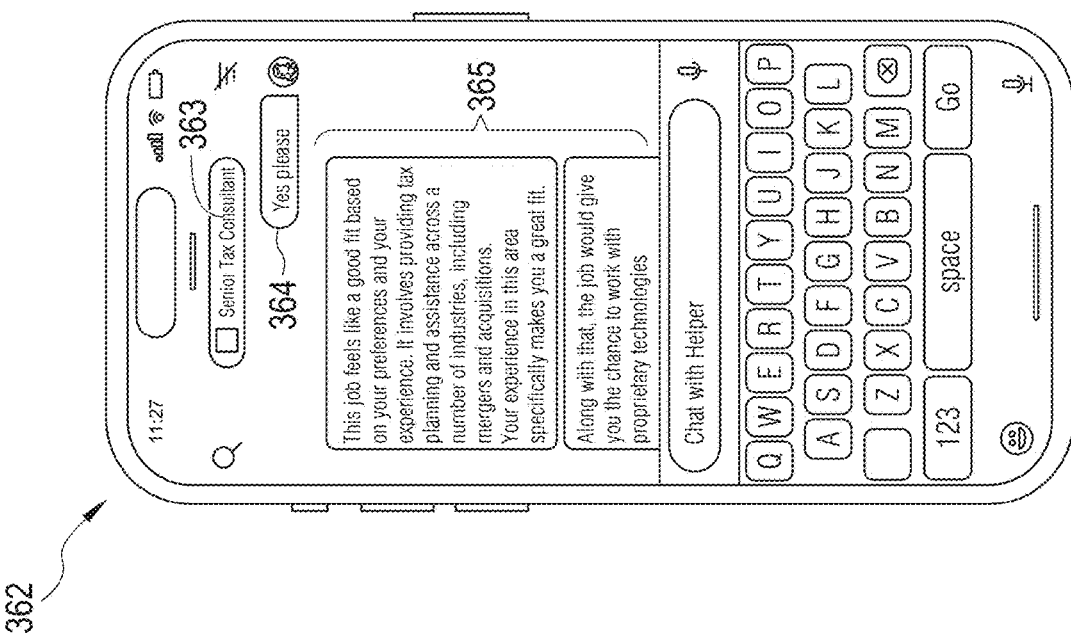
Figure 3Q:
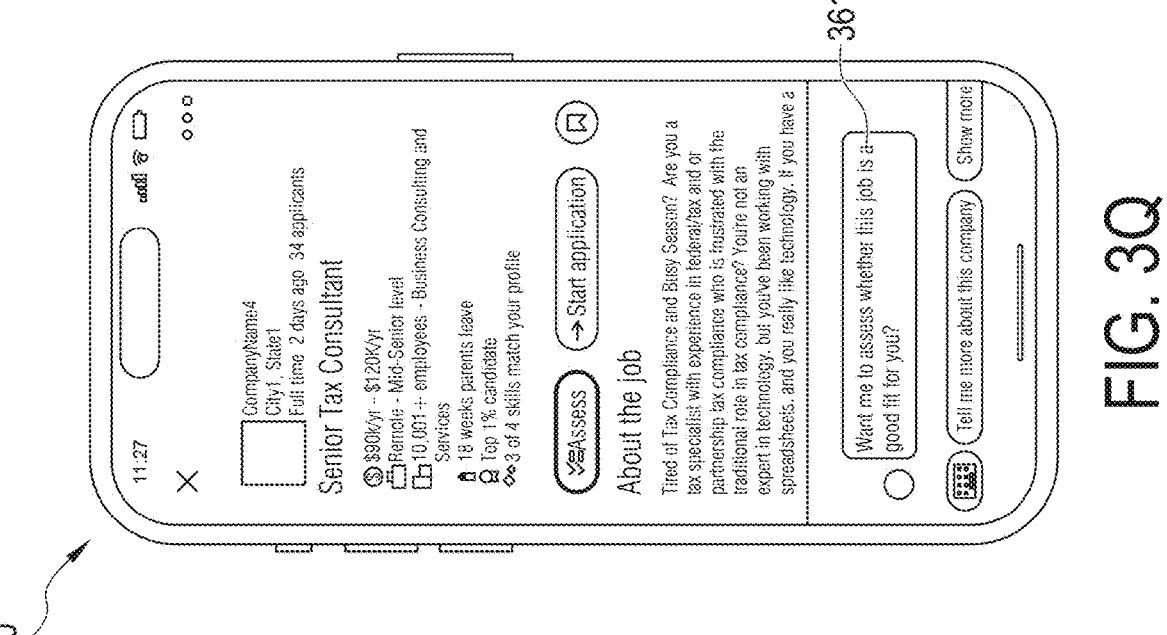

In FIG. 3Q, user interface 360 displays a system-generated thread portion 361. The system-generated thread portion 361 is generated using the disclosed technologies, for example by applying a large language model to a plan execution prompt that instructs the large language model to generate natural language output asking the user if they would like the system to generate a personalized assessment based on the thread history, e.g., the job posting 358 including the job description 359 obtained from the company profile page.

In FIG. 3R, user interface 362 displays a system-generated thread classification label 363, a user-generated thread portion 364, and a system generated thread portion 365. The system-generated thread portion 365 is generated, in response to the user-generated thread portion 364, using the disclosed technologies, for example by applying a large language model to a plan execution prompt that instructs the large language model to generate a user-personalized assessment of the job posting 358 including the information 359 obtained from the company profile page. The plan execution prompt includes, for example, an instruction to the large language model to match the job posting and company profile to the user's preferences obtained from the thread history, skills and experience obtained from the user's profile page, etc.

In FIG. 3S, user interface 366 displays a system-generated thread classification label 367, and a system-generated thread portion 368. The system-generated thread portion 368 is generated using the disclosed technologies, for example by applying a large language model to a plan execution prompt that instructs the large language model to generate a question.

In FIG. 3T, user interface 369 displays a system-generated thread classification label 370, a user-generated thread portion 371, a system-generated thread portion 372, and a selected user option 373. The system-generated thread portion 372 is generated, in response to the user-generated thread portion 371, using the disclosed technologies, for example by applying a large language model to a plan execution prompt that instructs the large language model to summarize employee reviews for the company associated with the job posting 358. For example, the plan execution prompt instructs the large language model to obtain the employee reviews from an external application such as a job review site or search engine, and machine-generate and output a summary of the employee reviews retrieved from the external application.

Figure 3V:
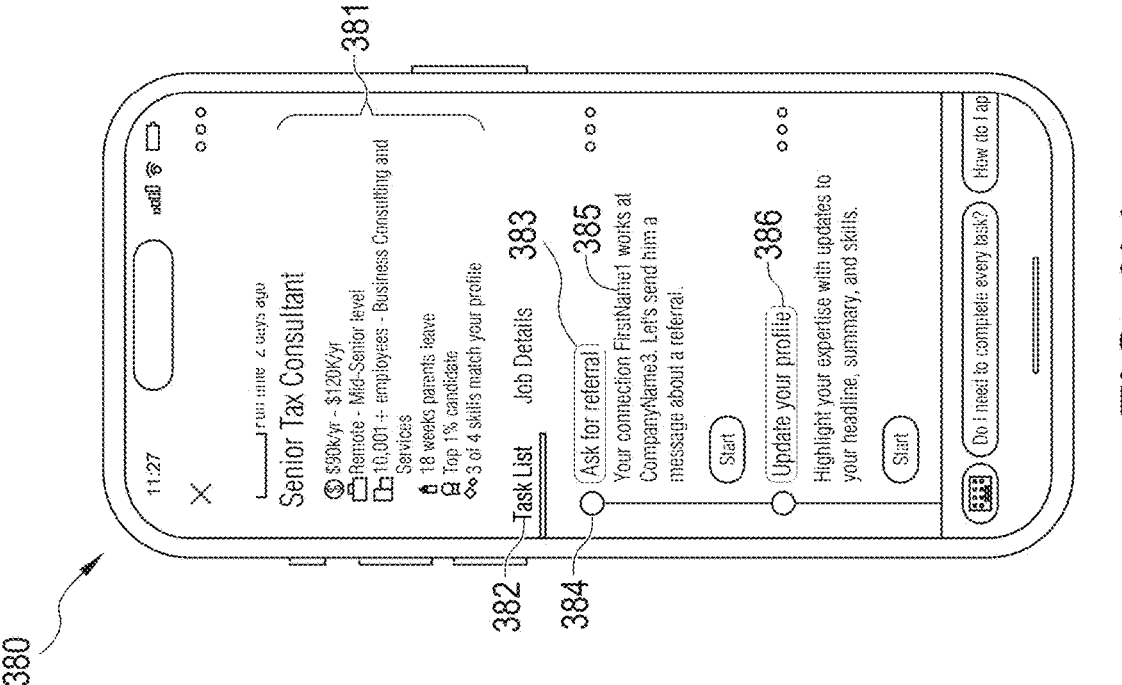
Figure 3U:
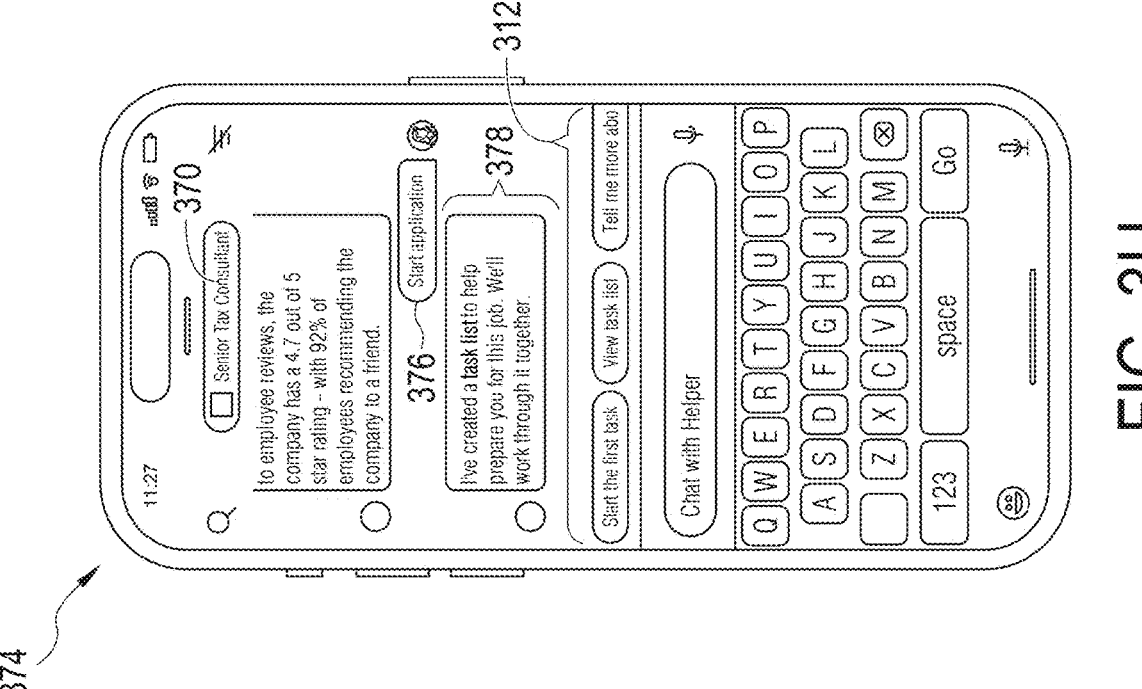

In FIG. 3U, user interface 374 displays system-generated thread classification label 370, a user-generated thread portion 376, a system-generated thread portion 378, and a set of user-selectable options 312. The system-generated thread portion 378 is generated, in response to the user-generated thread portion 376, using the disclosed technologies, for example by applying a large language model to a plan execution prompt that instructs the large language model to generate a user-personalized task list for applying to the job posting 358. For example, the plan execution prompt instructs the large language model to generate and output recommended next steps based on the current state of the user's job search (determined, e.g., based on the thread history), the match between the user's skills and the requirements of the job, and potentially other information obtained from one or more contextual resources.

In FIG. 3V, user interface 380 displays system-generated thread portion 381 (e.g., a job posting), and a task list 382 generated in response to the prior thread history (e.g., thread portions 376, 378). The task list 382 includes tasks 383 and 386. Each task 383 has a task description (e.g., task description 385), and a check box 384. The task list 382 is generated, using the disclosed technologies, for example by applying a large language model to a plan execution prompt that instructs the large language model to generate a user-personalized task list for applying to the job posting 381. For example, the plan execution prompt instructs the large language model to generate, output, and rank or prioritize recommended next steps based on the current state of the user's job search (determined, e.g., based on the thread history), the match between the user's skills and the requirements of the job, and potentially other information obtained from one or more contextual resources. For example, the system has obtained information from a social network service that indicates that the user has a connection that works at the company who posted the job 381. Accordingly, the ask for referral task 383 is ranked higher than the update your profile task 386, such that the ask for referral task 383 is positioned higher than the update your profile task 386 in the task list 382.

The user interface flows shown in FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V illustrate an example of a multi-threaded online dialog and how the disclosed technologies can constrain the operation of the large language model in the context of the multi-threaded online dialog, including performing dynamic thread classification and labeling.

The examples shown in FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 3U, and FIG. 3V, and the accompanying description, above, are provided for illustration purposes. For example, while the examples are illustrated as user interface screens for a smaller form factor such as smart phones, tablet computers, and wearable devices, the user interfaces can be configured for other forms of electronic devices, such as desktop computers and/or laptop devices. This disclosure is not limited to the described examples. Additional or alternative details and implementations are described herein.

Figures 4A, 4B:
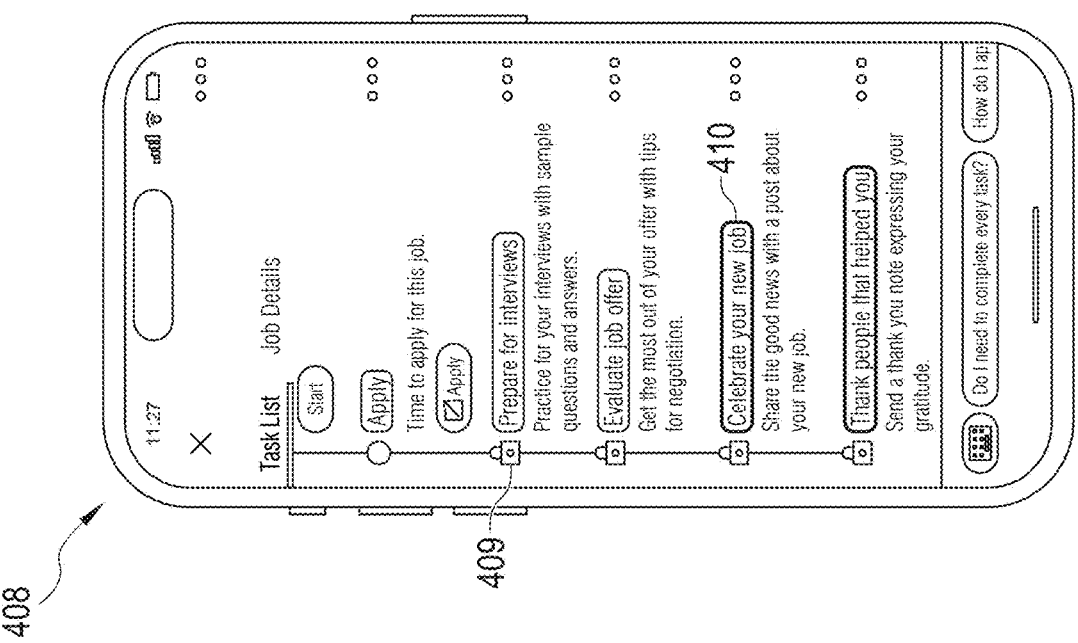
FIG. 4A and FIG. 4B illustrate an example of at least one flow including screen captures of user interface screens configured to provide directive generative thread-based user assistance in accordance with some embodiments of the present disclosure.

FIG. 4A and FIG. 4B illustrate an example of at least one flow including screen captures of user interface screens configured to provide directive generative thread-based user assistance in accordance with some embodiments of the present disclosure.

The figures FIG. 4A and FIG. 4B illustrate a user interface flow or sequence of user interface views that can be presented to a user to assist the user by machine-generating and outputting one or more customized task lists. Each of the figures FIG. 4A and FIG. 4B illustrates an example of a user interface screen that can be used to manage tasks associated with a job search using directive generative thread-based technologies described herein.

In the user interfaces shown in FIG. 4A and FIG. 4B, certain data that would normally be displayed may be anonymized for the purpose of this disclosure. In a live example, the actual data and not the anonymized version would be displayed. For example, the text "JobTitle" would be replaced with an actual job title (e.g., software engineer) and "FirstName LastName" would be replaced with a user's actual name.

The user interfaces shown in FIG. 4A and FIG. 4B are presented by an application software system, such as user assistance system, to a user who wants to use their computing device to obtain assistance with a task. In some implementations, the user interfaces are each implemented as a web page that is stored, e.g., at a server or in a cache of a user device, and then loaded into a display of a user device via the user device sending a page load request to the server. The icons and the selection and arrangement of elements shown in the user interfaces are copyright 2023 LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language audio received via a microphone embedded in a computing device.

FIG. 4A illustrates an example of a screen capture of a user interface 402 for displaying elements of a task list that has been machine-generated using one or more large language models. The task list of user interface 402 includes a task 404, a task 406, and user-selectable options 312. In some implementations, the tasks are ranked or color coded based on data obtained from one or more contextual resources. For example, in some implementations, the task list is generalized (e.g., not related to a specific job or other entity) while in other implementations the task list is entity-specific.

FIG. 4B illustrates an example of a screen capture of a user interface 408 for displaying elements of a task list that has been machine-generated using one or more large language models. The task list of user interface 408 includes a number of different tasks, including task 409 and task 410. In some implementations, the tasks are ranked or color coded based on data obtained from one or more contextual resources. For example, in some implementations, items in the task list are ranked or color coded based on the user's current job search state, which the system determines based on the thread history. For example, if the user hasn't yet applied for a job, the prepare for interview task 409 may be deactivated, and if the user hasn't yet accepted a job offer, the celebrate your new job task 410 may be deactivated.

Because the data obtained from the contextual resources is dynamic, the job-specific task lists that are machine-generated using the disclosed technologies are specific to each user-job pair. For example, if the same user applies to two different jobs, that user's job-specific task lists will be different for each job in that the tasks included in the task list may be different and/or the order in which the tasks are ranked may be different. This is because the disclosed technologies are capable of determining how well the user's background, skills, experiences, and preferences match each particular job, based on data obtained from one or more contextual resources which is included in the plan execution prompts to which the large language model is applied.

The examples shown in FIG. 4A and FIG. 4B, and the accompanying description, above, are provided for illustration purposes. For example, while the examples are illustrated as user interface screens for a smaller form factor such as smart phones, tablet computers, and wearable devices, the user interfaces can be configured for other forms of electronic devices, such as desktop computers and/or laptop devices. This disclosure is not limited to the described examples. Additional or alternative details and implementations are described herein.

FIG. 5 is a block diagram of a computing system that includes a directive generative thread-based user assistance system in accordance with some embodiments of the present disclosure.

In the embodiment of FIG. 5, a computing system 500 includes one or more user systems 510, a network 520, an application software system 530, a directive generative thread-based user assistance system 580, a data storage system 550, and an event logging service 570.

All or at least some components of directive generative thread-based user assistance system 580 are implemented at the user system 510, in some implementations. For example, thread-based user assistance interface 514 and directive generative thread-based user assistance system 580 are implemented directly upon a single client device such that communications between thread-based user assistance interface 514 and directive generative thread-based user assistance system 580 occur on-device without the need to communicate with, e.g., one or more servers, over the Internet. Dashed lines are used in FIG. 5 to indicate that all or portions of directive generative thread-based user assistance system 580 can be implemented directly on the user system 510, e.g., the user's client device. In other words, both user system 510 and directive generative thread-based user assistance system 580 can be implemented on the same computing device.

Components of the computing system 500 including the directive generative thread-based user assistance system 580 are described in more detail herein.

A user system 510 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 510 can be connected to network 520 at the same time or at different times. Different user systems 510 can contain similar components as described in connection with the illustrated user system 510. For example, many different end users of computing system 500 can be interacting with many different instances of application software system 530 through their respective user systems 510, at the same time or at different times.

User system 510 includes a user interface 512. User interface 512 is installed on or accessible to user system 510 by network 520. Embodiments of user interface 512 include a thread-based user assistance interface 514. Thread-based user assistance interface 514 enables user interaction with the directive generative thread-based user assistance system 580 and/or application software system 530, including the creation and continuance of online dialogs. For example, thread-based user assistance interface 514 provides user input mechanisms by which the directive generative thread-based user assistance system 580 receives user-generated thread portions, and provides output mechanisms by which the directive generative thread-based user assistance system 580 electronically communicates system-generated thread portions to the user.

Thread-based user assistance interface 514 includes, for example, a graphical display screen that includes graphical user interface elements such as at least one input box or other input mechanism and at least one slot. A slot as used herein refers to a space on a graphical display such as a web page or mobile device screen, into which digital content such as threads can be loaded for display to the user. For example, thread-based user assistance interface 514 may be configured with a scrollable arrangement of variable-length slots that simulates an online chat or instant messaging session. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system. Examples of user interface screens that can be included in thread-based user assistance interface 514 are shown in the screen capture figures shown in the drawings and described herein.

User interface 512 can be used to create, edit, send, view, receive, process, and organize portions of online dialogs including multi-threaded dialogs. In some implementations, user interface 512 enables the user to upload, download, receive, send, or share of other types of digital content items, including posts, articles, comments, and shares, to initiate user interface events, and to view or otherwise perceive output such as data and/or digital content produced by application software system 530, directive generative thread-based user assistance system 580, and/or content distribution service 538. For example, user interface 512 can include a graphical user interface (GUI), a conversational voice/speech interface, a virtual reality, augmented reality, or mixed reality interface, and/or a haptic interface. User interface 512 includes a mechanism for logging in to application software system 530, clicking or tapping on GUI user input control elements, and interacting with thread-based user assistance interface 514 and digital content items such as online dialogs and machine-generated thread portions. Examples of user interface 512 include web browsers, command line interfaces, and mobile app front ends. User interface 512 as used herein can include application programming interfaces (APIs).

In the example of FIG. 5, user interface 512 includes thread-based user assistance interface 514. Thread-based user assistance interface 514 includes a front end user interface component of directive generative thread-based user assistance system 580, application software system 530, or a messaging component of application software system 530. For example, thread-based user assistance interface 514 can be directly integrated with other components of any user interface of application software system 530 rather than as a separate chatbot or other type of chat feature. Thread-based user assistance interface 514 is shown as a component of user interface 512 for ease of discussion, but access to thread-based user assistance interface 514 can be limited to specific user systems 510. For example, in some implementations, access to thread-based user assistance interface 514 is limited to registered users of directive generative thread-based user assistance system 580 or application software system 530.

Network 520 includes an electronic communications network. Network 520 can be implemented on any medium or mechanism that provides for the exchange of digital data, signals, and/or instructions between the various components of computing system 500. Examples of network 520 include, without limitation, a Local Area Network (LAN), a Wide Area Network (WAN), an Ethernet network or the Internet, or at least one terrestrial, satellite or wireless link, or a combination of any number of different networks and/or communication links.

Application software system 530 includes any type of application software system that provides or enables the creation, upload, and/or distribution of at least one form of digital content, including machine-generated thread portions, between or among user systems, such as user system 510, via user interface 512. In some implementations, portions of directive generative thread-based user assistance system 580 are components of application software system 530. Components of application software system 530 can include an entity graph 532 and/or knowledge graph 534, a user connection network 536, a content distribution service 538, and a search engine 540.

In the example of FIG. 5, application software system 530 includes an entity graph 532 and/or a knowledge graph 534. Entity graph 532 and/or knowledge graph 534 include data organized according to graph-based data structures that can be traversed via queries and/or indexes to determine relationships between entities. An example of an entity graph is shown in FIG. 6, described herein. For instance, as described in more detail with reference to FIG. 6, entity graph 532 and/or knowledge graph 534 can be used to compute various types of relationship weights, affinity scores, similarity measurements, and/or statistics between, among, or relating to entities.

Entity graph 532, 534 includes a graph-based representation of data stored in data storage system 550, described herein. For example, entity graph 532, 534 represents entities, such as users, organizations (e.g., companies, schools, institutions), and content items (e.g., job postings, announcements, articles, comments, and shares, as nodes of a graph. Entity graph 532, 534 represents relationships, also referred to as mappings or links, between or among entities as edges, or combinations of edges, between the nodes of the graph. In some implementations, mappings between different pieces of data used by application software system 530 are represented by one or more entity graphs. In some implementations, the edges, mappings, or links indicate online interactions or activities relating to the entities connected by the edges, mappings, or links. For example, if a user applies for a job, an edge may be created connecting the user entity with the job entity in the entity graph, where the edge may be tagged with a label such as "applied."

Portions of entity graph 532, 534 can be automatically re-generated or updated from time to time based on changes and updates to the stored data, e.g., updates to entity data and/or activity data. Also, entity graph 532, 534 can refer to an entire system-wide entity graph or to only a portion of a system-wide graph. For instance, entity graph 532, 534 can refer to a subset of a system-wide graph, where the subset pertains to a particular user or group of users of application software system 530.

In some implementations, knowledge graph 534 is a subset or a superset of entity graph 532. For example, in some implementations, knowledge graph 534 includes multiple different entity graphs 532 that are joined by cross-application or cross-domain edges. For instance, knowledge graph 534 can join entity graphs 532 that have been created across multiple different databases or across different software products. In some implementations, the entity nodes of the knowledge graph 534 represent concepts, such as product surfaces, verticals, or application domains. In some implementations, knowledge graph 534 includes a platform that extracts and stores different concepts that can be used to establish links between data across multiple different software applications. Examples of concepts include topics, industries, and skills. The knowledge graph 534 can be used to generate and export content and entity-level embeddings that can be used to discover or infer new interrelationships between entities and/or concepts, which then can be used to identify related entities. As with other portions of entity graph 532, knowledge graph 534 can be used to compute various types of relationship weights, affinity scores, similarity measurements, and/or statistical correlations between or among entities and/or concepts.

Knowledge graph 534 includes a graph-based representation of data stored in data storage system 550, described herein. Knowledge graph 534 represents relationships, also referred to as links or mappings, between entities or concepts as edges, or combinations of edges, between the nodes of the graph. In some implementations, mappings between different pieces of data used by application software system 530 or across multiple different application software systems are represented by the knowledge graph 534.

User connection network 536 includes, for instance, a social network service, professional social network software and/or other social graph-based applications. Content distribution service 538 includes, for example, a chatbot or chat-style system, a messaging system, such as a peer-to-peer messaging system that enables the creation and exchange of messages among users of application software system 530, or a news feed. Search engine 540 includes a search engine that enables users of application software system 530 to input and execute search queries on user connection network 536 and/or entity graph 532 and/or knowledge graph 534. In some implementations, one or more portions of thread-based user assistance interface 514 and/or directive generative thread-based user assistance system 580 are in bidirectional communication with search engine 540. Application software system 530 can include, for example, online systems that provide social network services, general-purpose search engines, specific-purpose search engines, messaging systems, content distribution platforms, e-commerce software, enterprise software, or any combination of any of the foregoing or other types of software.

In some implementations, a front end portion of application software system 530 can operate in user system 510, for example as a plugin or widget in a graphical user interface of a web application, mobile software application, or as a web browser executing user interface 512. In an embodiment, a mobile app or a web browser of a user system 510 can transmit a network communication such as an HTTP request over network 520 in response to user input that is received through a user interface provided by the web application, mobile app, or web browser, such as user interface 512. A server running application software system 530 can receive the input from the web application, mobile app, or browser executing user interface 512, perform at least one operation using the input, and return output to the user interface 512 using a network communication such as an HTTP response, which the web application, mobile app, or browser receives and processes at the user system 510.

In the example of FIG. 5, application software system 530 includes a content distribution service 538. The content distribution service 538 can include a data storage service, such as a web server, which stores digital content items, and transmits digital content items to users within online dialogs operated by directive generative thread-based user assistance system 580. Alternatively or in addition, the directive generative thread-based user assistance system 580 can interface with one or more components or services of content distribution service 538, such as one or more recommendation models (e.g., content you may be interested in, people you may know, etc.) to obtain information that can be included in system-generated thread portions of online dialogs operated by directive generative thread-based user assistance system 580.

In some embodiments, content distribution service 538 processes requests from, for example, application software system 530 and/or directive generative thread-based user assistance system 580, and distributes digital content items to user systems 510 in response to requests. A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, or a page load. In some implementations, content distribution service 538 is part of application software system 530 or directive generative thread-based user assistance system 580. In other implementations, content distribution service 538 interfaces with application software system 530 and/or directive generative thread-based user assistance system 580, for example, via one or more application programming interfaces (APIs).

In the example of FIG. 5, application software system 530 includes a search engine 540. Search engine 540 is a software system designed to search for and retrieve information by executing queries on data stores, such as databases, connection networks, and/or graphs. The queries are designed to find information that matches specified criteria, such as keywords and phrases. For example, search engine 540 is used to retrieve data by executing queries on various data stores of data storage system 550 or by traversing entity graph 532, 534.

The directive generative thread-based user assistance system 580 operates online dialogs with users of application software system 530 and/or generative thread-based user assistance system 580 using one or more large language models, based on input received via thread-based user assistance interface 514 and/or other data sources. In some implementations, directive generative thread-based user assistance system 580 generates thread classification prompts, thread classifications, plan execution prompts, thread portions, and thread labels based on various forms of input data, including user-generated thread portions, thread histories, and/or contextual resources. Additional or alternative features and functionality of directive generative thread-based user assistance systems described herein, such as directive generative thread-based user assistance system 102, are included in directive generative thread-based user assistance system 580 in various embodiments.

Event logging service 570 captures and records network activity data generated during operation of application software system 530 and/or directive generative thread-based user assistance system 580, including user interface events generated at user systems 510 via user interface 512, in real time, and formulates the user interface events into a data stream that can be consumed by, for example, a stream processing system. Examples of network activity data include thread creations, thread edits, thread views, page loads, clicks on messages or graphical user interface control elements, the creation, editing, sending, and viewing of messages, and social action data such as likes, shares, comments, and social reactions (e.g., "insightful," "curious," etc.). For instance, when a user of application software system 530 via a user system 510 starts a thread or clicks on a user interface element, such as a message, a link, or a user interface control element such as a view, comment, share, or reaction button, or uploads a file, or creates a message, loads a web page, or scrolls through a feed, etc., event logging service 570 fires an event to capture an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile.

For instance, when a user creates a thread portion via directive generative thread-based user assistance system 580, or reacts to a system-generated thread portion received from directive generative thread-based user assistance system 580, event logging service 570 stores the corresponding event data in a log. Event logging service 570 generates a data stream that includes a record of real-time event data for each user interface event that has occurred. Event data logged by event logging service 570 can be pre-processed and anonymized as needed so that it can be used, for example, to generate relationship weights, affinity scores, similarity measurements, and/or to formulate training data for artificial intelligence models.

Data storage system 550 includes data stores and/or data services that store digital data received, used, manipulated, and produced by application software system 530 and/or directive generative thread-based user assistance system 580, including thread classification prompts, plan execution prompts, user-generated threads, system-generated threads, thread metadata, attribute data, activity data, machine learning model training data, machine learning model parameters, and machine learning model inputs and outputs, such as machine-generated classifications and machine-generated score data.

In the example of FIG. 5, data storage system 550 includes an entity data store 552, an activity data store 554, a prompt data store 556, a thread data store 558, and a large language model (LLM) data store 560. Entity data store 552 stores data relating to users, companies, jobs, and other entities, such as profile data, which are used by the directive generative thread-based user assistance system 580 to, for example, generate prompts, generate thread portions, and/or compute weights, statistics, similarity measurements, or scores. Activity data store 554 stores data relating to network activity, e.g., user interface event data extracted from application software system 530, thread-based user assistance interface 514, and/or directive generative thread-based user assistance system 580 by event logging service 570, which are used by the directive generative thread-based user assistance system 580 to, for example, generate prompts, generate thread portions, and/or compute weights, statistics, similarity measurements, or scores.

Prompt data store 556 stores prompt templates and/or prompts generated and output by one or more components of directive generative thread-based user assistance system 580, including thread classification prompts and plan execution prompts. Thread data store 558 stores online dialogs, threads, or thread portions, including machine-generated thread portions generated by one or more large language models of directive generative thread-based user assistance system 580, related metadata, and related data, such as thread context data obtained from one or more contextual resources. LLM data store 560 stores data that can be used to configure, train or tune one or more large language models of the directive generative thread-based user assistance system 580.

In some embodiments, data storage system 550 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 550 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 550 resides on at least one persistent and/or volatile storage device that can reside within the same local network as at least one other device of computing system 500 and/or in a network that is remote relative to at least one other device of computing system 500. Thus, although depicted as being included in computing system 500, portions of data storage system 550 can be part of computing system 500 or accessed by computing system 500 over a network, such as network 520.

While not specifically shown, it should be understood that any of user system 510, application software system 530, directive generative thread-based user assistance system 580, data storage system 550, and event logging service 570 includes an interface embodied as computer programming code stored in computer memory that when executed causes a computing device to enable bidirectional communication with any other of user system 510, application software system 530, directive generative thread-based user assistance system 580, data storage system 550, or event logging service 570 using a communicative coupling mechanism. Examples of communicative coupling mechanisms include network interfaces, inter-process communication (IPC) interfaces and application program interfaces (APIs).

Each of user system 510, application software system 530, directive generative thread-based user assistance system 580, data storage system 550, and event logging service 570 is implemented using at least one computing device that is communicatively coupled to electronic communications network 520. Any of user system 510, application software system 530, directive generative thread-based user assistance system 580, data storage system 550, and event logging service 570 can be bidirectionally communicatively coupled by network 520. User system 510 as well as other different user systems (not shown) can be bidirectionally communicatively coupled to application software system 530 and/or directive generative thread-based user assistance system 580.

A typical user of user system 510 can be an administrator or end user of application software system 530 or directive generative thread-based user assistance system 580. User system 510 is configured to communicate bidirectionally with any of application software system 530, directive generative thread-based user assistance system 580, data storage system 550, and event logging service 570 over network 520.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 510, application software system 530, directive generative thread-based user assistance system 580, data storage system 550, and event logging service 570 are implemented using computer software, hardware, or software and hardware, and can include combinations of automated functionality, data structures, and digital data, which are represented schematically in the figures. User system 510, application software system 530, directive generative thread-based user assistance system 580, data storage system 550, and event logging service 570 are shown as separate elements in FIG. 5 for ease of discussion but, except as otherwise described, the illustration is not meant to imply that separation of these elements is required. The illustrated systems, services, and data stores (or their functionality) of each of user system 510, application software system 530, directive generative thread-based user assistance system 580, data storage system 550, and event logging service 570 can be divided over any number of physical systems, including a single physical computer system, and can communicate with each other in any appropriate manner.

Figure 8:
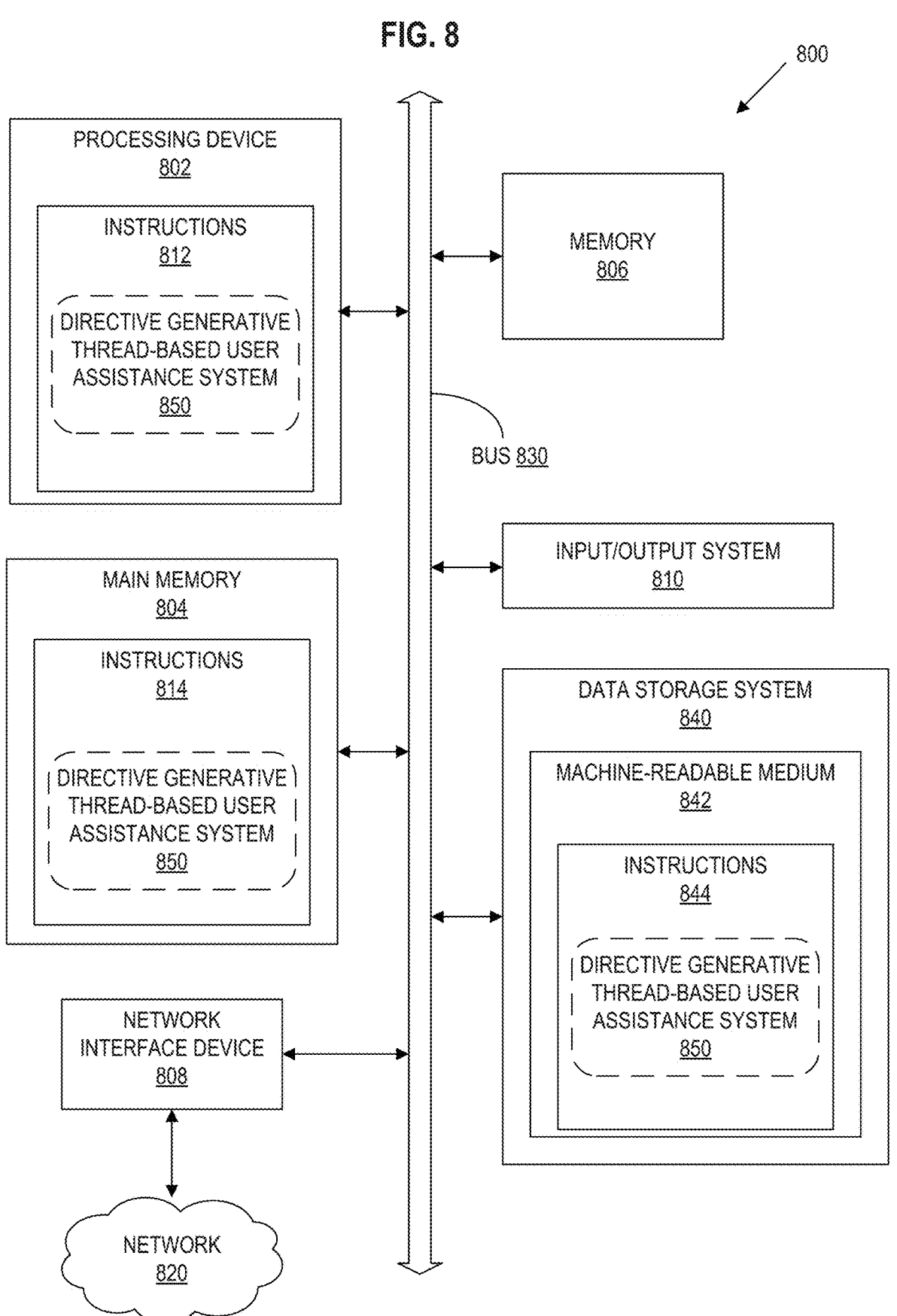
FIG. 8 is a block diagram of an example computer system including components of a directive generative thread-based user assistance system in accordance with some embodiments of the present disclosure.

In the embodiment of FIG. 8, portions of thread-based user assistance interface 514 and directive generative thread-based user assistance system 580 are collectively represented as directive generative thread-based user assistance system 850 for ease of discussion only. Thread-based user assistance interface 514 and directive generative thread-based user assistance system 580 are not required to be implemented all on the same computing device, in the same memory, or loaded into the same memory at the same time. For example, access to thread-based user assistance interface 514 and/or directive generative thread-based user assistance system 580 can be limited to different, mutually exclusive sets of user systems and/or servers. For instance, in some implementations, a separate, personalized version of directive generative thread-based user assistance system 580 is created for each user of the directive generative thread-based user assistance system 580 such that data is not shared between or among the separate, personalized versions of the system 580. Additionally, thread-based user assistance interface 514 typically may be implemented on user systems while directive generative thread-based user assistance system 580 typically may be implemented on a server computer or group of servers. In some embodiments, however, one or more portions of directive generative thread-based user assistance system 580 are implemented on user systems. For example, both thread-based user assistance interface 514 and directive generative thread-based user assistance system 580 are implemented on user systems, e.g., client devices, in some implementations. Further details with regard to the operations of directive generative thread-based user assistance system 850 are described herein.

FIG. 6 is an example of an entity graph in accordance with some embodiments of the present disclosure.

The entity graph 600 can be used by an application software system, e.g., a social network service, to support a user connection network, in accordance with some embodiments of the present disclosure. The entity graph 600 can be used (e.g., queried or traversed) to obtain or generate thread context data that can be used to formulate model input for a large language model of a directive generative thread-based user assistance system.

The entity graph 600 includes nodes, edges, and data (such as labels, weights, or scores) associated with nodes and/or edges. Nodes can be weighted based on, for example, similarity with other nodes, edge counts, or other types of computations, and edges can be weighted based on, for example, affinities, relationships, activities, similarities, or commonalities between the nodes connected by the edges, such as common attribute values (e.g., two users have the same job title or employer, or two users are n-degree connections in a user connection network, where n is a positive integer).

A graphing mechanism is used to create, update and maintain the entity graph. In some implementations, the graphing mechanism is a component of the database architecture used to implement the entity graph 600. For instance, the graphing mechanism can be a component of data storage system 550 and/or application software system 530, shown in FIG. 5, and the entity graphs created by the graphing mechanism can be stored in one or more data stores of data storage system 550.

The entity graph 600 is dynamic (e.g., continuously updated) in that it is updated in response to occurrences of interactions between entities in an online system (e.g., a user connection network) and/or computations of new relationships between or among nodes of the graph. These updates are accomplished by real-time data ingestion and storage technologies, or by offline data extraction, computation, and storage technologies, or a combination of real-time and offline technologies. For example, the entity graph 600 is updated in response to updates of user profiles, the creation or deletion of user connections with other users, and the creation and distribution of new content items, such as messages, posts, articles, comments, and shares. As another example, the entity graph 600 is updated as new computations are computed, for example, as new relationships between nodes are created based on statistical correlations or machine learning model output.

The entity graph 600 includes a knowledge graph that contains cross-application links. For example, thread context data obtained from one or more contextual resources can be linked with entities and/or edges of the entity graph.

In the example of FIG. 6, entity graph 600 includes entity nodes, which represent entities, such as content item nodes (e.g., Post U21, Article 1), user nodes (e.g., User 1, User 2, User 3, User 4), and job nodes (e.g., Job 1, Job 2). Entity graph 600 also includes attribute nodes, which represent attributes (e.g., job title data, article title data, skill data, topic data) of entities. Examples of attribute nodes include title nodes (e.g., Title U1, Title A1), company nodes (e.g., Company 1), topic nodes (Topic 1, Topic 2), and skill nodes (e.g., Skill A1, Skill U11, Skill U31, Skill U41).

Entity graph 600 also includes edges. The edges individually and/or collectively represent various different types of relationships between or among the nodes. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 600, edges between user nodes can represent online social connections between the users represented by the nodes, such as 'friend' or 'follower' connections between the connected nodes. As an example, in the entity graph 600, User 3 is a first-degree connection of User 1 by virtue of the CONNECTED edge between the User 3 node and the User 1 node, while User 2 is a second-degree connection of User 3, although User 1 has a different type of connection, FOLLOWS, with User 2 than with User 3.

In the entity graph 600, edges can represent activities involving the entities represented by the nodes connected by the edges. For example, a POSTED edge between the User 2 node and the Post U21 node indicates that the user represented by the User 2 node posted the digital content item represented by the Post U21 node to the application software system (e.g., as job posting posted to a user connection network). As another example, a SHARED edge between the User 1 node and the Post U21 node indicates that the user represented by the User 1 node shared the content item represented by the Post U21 node. Similarly the CLICKED edge between the User 3 node and the Article 1 node indicates that the user represented by the User 3 node clicked on the article represented by the Article 1 node, and the LIKED edge between the User 3 node and the Comment U1 node indicates that the user represented by the User 3 node liked the content item represented by the Comment U1 node.

In some implementations, combinations of nodes and edges are used to compute various scores, and those scores are used by various components of the directive generative thread-based user assistance system to, for example, generate thread classification prompts, generate thread classifications, select execution plans, generate plan execution prompts, and/or generate thread portions. For example, a score that measures the affinity of the user represented by the User 1 node to the job represented by the Job 2 node can be computed using a path p1 that includes a sequence of edges between the nodes User 1, Post U21, and Job 2 and/or a path p2 that includes a sequence of edges between the nodes User 1, Comment U1, and Job 2 and/or a path p3 that includes a sequence of edges between the nodes User 1, User 2, Post U21, Job 2, and/or a path p4 that includes a sequence of edges between the nodes User 1, User 3, Job 1, Company 2, Job 2. Any one or more of the paths p1, p2, p3, p4 and/or other paths through the graph 600 can be used to compute scores that represent affinities, relationships, or statistical correlations between different nodes. For instance, based on relative edge counts, a user-job affinity score computed between User U1 and Job 2 might be higher than the user-job affinity score computed between User U4 and Job 2. Similarly, a user-skill affinity score computed between User 3 and Skill U31 might be higher than the user-skill affinity score computed between User 3 and Skill U11. As another example, a job-skill affinity score computed between Job 1 and Skill U31 might be higher than a job-skill affinity score computed between Job 1 and Skill U41.

In FIG. 6, the entity graph includes multiple sub-graphs, such as sub-graph A, sub-graph B, sub-graph C, sub-graph D, and sub-graph E. One or more of the sub-graphs can be used as thread context data by one or more components of the directive generative thread-based user assistance system. The sub-graphs in FIG. 6 each pertain to a different entity type. For example, sub-graph A includes job entities and links involving the job entities. Sub-graph B includes company entities and links involving the company entities.

Sub-graph C includes content items (e.g., posts, comments, and articles) and links involving the content items. Sub-graph D includes user entities (e.g., job seekers, recruiters, etc.) and links involving the users. Sub-graph E includes skills (e.g., skills that may be associated with users and/or jobs) and links involving the skills.

The sub-graphs can facilitate the efficient determination of relevant thread context data that can be used for thread classification and/or plan execution. For instance, if the directive generative thread-based user assistance system if a user inputs a thread that mentions "the job I looked at yesterday," the system can search the user's thread history for the identifier of the job and then search sub-graph A to obtain more details about the job, which can be used to generate a thread classification prompt. As another example, sub-graph B can be used to determine the company that has posted the job, sub-graph D can be used to determine whether the user has any connections at that company, and these context data can be used to generate a plan execution prompt.

The examples shown in FIG. 6 and the accompanying description, above are provided for illustration purposes. This disclosure is not limited to the described examples.

FIG. 7 is a flow diagram of an example method for directive generative thread-based user assistance using components of a directive generative thread-based user assistance in system in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of directive generative thread-based user assistance system 102 of FIG. 1A or directive generative thread-based user assistance system 580 of FIG. 5. For example, in some implementations, portions of the method 700 are performed by one or more components of a directive generative thread-based user assistance system shown in FIG. 1A and/or FIG. 5, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 702, the processing device generates a first thread classification prompt based on a first thread portion of an online dialog involving a user of a computing device. For example, operation 702 formulates a classification prompt that can be used to classify the first thread portion. Operation 702 is performed, for example, by thread classification prompt generator 104 shown in FIG. 1A and described herein.

In some implementations, operation 702 includes sending the first thread portion to the first large language model, and receiving a tagged version of the first thread portion. For example, operation 702 can include tagging individual words or phrases of the first thread portion with entity labels and/or activity labels. In some implementations, the tagged version of the first thread portion includes entity data associated with the first thread portion. In some implementations, the entity data is generated and output by the first large language model, in response to receipt of the first thread portion, based on data associated with the user retrieved from one or more stored threads, one or more data sources, one or more entity connection graphs, one or more domain applications, and/or one or more recommendation systems. In some implementations, the online dialog includes multiple different natural language threads.

In some implementations, operation 702 includes, based on the tagged version of the first thread portion, retrieving a stored classification template. For example, operation 702 can use the tagged version of the first thread portion to identify a thread classification template that matches one or more of the tags that have been applied to the first thread portion by the first large language model. In some implementations, the retrieved classification template includes at least one instruction to be executed by the first large language model. In some implementations, operation 702 further includes the retrieved classification template and the retrieved data in the first thread classification prompt.

In some implementations, operation 702 includes sending the online dialog to the first large language model. For example, operation 702 can include sending an electronic file that includes an entire history of all threads of an online dialog involving the user during a time interval to the first large language model. Send as used herein may refer to any mechanism by which an AI model, such as the first large language model, can be applied to one or more inputs, such as one or more portions of the online dialog. For example, send can include the transmission of an electronic communication over a network and/or an application programming interface (API).

In some implementations, operation 702 includes receiving a threaded version of the online dialog, where the threaded version of the online dialog includes the first thread portion and the threaded version of the online dialog is generated and output by the first large language model. For example, operation 702 can include the first large language model dividing the online dialog into threads, where each thread has a different label. Receive as used herein may refer to any mechanism by which one or more outputs generated by an AI model, such as the first large language model, are obtained from the AI model. For example, receive can include the transmission of an electronic communication over a network and/or an application programming interface (API).

At operation 704, the processing device sends the first thread classification prompt to a first large language model. Send as used herein may refer to any mechanism by which an AI model, such as the first large language model, can be applied to one or more inputs, such as the first classification prompt. In some implementations, operation 704 for is performed, for example, by thread classification prompt generator 104 shown in FIG. 1A and described herein.

At operation 706, the processing device receives a first thread classification, where the first thread classification is generated and output by the first large language model based on the first thread classification prompt. For example, operation 706 can include classifying the first thread portion based on output of the first large language model, where the thread classification can include a thread topic, such as a job, company, skill, or activity, e.g., job (or other entity) search, resume generation, referral generation, etc. Receive as used herein may refer to any mechanism by which one or more outputs generated by an AI model, such as the first large language model, are obtained from the AI model. In some implementations, operation 706 for is performed, for example, by first large language model 108 shown in FIG. 1A and described herein.

At operation 708, the processing device formulates a plan execution prompt based on at least the first thread classification. For example, operation 708 can include selecting an execution plan based on the first thread classification of operation 706, and formulating a plan execution prompt based on the selected execution plan. In some implementations, operation 706 for is performed, for example, by plan execution prompt generator 112 shown in FIG. 1A and described herein.

In some implementations, operation 708 includes formulating the plan execution prompt based on the first thread classification received at operation 706. In some implementations, in response to determining that at least one stored thread involving the user matches the first thread classification, the plan execution prompt is formulated based on the first thread portion and the at least one stored thread that matches the first thread classification.

In some implementations, operation 708 includes, based on the first thread classification, in response to receipt of the first thread portion, retrieving data associated with the user from one or more stored threads, one or more data sources, one or more entity connection graphs, one or more domain applications, and/or one or more recommendation systems, and including the retrieved data in the plan execution prompt. For example, operation 708 can include retrieving thread context data from one or more contextual resources, where the thread context data can be used to classify the first thread portion.

In some implementations, operation 708 includes, based on the first thread classification, retrieving a stored plan template, where the retrieved stored plan template includes one or more instructions to be executed by the second large language model, and including the retrieved plan template and the retrieved data in the plan execution prompt. For example, operation 708 can include selecting the stored plan template from a template library and/or applying the retrieved plan template to the retrieved data obtained from one or more contextual resources.

At operation 710, the processing device sends the plan execution prompt to a second large language model. Send as used herein may refer to any mechanism by which an AI model, such as the second large language model, can be applied to one or more inputs, such as the plan execution prompt. In some implementations, operation 710 for is performed, for example, by plan execution prompt generator 112 shown in FIG. 1A and described herein.

At operation 712, the processing device receives a second thread portion, where the second thread portion is generated and output by the second large language model based on at least the plan execution prompt. For example, operation 721 can include the second large language model generating and outputting a natural language or multi-modal (e.g., text, video, audio, one or more images, etc.) response to the first thread portion, such as one or more job (or other entity) recommendations, job (or other entity) assessments, or task recommendations. Receive as used herein may refer to any mechanism by which one or more outputs generated by an AI model, such as the second large language model, are obtained from the AI model. In some implementations, the second large language model is a different large language model than the first large language model. In some implementations, operation 712 for is performed, for example, by second large language model 116 shown in FIG. 1A and described herein.

In some implementations, the second thread portion is generated and output by the second large language model based on the plan execution prompt and one or more portions of the online dialog. In some implementations, the second thread portion includes one or more recommended tasks selected, prioritized, and output by the second large language model, in response to receipt of the first thread portion, based on one or more of the plan execution prompt, the online dialog, or data associated with the user retrieved from one or more stored threads, one or more data sources, one or more entity connection graphs, one or more domain applications, and/or one or more recommendation systems.

In some implementations, the second thread portion includes an assessment of a job (or other entity) that is summarized and output by the second large language model, in response to receipt of the first thread portion, based on one or more of the plan execution prompt, the online dialog, or data associated with the user retrieved from one or more stored threads, one or more data sources, one or more entity connection graphs, one or more domain applications, and/or one or more recommendation systems.

In some implementations, the second thread portion includes an entity recommendation or activity recommendation that is generated and output by the second large language model, in response to receipt of the first thread portion, based on one or more of the plan execution prompt, the online dialog, or data associated with the user retrieved from one or more stored threads, one or more data sources, one or more entity connection graphs, one or more domain applications, and/or one or more recommendation systems.

At operation 714, the processing device generates a label for a third thread portion of the online dialog, where the label is based on at least the first thread classification of operation 706. For example, operation 714 can include dynamically labeling thread portions in accordance with thread classifications produced by the first large language model. In some implementations, operation 714 for is performed, for example, by thread label generator 109 shown in FIG. 1A and described herein.

In some implementations, the label is based on the first thread classification and one or more portions of the online dialog. In some implementations, the label is configured for display at the computing device. In some implementations, the third thread portion includes the first thread portion of operation 702 and the second thread portion of operation 712.

In some implementations, the method 700 further includes dynamically labeling different threads of the online dialog with different labels, based on thread classifications generated and output by a large language model. For example, the method 700 can include labeling a fourth thread portion of the online dialog based on a second thread classification generated and output by the first large language model.

In some implementations, one or more of the system-generated thread portions include any of video, audio, and/or one or more images, alone or in combination with natural language text. In some implementations, the processing device presents one or more of the system-generated thread portions to a user at a user assistance interface and receives user input in response to the one or more of the system-generated thread portions, where the user input includes any of: a modification of the one or more system-generated thread portions, a request for a subsequent system-generated thread portion, or an action in response to the one or more of the system-generated thread portions. In some implementations, the processing device configures one or more of the prompts according to a prompt template that is selected from a library of prompt templates, where the library of prompt templates contains one or more orders of magnitude fewer templates than there are users of the user assistance system. In some implementations, the processing device configures one or more of the prompts to convert one or more of the system-generated thread portions from a first size to a second size, where the second size is more efficient for presentation at one or more user devices or for distribution to one or more user devices via a network. In some implementations, the processing device configures one or more prompts to generate system-generated thread portions for distribution via a network in dependence on interaction between users and system-generated thread portions, where the one or more prompts are configured to trigger one or more generative AI models to formulate the system-generated thread portions for rendering at end user devices with different screen resolutions so as to facilitate interaction between users and the system-generated thread portions resulting in an improved conversational user assistance system. In some implementations, the processing device detects increases or decreases in latency of outputting one or more of the system-generated thread portions and in response to detecting an increase in latency: reduces a number of the input signals, or uses one or more generative AI models with a reduced size (e.g., fewer model parameters), or uses a more compact prompt template (e.g., fewer prompt sections, instructions, or examples), or reduces a size of the system-generated thread portion (e.g., specifies a shorter maximum string length).

The examples shown in FIG. 7 and the accompanying description, above are provided for illustration purposes. This disclosure is not limited to the described examples.

FIG. 8 is a block diagram of an example computer system including components of a directive generative thread-based user assistance system in accordance with some embodiments of the present disclosure.

In FIG. 8, an example machine of a computer system 800 is shown, within which a set of instructions for causing the machine to perform any of the methodologies discussed herein can be executed. In some embodiments, the computer system 800 can correspond to a component of a networked computer system (e.g., as a component of the computing system 100 of FIG. 1A or the computer system 500 of FIG. 5) that includes, is coupled to, or utilizes a machine to execute an operating system to perform operations corresponding to one or more components of the directive generative thread-based user assistance system 102 of FIG. 1A or the directive generative thread-based user assistance system 580 of FIG. 5. For example, computer system 800 corresponds to a portion of computing system 500 when the computing system is executing a portion of directive generative thread-based user assistance system 102 or directive generative thread-based user assistance system 580.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a memory 803 (e.g., flash memory, static random access memory (SRAM), etc.), an input/output system 810, and a data storage system 840, which communicate with each other via a bus 830.

Processing device 802 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be at least one special-purpose processing device such as an application specific integrated circuit (ASIC), a field programmable gate array (FPGA), a digital signal processor (DSP), network processor, or the like. The processing device 802 is configured to execute instructions 812 for performing the operations and steps discussed herein.

In some embodiments of FIG. 8, directive generative thread-based user assistance system 850 represents portions of directive generative thread-based user assistance system 580 when the computer system 800 is executing those portions of directive generative thread-based user assistance system 580. Instructions 812 include portions of directive generative thread-based user assistance system 850 when those portions of the directive generative thread-based user assistance system 850 are being executed by processing device 802. Thus, the directive generative thread-based user assistance system 850 is shown in dashed lines as part of instructions 812 to illustrate that, at times, portions of the directive generative thread-based user assistance system 850 are executed by processing device 802. For example, when at least some portion of the directive generative thread-based user assistance system 850 is embodied in instructions to cause processing device 802 to perform the method(s) described herein, some of those instructions can be read into processing device 802 (e.g., into an internal cache or other memory) from main memory 804 and/or data storage system 840. However, it is not required that all of the directive generative thread-based user assistance system 850 be included in instructions 812 at the same time and portions of the directive generative thread-based user assistance system 850 are stored in at least one other component of computer system 800 at other times, e.g., when at least one portion of the directive generative thread-based user assistance system 850 are not being executed by processing device 802.

The computer system 800 further includes a network interface device 808 to communicate over the network 820. Network interface device 808 provides a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 includes an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, haptic information, and/or digital imagery, for example.

The data storage system 840 includes a machine-readable storage medium 842 (also known as a computer-readable medium) on which is stored at least one set of instructions 844 or software embodying any of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media. In one embodiment, the instructions 844 include instructions to implement functionality corresponding to a directive generative thread-based user assistance system 850 (e.g., the directive generative thread-based user assistance system 102 of FIG. 1A or directive generative thread-based user assistance system 580 of FIG. 5).

Dashed lines are used in FIG. 8 to indicate that it is not required that the directive generative thread-based user assistance system be embodied entirely in instructions 812, 814, and 844 at the same time. In one example, portions of the directive generative thread-based user assistance system are embodied in instructions 814, which are read into main memory 804 as instructions 814, and portions of instructions 812 are read into processing device 802 as instructions 812 for execution. In another example, some portions of the directive generative thread-based user assistance system are embodied in instructions 844 while other portions are embodied in instructions 814 and still other portions are embodied in instructions 812.

While the machine-readable storage medium 842 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 8 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 500, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples described herein, or any combination of any of the examples described herein, or any combination of any portions of the examples described herein.

In an example 1, a method includes: generating a first thread classification prompt based on a first thread portion of an online dialog involving a user of a computing device; sending the first thread classification prompt to a first large language model; receiving a first thread classification, where the first thread classification is generated and output by the first large language model based on the first thread classification prompt; formulating a plan execution prompt based on the first thread classification, where in response to determining that at least one stored thread involving the user matches the first thread classification, the plan execution prompt is formulated based on the first thread portion and the at least one stored thread that matches the first thread classification; sending the plan execution prompt to a second large language model; receiving a second thread portion, where the second thread portion is generated and output by the second large language model based on the plan execution prompt and the online dialog; and generating a label for a third thread portion of the online dialog, where the label is configured for display at the computing device, the label is based on the first thread classification, and the third thread portion includes the first thread portion and the second thread portion.

An example 2 includes the subject matter of example 1, further including: labeling a fourth thread portion of the online dialog based on a second thread classification generated and output by the first large language model, where the online dialog includes a plurality of natural language threads. An example 3 includes the subject matter of example 1 or example 2, where generating the first thread classification prompt includes: sending the first thread portion to the first large language model; and receiving a tagged version of the first thread portion, where the tagged version of the first thread portion includes entity data associated with the first thread portion and the entity data is generated and output by the first large language model based on data associated with the user retrieved from at least one of a stored thread, a data source, an entity connection graph, a domain application, or a recommendation system in response to receipt of the first thread portion. An example 4 includes the subject matter of example 3, where generating the first thread classification prompt includes: based on the tagged version of the first thread portion, retrieving a stored classification template, where the retrieved classification template includes at least one instruction to be executed by the first large language model; and including the retrieved classification template and the retrieved data in the first thread classification prompt. An example 5 includes the subject matter of any of examples 1-4, where generating the first thread classification prompt includes: sending the online dialog to the first large language model; and receiving a threaded version of the online dialog, where the threaded version of the online dialog includes the first thread portion and the threaded version is generated and output by the first large language model. An example 6 includes the subject matter of any of examples 1-5, where formulating the plan execution prompt includes: based on the first thread classification, retrieving data associated with the user from at least one of a stored thread, a data source, an entity connection graph, a domain application, or a recommendation system in response to receipt of the first thread portion; and including the retrieved data in the plan execution prompt. An example 7 includes the subject matter of example 6, where formulating the plan execution prompt includes: based on the first thread classification, retrieving a stored plan template, where the retrieved stored plan template includes a plurality of instructions to be executed by the second large language model; and including the retrieved plan template and the retrieved data in the plan execution prompt. An example 8 includes the subject matter of any of examples 1-7, where the second thread portion includes a plurality of tasks selected, prioritized, and output by the second large language model based on the plan execution prompt, the online dialog, and data associated with the user retrieved from at least one of a stored thread, a data source, an entity connection graph, a domain application, or a recommendation system in response to receipt of the first thread portion. An example 9 includes the subject matter of any of examples 1-8, where the second thread portion includes an assessment of a job that is summarized and output by the second large language model based on the plan execution prompt, the online dialog, and data associated with the user retrieved from at least one of a stored thread, a data source, an entity connection graph, a domain application, or a recommendation system in response to receipt of the first thread portion. An example 10 includes the subject matter of any of examples 1-9, where the second thread portion includes a recommendation that is generated and output by the second large language model based on the plan execution prompt, the online dialog, and data associated with the user retrieved from at least one of a stored thread, a data source, an entity connection graph, a domain application, or a recommendation system in response to receipt of the first thread portion.

In an example 11, a system includes: at least one processor; and at least one memory device coupled to the at least one processor, where the at least one memory device includes instructions that, when executed by the at least one processor, cause the at least one processor to perform at least one operation including: generating a first thread classification prompt based on a first thread portion of an online dialog involving a user of a computing device; sending the first thread classification prompt to a first large language model; receiving a first thread classification, where the first thread classification is generated and output by the first large language model based on the first thread classification prompt; formulating a plan execution prompt based on the first thread classification, where in response to determining that at least one stored thread involving the user matches the first thread classification, the plan execution prompt is formulated based on the first thread portion and the at least one stored thread that matches the first thread classification; sending the plan execution prompt to a second large language model; receiving a second thread portion, where the second thread portion is generated and output by the second large language model based on the plan execution prompt and the online dialog; and generating a label for a third thread portion of the online dialog, where the label is configured for display at the computing device, the label is based on the first thread classification, and the third thread portion includes the first thread portion and the second thread portion.

An example 12 includes the subject matter of example 11, where the instructions, when executed by the at least one processor, cause the at least one processor to perform at least one operation further including: sending the first thread portion to the first large language model; receiving a tagged version of the first thread portion, where the tagged version of the first thread portion includes entity data associated with the first thread portion and the entity data is generated and output by the first large language model based on data associated with the user retrieved from at least one of a stored thread, a data source, an entity connection graph, a domain application, or a recommendation system in response to receipt of the first thread portion; based on the tagged version of the first thread portion, retrieving a stored classification template, where the retrieved classification template includes at least one instruction to be executed by the first large language model; and including the retrieved classification template and the retrieved data in the first thread classification prompt. An example 13 includes the subject matter of example 11 or example 12, where the instructions, when executed by the at least one processor, cause the at least one processor to perform at least one operation further including: based on the first thread classification, retrieving data associated with the user from at least one of a stored thread, a data source, an entity connection graph, a domain application, or a recommendation system in response to receipt of the first thread portion; including the retrieved data in the plan execution prompt; based on the first thread classification, retrieving a stored plan template, where the retrieved stored plan template includes a plurality of instructions to be executed by the second large language model; and including the retrieved plan template and the retrieved data in the plan execution prompt. An example 14 includes the subject matter of any of examples 11-13, where the second thread portion includes a plurality of tasks selected, prioritized, and output by the second large language model based on the plan execution prompt, the online dialog, and data associated with the user retrieved from at least one of a stored thread, a data source, an entity connection graph, a domain application, or a recommendation system in response to receipt of the first thread portion. An example 15 includes the subject matter of any of examples 11-14, where the second thread portion includes an assessment of a job that is summarized and output by the second large language model based on the plan execution prompt, the online dialog, and data associated with the user retrieved from at least one of a stored thread, a data source, an entity connection graph, a domain application, or a recommendation system in response to receipt of the first thread portion. An example 16 includes the subject matter of any of examples 11-15, where the second thread portion includes a recommendation that is generated and output by the second large language model based on the plan execution prompt, the online dialog, and data associated with the user retrieved from at least one of a stored thread, a data source, an entity connection graph, a domain application, or a recommendation system in response to receipt of the first thread portion.

In an example 17, at least one non-transitory machine readable storage medium including instructions that, when executed by the at least one processor, cause the at least one processor to perform at least one operation including: generating a first thread classification prompt based on a first thread portion of an online dialog involving a user of a computing device; sending the first thread classification prompt to a first large language model; receiving a first thread classification, where the first thread classification is generated and output by the first large language model based on the first thread classification prompt; formulating a plan execution prompt based on the first thread classification, where in response to determining that at least one stored thread involving the user matches the first thread classification, the plan execution prompt is formulated based on the first thread portion and the at least one stored thread that matches the first thread classification; sending the plan execution prompt to a second large language model; receiving a second thread portion, where the second thread portion is generated and output by the second large language model based on the plan execution prompt and the online dialog; and generating a label for a third thread portion of the online dialog, where the label is configured for display at the computing device, the label is based on the first thread classification, and the third thread portion includes the first thread portion and the second thread portion.

An example 18 includes the subject matter of example 17, where the second thread portion includes a plurality of tasks selected, prioritized, and output by the second large language model based on the plan execution prompt, the online dialog, and data associated with the user retrieved from at least one of a stored thread, a data source, an entity connection graph, a domain application, or a recommendation system in response to receipt of the first thread portion. An example 19 includes the subject matter of example 17 or example 18, where the second thread portion includes an assessment of a job that is summarized and output by the second large language model based on the plan execution prompt, the online dialog, and data associated with the user retrieved from at least one of a stored thread, a data source, an entity connection graph, a domain application, or a recommendation system in response to receipt of the first thread portion. An example 20 includes the subject matter of any of examples 17-19, where the second thread portion includes a recommendation that is generated and output by the second large language model based on the plan execution prompt, the online dialog, and data associated with the user retrieved from at least one of a stored thread, a data source, an entity connection graph, a domain application, or a recommendation system in response to receipt of the first thread portion.

An example 21 includes the subject matter of any of the other examples, where one or more of the system-generated thread portions include any of video, audio, and/or one or more images, alone or in combination with natural language text. An example 22 includes the subject matter of any of the other examples, where the processing device presents one or more of the system-generated thread portions to a user at a user assistance interface and receives user input in response to the one or more of the system-generated thread portions, where the user input includes any of: a modification of the one or more system-generated thread portions, a request for a subsequent system-generated thread portion, or an action in response to the one or more of the system-generated thread portions.

An example 23 includes the subject matter of any of the other examples, where the processing device configures one or more of the prompts according to a prompt template that is selected from a library of prompt templates, where the library of prompt templates contains one or more orders of magnitude fewer templates than there are users of the user assistance system. An example 24 includes the subject matter of any of the other examples, where the processing device configures one or more of the prompts to convert one or more of the system-generated thread portions from a first size to a second size, where the second size is more efficient for presentation at one or more user devices or for distribution to one or more user devices via a network. An example 25 includes the subject matter of any of the other examples, where the processing device configures one or more prompts to generate system-generated thread portions for distribution via a network in dependence on interaction between users and system-generated thread portions, where the one or more prompts are configured to trigger one or more generative AI models to formulate the system-generated thread portions for rendering at end user devices with different screen resolutions so as to facilitate interaction between users and the system-generated thread portions resulting in an improved conversational user assistance system.

An example 26 includes the subject matter of any of the other examples, where the processing device detects increases or decreases in latency of outputting one or more of the system-generated thread portions and in response to detecting an increase in latency: reduces a number of the input signals, or uses one or more generative AI models with a reduced size (e.g., fewer model parameters), or uses a more compact prompt template (e.g., fewer prompt sections, instructions, or examples), or reduces a size of the system-generated thread portion (e.g., specifies a shorter maximum string length).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

generating a first thread classification prompt based on a first thread portion of an online dialog presented via an interface;

sending the first thread classification prompt to a first large language model;

receiving a first thread classification, wherein the first thread classification is generated and output by the first large language model based on the first thread classification prompt;

formulating a plan execution prompt based on the first thread classification, wherein in response to determining that at least one stored thread matches the first thread classification, the plan execution prompt is formulated based on the first thread portion and the at least one stored thread that matches the first thread classification;

sending the plan execution prompt to a second large language model;

receiving a second thread portion, wherein the second thread portion is generated and output by the second large language model based on the plan execution prompt and the online dialog, and wherein the second thread portion comprises an assessment of a target entity that is summarized and output by the second large language model based on the plan execution prompt;

generating a label for a third thread portion of the online dialog, wherein the label is based on the first thread classification and the third thread portion comprises the first thread portion and the second thread portion; and providing the label to the interface.

2. The method of claim 1, further comprising:

labeling a fourth thread portion of the online dialog based on a second thread classification generated and output by the first large language model, wherein the online dialog comprises a plurality of natural language threads.

3. The method of claim 1, wherein generating the first thread classification prompt comprises:

sending the first thread portion to the first large language model; and receiving a tagged version of the first thread portion, wherein the tagged version of the first thread portion comprises entity data associated with the first thread portion and the entity data is generated and output by the first large language model based on data associated with a user retrieved from at least one of a stored thread, a data source, an entity connection graph, a domain application, or a recommendation system in response to receipt of the first thread portion.

4. The method of claim 3, wherein generating the first thread classification prompt comprises:

based on the tagged version of the first thread portion, retrieving a stored classification template, wherein the retrieved classification template comprises at least one instruction to be executed by the first large language model; and including the retrieved classification template and the retrieved data in the first thread classification prompt.

5. The method of claim 1, wherein generating the first thread classification prompt comprises:

sending the online dialog to the first large language model; and receiving a threaded version of the online dialog, wherein the threaded version of the online dialog comprises the first thread portion and the threaded version is generated and output by the first large language model.

6. The method of claim 1, wherein formulating the plan execution prompt comprises:

based on the first thread classification, retrieving data associated with a user from at least one of a stored thread, a data source, an entity connection graph, a domain application, or a recommendation system in response to receipt of the first thread portion; and including the retrieved data in the plan execution prompt.

7. The method of claim 6, wherein formulating the plan execution prompt comprises:

based on the first thread classification, retrieving a stored plan template, wherein the retrieved stored plan template comprises a plurality of instructions to be executed by the second large language model; and including the retrieved plan template and the retrieved data in the plan execution prompt.

8. The method of claim 1, wherein the second thread portion comprises a plurality of tasks selected, prioritized, and output by the second large language model based on the plan execution prompt, the online dialog, and data associated with a user retrieved from at least one of a stored thread, a data source, an entity connection graph, a domain application, or a recommendation system in response to receipt of the first thread portion.

9. The method of claim 1, wherein the assessment of a job is summarized and output by the second large language model based on the online dialog, and data associated with a user retrieved from at least one of a stored thread, a data source, an entity connection graph, a domain application, or a recommendation system in response to receipt of the first thread portion.

10. The method of claim 1, wherein the second thread portion comprises a recommendation that is generated and output by the second large language model based on the plan execution prompt, the online dialog, and data associated with a user retrieved from at least one of a stored thread, a data source, an entity connection graph, a domain application, or a recommendation system in response to receipt of the first thread portion.

11. A system comprising:

at least one processor; and at least one memory device coupled to the at least one processor, wherein the at least one memory device comprises instructions that, when executed by the at least one processor, cause the at least one processor to perform at least one operation comprising:

generating a first thread classification prompt based on a first thread portion of an online dialog presented via an interface;

sending the first thread classification prompt to a first large language model;

receiving a first thread classification, wherein the first thread classification is generated and output by the first large language model based on the first thread classification prompt;

formulating a plan execution prompt based on the first thread classification, wherein in response to determining that at least one stored thread matches the first thread classification, the plan execution prompt is formulated based on the first thread portion and the at least one stored thread that matches the first thread classification;

sending the plan execution prompt to a second large language model;

receiving a second thread portion, wherein the second thread portion is generated and output by the second large language model based on the plan execution prompt and the online dialog, and wherein the second thread portion comprises an assessment of a target entity that is summarized and output by the second large language model based on the plan execution prompt;

generating a label for a third thread portion of the online dialog, wherein the label is based on the first thread classification and the third thread portion comprises the first thread portion and the second thread portion; and providing the label to the interface.

12. The system of claim 11, wherein the instructions, when executed by the at least one processor, cause the at least one processor to perform at least one operation further comprising:

sending the first thread portion to the first large language model;

receiving a tagged version of the first thread portion, wherein the tagged version of the first thread portion comprises entity data associated with the first thread portion and the entity data is generated and output by the first large language model based on data associated with a user retrieved from at least one of a stored thread, a data source, an entity connection graph, a domain application, or a recommendation system in response to receipt of the first thread portion;

based on the tagged version of the first thread portion, retrieving a stored classification template, wherein the retrieved classification template comprises at least one instruction to be executed by the first large language model; and including the retrieved classification template and the retrieved data in the first thread classification prompt.

13. The system of claim 11, wherein the instructions, when executed by the at least one processor, cause the at least one processor to perform at least one operation further comprising:

based on the first thread classification, retrieving data associated with a user from at least one of a stored thread, a data source, an entity connection graph, a domain application, or a recommendation system in response to receipt of the first thread portion;

including the retrieved data in the plan execution prompt;

based on the first thread classification, retrieving a stored plan template, wherein the retrieved stored plan template comprises a plurality of instructions to be executed by the second large language model; and including the retrieved plan template and the retrieved data in the plan execution prompt.

14. The system of claim 11, wherein the second thread portion comprises a plurality of tasks selected, prioritized, and output by the second large language model based on the plan execution prompt, the online dialog, and data associated with a user retrieved from at least one of a stored thread, a data source, an entity connection graph, a domain application, or a recommendation system in response to receipt of the first thread portion.

15. The system of claim 11, wherein the assessment of a job is summarized and output by the second large language model based on the online dialog, and data associated with a user retrieved from at least one of a stored thread, a data source, an entity connection graph, a domain application, or a recommendation system in response to receipt of the first thread portion.

16. The system of claim 11, wherein the second thread portion comprises a recommendation that is generated and output by the second large language model based on the plan execution prompt, the online dialog, and data associated with a user retrieved from at least one of a stored thread, a data source, an entity connection graph, a domain application, or a recommendation system in response to receipt of the first thread portion.

17. At least one non-transitory machine readable storage medium comprising instructions that, when executed by the at least one processor, cause the at least one processor to perform at least one operation comprising:

generating a first thread classification prompt based on a first thread portion of an online dialog presented via an interface;

sending the first thread classification prompt to a first large language model;

receiving a first thread classification, wherein the first thread classification is generated and output by the first large language model based on the first thread classification prompt;

formulating a plan execution prompt based on the first thread classification, wherein in response to determining that at least one stored thread matches the first thread classification, the plan execution prompt is formulated based on the first thread portion and the at least one stored thread that matches the first thread classification;

sending the plan execution prompt to a second large language model;

receiving a second thread portion, wherein the second thread portion is generated and output by the second large language model based on the plan execution prompt and the online dialog, and wherein the second thread portion comprises an assessment of a target entity that is summarized and output by the second large language model based on the plan execution prompt;

generating a label for a third thread portion of the online dialog, wherein the label is based on the first thread classification and the third thread portion comprises the first thread portion and the second thread portion; and providing the label to the interface.

18. The at least one non-transitory machine readable storage medium of claim 17, wherein the second thread portion comprises a plurality of tasks selected, prioritized, and output by the second large language model based on the plan execution prompt, the online dialog, and data associated with a user retrieved from at least one of a stored thread, a data source, an entity connection graph, a domain application, or a recommendation system in response to receipt of the first thread portion.

19. The at least one non-transitory machine readable storage medium of claim 17, wherein the assessment of a job is summarized and output by the second large language model based on the plan execution prompt, the online dialog, and data associated with a user retrieved from at least one of a stored thread, a data source, an entity connection graph, a domain application, or a recommendation system in response to receipt of the first thread portion.

20. The at least one non-transitory machine readable storage medium of claim 17, wherein the second thread portion comprises a recommendation that is generated and output by the second large language model based on the plan execution prompt, the online dialog, and data associated with a user retrieved from at least one of a stored thread, a data source, an entity connection graph, a domain application, or a recommendation system in response to receipt of the first thread portion.

* * * * *